(12) United States Patent
Livesay et al.

(10) Patent No.: US 8,566,194 B2
(45) Date of Patent: *Oct. 22, 2013

(54) METHOD AND SYSTEM FOR COMPARING A PURCHASE ORDER, ACTUAL DATA, AND AN INVOICE TO DETERMINE A DISCREPANCY BETWEEN THE PURCHASE ORDER, ACTUAL DATA, AND THE INVOICE

(75) Inventors: Jeffrey A. Livesay, Houston, TX (US); Robert Bodnar, Highlands Ranch, CO (US); Thomas A. Lopus, Spring, TX (US)

(73) Assignee: Wellogix Technology Licensing, LLC, Houston, TX (US)

( * ) Notice: Subject to any disclaimer, the term of this patent is extended or adjusted under 35 U.S.C. 154(b) by 363 days.

This patent is subject to a terminal disclaimer.

(21) Appl. No.: 11/981,258

(22) Filed: Oct. 31, 2007

(65) Prior Publication Data

US 2008/0126265 A1    May 29, 2008

Related U.S. Application Data

(60) Division of application No. 09/801,016, filed on Mar. 6, 2001, now Pat. No. 7,991,680, which is a continuation-in-part of application No. 09/672,938, filed on Sep. 28, 2000, now abandoned.

(60) Provisional application No. 60/236,998, filed on Sep. 29, 2000, provisional application No. 60/187,345, filed on Mar. 6, 2000.

(51) Int. Cl.
| | |
|---|---|
| *G06Q 10/06* | (2012.01) |
| *G06Q 40/00* | (2012.01) |
| *G06Q 40/04* | (2012.01) |
| *G06Q 30/08* | (2012.01) |
| *G06Q 40/02* | (2012.01) |

(52) U.S. Cl.
USPC ............. 705/35; 705/37; 705/7.12; 705/26.3; 700/99

(58) Field of Classification Search
USPC ............. 705/1.1, 5, 7, 10, 26, 35, 37, 80, 11, 705/36 R, 38, 1, 7.11, 7.25, 7.37, 26.3, 705/26.62, 27, 30, 77, 348, 400, 7.12, 7.23, 705/25, 40, 64, 713; 345/595; 700/90, 99; 1/1; 703/27

See application file for complete search history.

(56) References Cited

U.S. PATENT DOCUMENTS

| | | | | |
|---|---|---|---|---|
| 4,700,318 A | * | 10/1987 | Ockman | ........................ 345/595 |
| 4,799,156 A | * | 1/1989 | Shavit et al. | .................. 705/26.3 |

(Continued)

FOREIGN PATENT DOCUMENTS

| | | |
|---|---|---|
| WO | WO 97/29445 A1 | 8/1997 |
| WO | WO 99/33016 A1 | 7/1999 |

(Continued)

OTHER PUBLICATIONS

Gupta et al., Decision Support Systems for Small Business, Journal of Systems Management; Feb. 1989, vol. 40, Issue 2; p. 37.*

(Continued)

*Primary Examiner* — Barbara Joan Amelunxen
(74) *Attorney, Agent, or Firm* — Birch, Stewart, Kolasch & Birch, LLP

(57) ABSTRACT

A method and system for enhancing a workflow system by providing supportive information for a project is disclosed. A purchase order relating to at least one request for at least one good, at least one service, and combinations thereof relating to the project is received from a first user. An actual data to complete a portion of the project is received from a second user in response to the purchase order. An invoice is received from the second user upon completion of the portion of the project. The purchase order, actual data, and the invoice are compared to determine a discrepancy between the purchase order, actual data, and the invoice. A proposed reconciliation from the first user or the second user is received in response to an electronic notification of the discrepancy. An approval or disapproval of the proposed reconciliation is received from the first user or the second user.

50 Claims, 61 Drawing Sheets

(56) References Cited

U.S. PATENT DOCUMENTS

| | | | |
|---|---|---|---|
| 5,168,445 A | | 12/1992 | Kawashima et al. |
| 5,189,606 A | * | 2/1993 | Burns et al. ............... 705/7.23 |
| 5,381,332 A | * | 1/1995 | Wood ........................ 705/7.25 |
| 5,446,885 A | | 8/1995 | Moore et al. |
| 5,657,233 A | | 8/1997 | Cherrington et al. |
| 5,717,989 A | * | 2/1998 | Tozzoli et al. ................. 705/37 |
| 5,793,632 A | * | 8/1998 | Fad et al. ..................... 705/400 |
| 5,794,207 A | * | 8/1998 | Walker et al. .................. 705/77 |
| 5,826,244 A | * | 10/1998 | Huberman ..................... 705/37 |
| 5,907,490 A | * | 5/1999 | Oliver ............................ 700/90 |
| 6,006,199 A | | 12/1999 | Berlin et al. |
| 6,085,169 A | | 7/2000 | Walker et al. |
| 6,092,050 A | * | 7/2000 | Lungren et al. ............ 705/36 R |
| 6,109,368 A | | 8/2000 | Goldman et al. |
| 6,119,103 A | * | 9/2000 | Basch et al. .................... 705/35 |
| 6,189,003 B1 | * | 2/2001 | Leal ................................... 1/1 |
| 6,321,217 B1 | | 11/2001 | Maeda et al. |
| 6,345,278 B1 | | 2/2002 | Hitchcock et al. |
| 6,356,880 B1 | * | 3/2002 | Goossens et al. ............... 705/30 |
| 6,360,211 B1 | | 3/2002 | Anderson et al. |
| 6,381,587 B1 | * | 4/2002 | Guzelsu ......................... 705/40 |
| 6,507,826 B1 | | 1/2003 | Maners |
| 6,519,568 B1 | | 2/2003 | Harvey et al. |
| 6,598,026 B1 | | 7/2003 | Ojha et al. |
| 6,615,166 B1 | * | 9/2003 | Guheen et al. .................. 703/27 |
| 6,629,081 B1 | * | 9/2003 | Cornelius et al. .............. 705/30 |
| 6,658,393 B1 | * | 12/2003 | Basch et al. ..................... 705/38 |
| 6,820,069 B1 | | 11/2004 | Kogan et al. |
| 6,829,595 B2 | * | 12/2004 | Justice ............................ 705/64 |
| 6,845,155 B2 | | 1/2005 | Elsey |
| 6,882,983 B2 | | 4/2005 | Furphy et al. |
| 6,889,196 B1 | * | 5/2005 | Clark .......................... 705/7.12 |
| 6,968,328 B1 | | 11/2005 | Kintzer et al. |
| 7,124,101 B1 | * | 10/2006 | Mikurak ........................ 705/35 |
| 7,130,807 B1 | * | 10/2006 | Mikurak ..................... 705/7.25 |
| 7,162,427 B1 | * | 1/2007 | Myrick et al. ................ 705/348 |
| 7,275,038 B1 | | 9/2007 | Weinstock et al. ............... 705/5 |
| 7,330,826 B1 | * | 2/2008 | Porat et al. ................... 705/26.3 |
| 7,349,868 B2 | * | 3/2008 | Tenorio ...................... 705/26.62 |
| 7,412,418 B2 | * | 8/2008 | Erbey et al. ..................... 705/40 |
| 7,440,909 B2 | * | 10/2008 | Puri et al. ..................... 705/7.37 |
| 7,451,106 B1 | | 11/2008 | Gindlesperger |
| 7,529,708 B2 | * | 5/2009 | Hogg et al. ..................... 705/37 |
| 7,539,637 B2 | * | 5/2009 | Gatto ......................... 705/36 R |
| 7,580,848 B2 | * | 8/2009 | Eder ........................... 705/7.11 |
| 7,644,020 B2 | * | 1/2010 | Borgeson et al. ............... 705/35 |
| 7,668,809 B1 | * | 2/2010 | Kelly et al. .................... 707/713 |
| 7,792,742 B1 | * | 9/2010 | Thomas et al. ................. 705/38 |
| 7,945,492 B1 | * | 5/2011 | Sun et al. ....................... 705/35 |
| 2001/0032166 A1 | * | 10/2001 | Ruffo et al. ..................... 705/37 |
| 2003/0018492 A1 | * | 1/2003 | Carlson ............................ 705/1 |
| 2003/0055815 A1 | | 3/2003 | Chender et al. |
| 2003/0078874 A1 | * | 4/2003 | Cope .............................. 705/37 |
| 2003/0154144 A1 | | 8/2003 | Pokorny et al. |
| 2004/0039720 A1 | | 2/2004 | Hodges et al. |
| 2006/0190544 A1 | * | 8/2006 | Chikirivao et al. ........... 709/206 |
| 2008/0126265 A1 | * | 5/2008 | Livesay et al. .................. 705/80 |
| 2012/0246556 A1 | * | 9/2012 | Chikirivao et al. ........... 715/234 |

FOREIGN PATENT DOCUMENTS

| | | | |
|---|---|---|---|
| WO | WO-00/16232 | * | 3/2000 |
| WO | WO 00/16232 | * | 3/2000 |
| WO | WO 00/38095 | | 6/2000 |
| WO | WO 01/50306 | * | 7/2001 |
| WO | 0167354 A1 | | 9/2001 |

OTHER PUBLICATIONS

Gupta et al., Decision Support Systems for Small Business, Journal of Systems Management; Feb. 1989: 40.2; AB/INFORM/Global p. 37.*

Dennis L. Prince, "Getting Started with SAP™ R/3™," copyrighted in 1998 by Prima Publishing, US.

Cary N. Prague and Michael R. Irwin, "Microsoft Access 2000 Bible," copyrighted in 1999 by IDG Books Worldwide, Inc., US.

Selected Excerpts from the SAP R/3 Online Help for R/3 version 4.5B, released in Mar. 1999.

Elaine Marmel, "Microsoft Project 2000 Bible," copyrighted in 2000 by IDG Books Worldwide, Inc., US.

Simon Sharpe, "10 Minute Guide to SAP R/3," copyrighted in 1997 by Que Corporation, US.

Grady Booch, "Object-Oriented Analysis and Design with Applications," Second Edition, copyrighted in 1994 by The Benjamin/Cummings Publishing Company, Inc., US.

M.J. Fear, N.C. Meany, J.M. Evans, "An Expert System for Drill Bit Selection," IADC/SPE Drilling Conference, published Feb. 15, 1994, US.

John Hedtke, "Peachtree Accounting for Windows Made Easy," copyrighted in 1995 by McGraw-Hill, Inc., US.

M. Zamora and M.A. Merchant, M-1 Drilling Fluids Co., "Optimized PC-Based Expert Systems," Petroleum Industry Application of Microcomputers, Jun. 23, 1987, US.

Oracle Payables User's Guide, Release 11i, vols. 1 and 2, p. 1-1391, Apr. 2000.

Oracle Purchasing User's Guide, Release 11i, vols. 1 and 2, p. 2-1279, Jan. 2000.

810 Invoice-3030 Purchase Order Acknowledgement, PIDX, V11-11-11.

810 Invoice-4010, PIDX, Oct. 1, 1997.

820 Payment Order/Remittance Advice, PIDX, Nov. 25, 1996.

832 Price/Sales Catalog, PIDX, Nov. 25, 1996.

856 AVNET Ship Notice/Manifest, PIDX, May 1996.

861 Receiving Advice/Acceptance Certificate (Meter Ticket), PIDX, May 1, 1998.

861 Receiving Advice/Acceptance Certificate (Net Ticket) Version 004, Release 010.

861 Receiving Advice/Acceptance Certificate (Pipeline Tank Car Ticket), PIDX, Nov. 24, 1999 (and later).

Accounts Payable Procedures Manual, Version 7.2.1 Apr. 1999, Lawson Software, Inc.

Accounts Receivable Procedures Manual, Version 7.2.0 Feb. 1999, Lawson Software, Inc.

Ann Freestone and Clinton Wilder, Online Procurement Takes Off, Information Week, Sep. 13, 1999, at 102.

Ariba PunchOut Implementation Guide, Ariba, Inc, Aug. 2000.

Ariba Technologies has new release of software for ORM, Purchasing, Feb. 12, 1996, at 116.

Billing Procedures Manual, Version 7.2.0 Feb. 1999, Lawson Software, Inc.

Cash Ledger Procedures Manual, Version 7.2.0 Feb. 1999, Lawson Software, Inc.

Clinton Wilder, Chervon to Conduct Online Procurement, Information Week, Apr. 27, 1998 at 30.

Cost Release 4.0B SAP AG, (Jun. 1998).

David-Michael Lincke, Evaluating Integrated Electronic Systems, Electronic Markets, vol. 8, No. 1, 1998 at 7.

Defendent Invalidity Contentions, Case No. 6:11-cv-401-LED-JDL dated Aug. 8, 2012.

DESADV Despatch Advice Message, May 1, 1996.

General Ledger Procedures Manual, Version 7.2.1 Apr. 1999, Lawson Software, Inc.

Inventory Control Procedures Manual, Version 7.2.1 Apr. 1999, Lawson Software Inc.

Invoice Matching Procedures Manual, Version 7.2.0 Feb. 1999, Lawson Software, Inc.

Matthew Nelson, Ariba taps XML for automated procurement, Infoworld, Oct. 5, 1998 at 8.

MM Invoice Verification and Material Valuation 4.0B, SAP AG, (Jun. 1998).

MM Logistics Invoice Verification Release 4.0B, SAP AG, (Jun. 1998).

MM Purchasing Release 4.0B, SAP, AG, (Jun. 1998).

Om Malik, Virtual Stationary, Forbes.com, Apr. 14, 1999 at http://www.forbes.com/1999/04/14/feat.html.

Oracle Internet Procurement Implementation Manual, Release 11i, (May 25, 2000).

(56) References Cited

OTHER PUBLICATIONS

Oracle Payables User's Guide, Release 11, vol. 1 & 2 (Mar. 1998).
Oracle Purchasing User's Guide, Release 11, vol. 1 & 2 (Mar. 1998).
Other published standards available at: Standards—PIDX, www.pidx.org/standards.htm.
Procurement 850 Purchase Order, Nov. 25, 1996.
Purchase Order Procedures Manual, Version 7.2.1 Apr. 1999, Lawson Software, Inc.
Report Writer Procedures Manual, Version 7.2.1 Apr. 1999, Lawson Software, Inc.
Requisitions Procedures Manual, Version 7.2.1 Apr. 1999, Lawson Software.
SAP R/3 System Release 4.0B—Documentation Print Files, http://help.sap.com/printdocu/core/Print40b/library.htm.
Stephen P. Magnum, Innovating the standard procurement system through electronic commerce technologies, Post Graduate Thesis, Apr. 17, 2000.
Susan Avery, Computers, Business Systems and Office Products, Purchasing, Jul. 11, 1996.
Terms Procedures Manual, Version 7.2.0 Feb. 1999, Lawson Software.
The Ariba ORMS Application Manages the Buying Process, IBM United States, (Jun. 6, 2000).
Warehouse Procedures Manual, Version 7.2.0 Feb. 1999, Lawson Software.
Wellogix Annouces Software Standards Compliance, Business Wire Apr. 24, 2002.
Work Order Procedures Manual, Version 7.2.1 Apr. 1999, Lawson Software.
Angel Abcede, EDI, Internet Connect as Data Goes Electronic, NPN, National Petroleum News, Oct. 1997.
Arjan T. Sadhwani and M.H. Sarhan, Electronic Systems Enhance JIT Operations, Management Accounting, Dec. 1987.
Charles E. Davis, Elizabeth B. Davis, and Lee Ann Moore, Oustsourcing the Procurement-through-Payables Process, Management Accounting, Jul. 1998.
Christopher Allen and Vivian Chow, Oracle Certified Professional Financial Applications Consultant Exam Guide, Oracle Press, Apr. 21, 2000.
Evaluated Receipts Settlement (ERS) and Tax Compliance, Steering Committee Task Force on EDI Audit and Legal Issues for Tax Administration, The Tax Executive, Sep.-Oct. 1998.
Mary S. Ludwig, Accounts Payable: A Guide to Running an Efficient Department, John Wiley & Sons, Inc., Dec. 18, 1998.
Steven M. Bragg, Accounting Best Practices, John Wiley & Sons, Inc., Aug. 20, 1999.
Steven M. Bragg, Just-in-Time Accounting, John Wiley & Sons, Inc., 1996.
Tool and Manufacturing Engineers Handbook, vol. IX, Society of Manufacturing Engineers, 1998.
Virendra Singhvi, Reengineer the Payables Process, Management Accounting, Mar. 1995.
Alexander Schaap, Evaluated Receipts Settlement in the Automotive Industry, ("Schaap"), Financial EDI, Corporate EFT User Perspectives, Sep. 1993.
Charles E. Davis & Kris Lonborg, X-Oil, Inc.: An Instructional Case in Internal Control for the Payables Cycle ("Davis et al."), Journal of Information Systems, Fall 1993.
Defendent First Amended Invalidity Contentions, Case No. 6:11-cv-401-LED-JDL dated Nov. 30, 2012.
Evaluated Receipts Settlement (ERS) and Tax Compliance ("ERS Tax"), Steering Committee Task Force on EDI Audit and Legal Issues for Tax Administration, The Tax Executive, Sep.-Oct. 1998.
Evaluated Reciept Settelement ERS Process ("ERS Process"), AISI OP Council, Nov. 1998.
FI Accounts Receivable and Accounts Payable, SAP AG, Jun. 1998.
Jack Barry, A Development Model for Effective MRO Procurement ("Barry"), Aug. 1996.
John R. Sivori, Evaluated and Settle at Bell Atlantic ("Sivori"), Jun. 1996.
Lawrence S. Gould, How ERP Systems Must Meet the Challenges of Automotive Suppliers ("Gould"), Automotive Manufacturing & Production, Nov. 1998.

\* cited by examiner

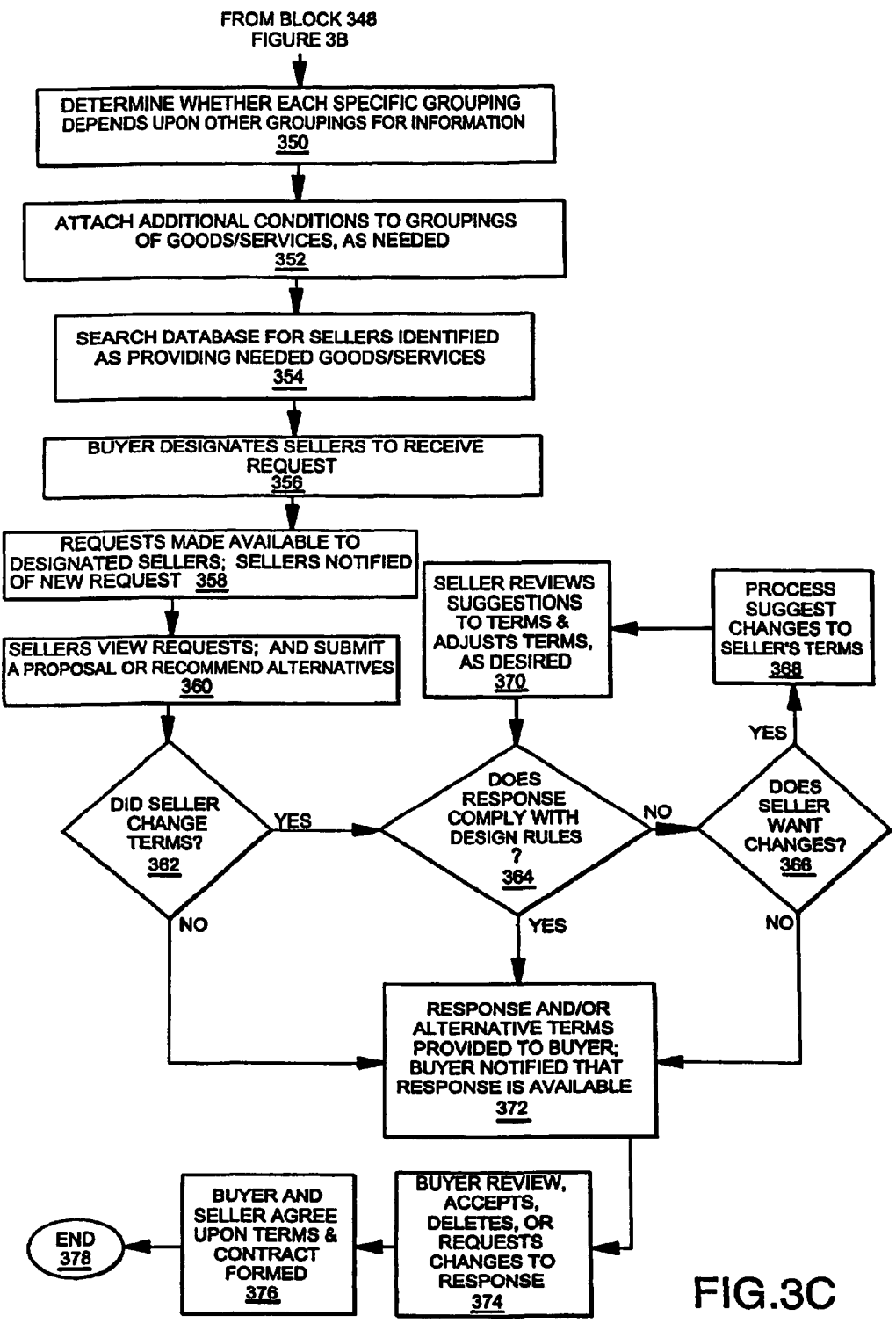

USER PROFILE

WELLOGIX — PLEASE UPDATE YOUR PERSONAL PROFILE INFORMATION BELOW AND CLICK THE SAVE BUTTON

- BID REQUEST SUMMARY
- ALL PROJECTS LIST
- PROFILE
  - [USER PROFILE ▼] [GO]
- PROJECTS
  - [▼]
  - [GO]
- FIND A CONSULTANT
- GIVE US FEEDBACK
- LOGOUT

| Field | Value |
|---|---|
| PREFIX: | MR ▼ |
| FIRST: | JOHN |
| MIDDLE INITIAL: | |
| LAST: | SMITH |
| LOGIN: | TECH |
| PASSWORD: | TECH |
| TITLE: | GLOBAL DRILLING ENGINEER |
| EMAIL ADDRESS: | |
| REGION & BASIN: | CANADA-ALBERTA / CANADA-BRITISH COLUMBIA |
| SPE NUMBER: | |
| LAST DEGREE: | MBA 2001 |
| YEAR GRADUATED: | 1980 |
| SPECIALTY: | DRILLING MECHANICS |
| NOTIFICATION PREFERENCE: | EMAIL ▼ |

[SAVE] [CANCEL] [RESET]

COPYRIGHT © 1999, 2000 WELLBID, INC. ALL RIGHTS RESERVED.
PATENT PENDING
"WELLOGIX" AND THE WELLOGIX LOGO ARE PROPRIETARY SERVICE MARKS OF WELLOGIX, INC.

FIG. 8B

Joint Interest Partner Maintenance

| Partner Client | Owner Name / Contact Name | Interest Percent | Phone no. | Email Address |
|---|---|---|---|---|
| AFE Number Number | | | | |
| 521 1002 | XYZ Operating | 49.00% | | |

WELLOGIX

- BID REQUEST SUMMARY
- ALL PROJECTS LIST
- PROFILE [ ▼ ] [GO]
- PROJECTS
  - SOUTH PASS 68 [ ▼ ]
  - [GO]
- PROJECT REQUEST
- WELLS [ ▼ ] [GO]
- FIND A CONSULTANT
- GIVE US FEEDBACK
- LOGOUT

ALL PROJECTS LIST > SOUTH PASS 68 - OFFSHORE PROJECT DETAILS

| Field | Value |
|---|---|
| PROJECT NAME | SOUTH PASS 68 |
| PROJECT DESCRIPTION | DEVELOPMENT DRILLING PROGRAM FOR YEAR 2000 |
| COUNTRY | UNITED STATES |
| REGION-BASIN | GOM-GULF COAST SALT DOME |
| STATE/PROVINCE | LOUISIANA |
| ACREAGE OWNERSHIP | OCSG |
| ESTIMATED START DATE | 15-SEP-2000 |
| ESTIMATED PROJECT DURATION | 180 DAYS |
| UNITS OF MEASURE | ENGLISH |

LOCATION OF SHORE BASE

| Field | Value |
|---|---|
| COUNTRY | UNITED STATES |
| STATE/PROVINCE | LOUISIANA |
| CITY OR TOWN | VENICE |
| DISTANCE TO PROJECT LOCATION | 20 MILES |

| Field | Value |
|---|---|
| AVG WATER DEPTH @ PROJECT LOCATION | 105 FT |
| PLATFORM FOR OPERATIONS | PLATFORM |
| SCOPE OF PROJECT | DRILL 3 DIRECTIONAL WELLS TO PENETRATE MULTIPLE HORIZONS AROUND THE XX SALT DOME. |

[EDIT/UPDATE PROJECT DETAIL] — 1006
[ADD WELL TO PROJECT] — 1008
[VIEW PROJECT USERS] — 1010
[VIEW WELLS FOR PROJE...] — 1012

1004

ALL PROJECTS LIST>SOUTH PASS 68>OFFSHORE PROJECT USERS 1014

1016

WELLOGIX

BID REQUEST SUMMARY
ALL PROJECTS LIST
PROFILE
[ ▼] [GO]
PROJECTS
[SOUTH PASS 68 ▼]
[GO]
PROJECT REQUEST
WELLS
[ ▼] [GO]
FIND A CONSULTANT
GIVE US FEEDBACK
LOGOUT

PROJECT USERS

| NAME | EMAIL | PHONE | PROJECT ROLE |
|---|---|---|---|
| JOHN SMITH(TECH) | INFO@WELLBID.COM | (303)300-3520 | OWNER |

ADD A USER TO THIS PROJECT

| USER | ROLE |
|---|---|
| BP AMOCO(BPAMOCO) ▼ | USER ▼ |

BP AMOCO(BPAMOCO)
MARK (TESTING)
LORNE (LBARTLEY)
WALTER (WBLISS)
DANE (BDANE)
ELIOT (COOPER)
SCOTT (SCOPE)
JIM (DANE)
JACK (JDOAK)
JOHN (BDEMO)
ALEX (IRINA)

WELLOGIX

BID REQUEST SUMMARY
ALL PROJECTS LIST
PROFILE
[ ▼ ] [GO]
PROJECTS
[YR2000 TENSLEEP PRO ▼]
[GO]
PROJECT REQUEST
WELLS
[DS5-15 ▼] [GO]
DETAILS
HOLE SECTIONS
[ ▼ ]
[GO]
FIND A CONSULTANT
GIVE US FEEDBACK
LOGOUT

SELECT A FEATURED VENDOR OR SUGGEST A VENDOR

| PREFER | COMPANY NAME | SALES PERSON |
|---|---|---|
| ☐ | BLACK WARRIOR WIRELINE CORP. | MARK ROBERTS |
| ☐ | BLACK WARRIOR WIRLINE CORP. | BOB MINYARD |
| ☐ | CARDINAL SURVEYS COMPANY | CHARLIE NEWSOM |

CH LOGGING (INCLUDING FORMATION/PRODUCTION LOGGING) & WL SERVICES

| REQUIREMENT NEEDS | | |
|---|---|---|
| CEMENT EVALUATION | YES ▼ | E-LINE ▼ |
| PRODUCTION AND LOGGING | NO ▼ | ▼ |
| FORMATION EVALUATION | NO ▼ | ▼ |
| CASING/TUBING INSPECTION | NO ▼ | ▼ |
| TIE IN RUNS | NO ▼ | ▼ |
| SET PACKERS/BP PLUGS | NO ▼ | ▼ |
| CLEANOUT FILL | NO ▼ | ▼ |

| LOGGING TOOLS/SERVICES REQUIRED | | FROM MD,FT | TO MD,FT |
|---|---|---|---|
| CASING COLLAR LOCATOR(CCL) | YES ▼ | 13294 | 12100 |
| GAMMA RAY(GR) | YES ▼ | 13294 | 12100 |
| TEMPERATURE | YES ▼ | 13294 | 12100 |
| CEMENT BOND | YES ▼ | 13294 | 12100 |

⋮

| DEPTH OF MAX HOLE ANGLE MD, FT | 3500 |
|---|---|
| LOGGING THRU CASING OR TUBING? | CASING ▼ |

CASING/TUBING

| OD SIZE, IN | WEIGHT, LB/FT | ID SIZE(DRIFT), IN | TOP MD-FT | BOTTOM,MD-FT | MINIMUM ID IN STRING, IN | DEPTH OF MIN ID, FT |
|---|---|---|---|---|---|---|
| 4.5 | 12.6 | 3.875 | 12033 | 13294 | 3.875 | |
| 7 | 29 | 6.059 | 0 | 12183 | 6.059 | |

ADD MORE LINES

COMMENTS
NEED TO EVALUATE A CEMENT JOB ACROSS A 4 1/2" LINER. MAX ANGLE OF WELL AND TANGENT SECTION OF WELL IS 43 DEGREES.

[SAVE FINAL] [SAVE DRAFT] [CANCEL] [DELETE] [RESET]

COPYRIGHT©1999, 2000 WELLBID, INC. ALL RIGHTS RESERVED.
PATENT PENDING
"WELLOGIX" AND THE WELLOGIX LOGO ARE PROPRIETARY SERVICE MARKS OF WELLOGIX, INC.

FIG.10E

WELLOGIX

(REQUEST #3754) CH LOGGING & WL SERVICES

BID REQUEST SUMMARY
ALL PROJECTS LIST
PROFILE
[  ] GO
PROJECTS
[YR2000 TENSLEEP PRO ▼]
GO
PROJECT REQUEST
WELLS
[DS5-15 ▼] GO
DETAILS
HOLE SECTIONS
[  ▼]
GO
FIND A CONSULTANT
GIVE US FEEDBACK
LOGOUT

| REQUEST TYPE: | AFE ESTIMATE |
| REPLY BY: | 01-JUL-00 |

| REQUESTED BY: | JOHN SMITH | OFFICE PHONE: | |
| TITLE: | GLOBAL DRILLING ENGINEER | FAX: | |
| COMPANY NAME: | BUYER SERVICES | E-MAIL: | |
| MAILING ADDRESS: | ADDRESS DENVER CO 80222 | REGION & BASIN: | ROCKIES-BIG HORN |

| PROJECT NAME: | YR2000 TENSLEEP PRO |
| REGION & BASIN: | ROCKIES-BIG HORN |
| COUNTRY: | USA |

| WELL NAME: | DS5-15 |
| WELL DESCRIPTION: | NEW TENSLEEP PRODUCER |

| TD MD, FT | 13294 |
| TD TVD, FT | 10729 |
| BHST DEG, F | 250 |
| WELLBORE FLUID WHILE LOGGING | BRINE |
| AVERAGE HOLE ANGLE, DEG | 43 |
| MAX HOLE ANGLE, DEG | 43 |
| DEPTH OF MAX HOLE ANGLE MD, FT | 3500 |
| LOGGING THRU CASING OR TUBING? | CASING |

CASING/TUBING

| OD SIZE, IN | WEIGHT, LBM/FT | ID SIZE (DRIFT) IN | TOP, MD FT | BOTTOM, MD FT | MINIMUM ID IN STRING, IN | DEPTH OF MIN ID, FT | TUBING TAIL DEPTH, FT |
|---|---|---|---|---|---|---|---|
| 4.5 | 12.6 | 3.875 | 12033 | 13294 | 3.875 | | |
| 7 | 29 | 6.059 | 0 | 12183 | 6.059 | | |

COMMENTS
NEED TO EVALUATE A CEMENT JOB ACROSS A 4 1/2" LINER. MAX ANGLE OF WELL AND TANGENT SECTION OF WELL IS 43 DEGREES.

CATEGORY ATTACHMENTS:
CASING SUMMARY          FILE ATTACHMENTS:
TUBING SUMMARY          NO FILE ATTACHED

[BACK]

COPYRIGHT © 1999, 2000 WELLBID, INC. ALL RIGHTS RESERVED.
PATENT PENDING
"WELLOGIX" AND THE WELLOGIX LOGO ARE PROPRIETARY SERVICE MARKS OF WELLOGIX, INC.

FIG.10F

REPLIES TO BID REQUESTS

| PROJECT NAME | WELL NAME | HOLE SECTION NAME | REQUEST/DETAIL TYPE | VENDOR | INTERESTED | FEEDBACK | RESPONSE DATE |
|---|---|---|---|---|---|---|---|
| YR2000 TENSLEEP PROJ | | | CASING | JOHN DOE | YES | YES | 29-MAY-2000 |
| YR2000 TENSLEEP PROJ | DSS-15 | | TUBING | JOHN DOE | YES | YES | 26-MAY-2000 |
| YR2000 TENSLEEP PROJ | DSS-15 | | CH LOGGING & WL SERVICES | JOHN DOE | YES | YES | 29-MAY-2000 |
| YR2000 TENSLEEP PROJ | DSS-15 | | COMPLETION PACKERS | JOHN DOE | YES | YES | 26-MAY-2000 |
| YR2000 TENSLEEP PROJ | DSS-15 | | ISOLATION TOOLS-BRIDGE PLUGS | JOHN DOE | YES | YES | 26-MAY-2000 |
| YR2000 TENSLEEP PROJ | DSS-15 | | ISOLATION TOOLS-RETRIEVABLE PACKERS | JOHN DOE | YES | YES | 26-MAY-2000 |
| YR2000 TENSLEEP PROJ | DSS-15 | | LOCATION | JOHN DOE | YES | YES | 26-MAY-2000 |
| YR2000 TENSLEEP PROJ | DSS-15 | | PUMPING UNIT | JOHN DOE | YES | YES | 26-MAY-2000 |
| YR2000 TENSLEEP PROJ | DSS-15 | | RAT/MOUSE HOLE | JOHN DOE | YES | YES | 26-MAY-2000 |

WELLOGIX  VENDOR INFO

BID REQUEST SUMMARY
ALL PROJECTS LIST
PROFILE
[dropdown]
PROJECTS
[dropdown]

| REPLIED BY: | JOHN DOE | OFFICE PHONE: | 303 300 3520 |
|---|---|---|---|
| TITLE: | | FAX: | UNKNOWN |
| COMPANY NAME: | WELLBID VENDOR SERVICES | E-MAIL: | HURST@WELLBID.COM |
| MAILING ADDRESS: | 4155 EAST JEWELL AVE. STE. 225 DENVER CO 80222 | REGION & BASIN: | GOM-GULF COAST SALT DOME GOM-RIO GRANDE EMBAYMENT GULF STATES-SOUTH LOUISIANA ROCKIES-BIG HORN |

[BACK]

FIND A CONSULTANT
GIVE US FEEDBACK
LOGOUT

COPYRIGHT©1999, 2000 WELLBID, INC. ALL RIGHTS RESERVED.
PATENT PENDING
"WELLOGIX" AND THE WELLOGIX LOGO ARE PROPRIETARY SERVICE MARKS OF WELLOGIX, INC.

FIG. 12B

VENDOR FEEDBACK

⟵ 1212

| PROJECT NAME | WELL NAME | HOLE SECTION NAME | BID REQUEST/DETAIL TYPE CASING | VENDOR | RESPONSE DATE |
|---|---|---|---|---|---|
| YR2000 TENSLEEP PROJ | | | | JOHN DOE | 29-MAY-2000 |

| COMMENTS: |
|---|
| WHERE DO YOU WANT THIS TO BE DELIVERED? |

[BACK] ⟵ 1214

WELLOGIX

BID REQUEST SUMMARY
ALL PROJECTS LIST
PROFILE
[ ▼ ] [GO]
PROJECTS
[YR2000 TENSLEEP PROJ ▼]
[GO]
PROJECT REQUEST
WELLS
[ ▼ ] [GO]
FIND A CONSULTANT
GIVE US FEEDBACK
LOGOUT

COPYRIGHT© 1999, 2000 WELLBID, INC. ALL RIGHTS RESERVED.
PATENT PENDING
"WELLOGIX" AND THE WELLOGIX LOGO ARE PROPRIETARY SERVICE MARKS OF WELLOGIX, INC.

FIG. 12C

ALL PROJECTS

VIEW PROJECTS BY ESTIMATED START DATE [01]

← 1300

| SEQUENCE | NAME | REGION-BASIN | COUNTRY | STATUS | YOUR ROLE |
|---|---|---|---|---|---|
| 1 | YR2000 TENSLEEP PROJ | ROCKIES-BIG HORN | UNITED STATES | NEW | OWNER |
| 2 | SOUTH PASS 68 | GOM-GULF COAST SALT DOME | UNITED STATES | NEW | OWNER |
| 3 | DWT 700 | GOM-RIO GRANDE EMBAYMENT | UNITED STATES | NEW | OWNER |
| 4 | NAME YOUR PROJECT | GOM-GULF COAST SALT DOME | UNITED STATES | NEW | OWNER |
| 5 | TEST | GOM-RIO GRANDE EMBAYMENT | UNITED STATES | NEW | OWNER |
| 6 | FRED | | | NEW | OWNER |
| 7 | JTK PROJECT | ROCKIES-DENVER-JULESBURG | UNITED STATES | NEW | OWNER |
| 8 | NAME YOUR PROJECT | | | NEW | OWNER |
| 9 | JOHN'S PROJECT | ROCKIES-BIG HORN | UNITED STATES | NEW | OWNER |

[ CREATE ONSHORE PROJECT ]  [ CREATE OFFSHORE PROJECT ] ← 1304

1302

COPYRIGHT©1999, 2000 WELLBID, INC. ALL RIGHTS RESERVED.
PATENT PENDING
"WELLOGIX" AND THE WELLOGIX LOGO ARE PROPRIETARY SERVICE MARKS OF WELLOGIX, INC.

FIG.13

☆ WELLOGIX

ALL PROJECTS LIST>JOHN'S PROJECT-ONSHORE PROJECT DETAILS ← 1400

BID REQUEST SUMMARY
ALL PROJECTS LIST
PROFILE
[ ▼ ] [GO]
PROJECTS
[JOHN'S PROJECT ▼]
[GO]
PROJECT REQUEST
WELLS
[ ▼ ] [GO]
DETAILS
FIND A CONSULTANT
GIVE US FEEDBACK
LOGOUT

| | |
|---|---|
| PROJECT NAME: | JOHN'S PROJECT |
| PROJECT DESCRIPTION: | DEMO OF SOFTWARE |
| NUMBER OF DEVELOPMENT WELLS: | 0 |
| NUMBER OF EXPLORATORY WELLS: | 0 |
| NO. OF RIGS REQUIRED IN PROJECT: | 1 |
| NUMBER OF PROJECT REQUESTS: | 0 |
| COUNTRY: | UNITED STATES |
| REGION & BASIN: | ROCKIES-BIG HORN |
| ESTIMATED PROJECT START DATE: | 24-SEP-00 |
| UNITS OF MEASURE: | ENGLISH |

[EDIT/UPDATE PROJECT PROFILE] [ADD WELL TO PROJECT] [VIEW PROJECT USERS] [VIEW WELLS FOR PROJECT]
       1404                          1406              1408              1410

COPYRIGHT©1999, 2000 WELLBID, INC. ALL RIGHTS RESERVED.
PATENT PENDING
"WELLOGIX" AND THE WELLOGIX LOGO ARE PROPRIETARY SERVICE MARKS OF WELLOGIX, INC.

FIG.14B

WELLOGIX

ALL PROJECTS LIST>JOHN'S PROJECT>NEW WELL2-WELL SUMMARY  ← 1414

BID REQUEST SUMMARY
ALL PROJECTS LIST
PROFILE
[ ▼] [GO]
PROJECTS
[JOHN'S PROJECT ▼]
[GO]
PROJECT REQUEST
WELLS
[NEW WELL2 ▼] [GO]
DETAILS
HOLE SECTIONS
[ ▼]
[GO]
FIND A CONSULTANT
GIVE US FEEDBACK   1416
LOGOUT

| | |
|---|---|
| PROJECT NAME | JOHN'S PROJECT |
| WELL NAME | NEW WELL2 |
| WELL DESCRIPTION | TEST |
| EST SPUD/START DATE | |
| WELL API NUMBER | |
| WELL TYPE | EXISTING |
| REGION/BASIN | ROCKIES-DENVER-JULESBURG |
| COUNTY | |
| STATE/PROVINCE | COLORADO |
| FIELD | |
| BLOCK | |
| SURVEY | |
| ABSTRACT | |
| SURFACE HOLE LOCATION | |
| WELL LOCATION IS (MILES) | 12N |
| OF (NEAREST TOWN/CITY) | DENVER |

| EDIT/UPDATE WELL DETAIL | VIEW BID REQUESTS |
|---|---|
| 1420 — WELL DESCRIPTION/HISTORY | |

COPYRIGHT©1999, 2000 WELLBID, INC. ALL RIGHTS RESERVED.
PATENT PENDING
"WELLOGIX" AND THE WELLOGIX LOGO ARE PROPRIETARY SERVICE MARKS OF WELLOGIX, INC.

FIG.14D

♛ WELLOGIX
BID REQUEST SUMMARY
ALL PROJECTS LIST
PROFILE
[ ▼] [GO]
PROJECTS
[JOHN'S PROJECT ▼]
[GO]
PROJECT REQUEST
WELLS
[NEW WELL2 ▼] [GO]
DETAILS
HOLE SECTIONS
[ADD A NEW HOLE SECTION ▼]
[GO]
FIND A CONSULTANT
GIVE US FEEDBACK
LOGOUT

HOLE SECTION DETAILS ← 1418
PLEASE UPDATE THE HOLE SECTION DETAILS AND CLICK THE SAVE BUTTON.

NAME: [CONDUCTOR ▼]
DESCRIPTION: [TEST]
HOLE DIAMETER, IN.: [10]
CASING DIAMETER, IN.: [15]
TOP MD, FT.: [100]
BOTTOM MD, FT.: [1000]
TOP TVD, FT.: [50]
BOTTOM TVD, FT.: [5000]

[ SAVE ]  [ CANCEL ]  [ RESET ]

COPYRIGHT © 1999, 2000 WELLBID, INC. ALL RIGHTS RESERVED.
PATENT PENDING
"WELLOGIX" AND THE WELLOGIX LOGO ARE PROPRIETARY SERVICE MARKS OF WELLOGIX, INC.

| | (REQUEST #4328) PRIMARY CEMENTING | |
|---|---|---|
| WELLOGIX | REQUEST TYPE: CURRENT CONTRACT PRICING | |
| | REPLY BY: | |
| PROFILE | REQUESTED BY: ROBERT T DE JONG | OFFICE PHONE: (303) 3003520-250 |
| [ ▼] GO | TITLE: | FAX: UNKNOWN |
| SERVICES PROVIDED | COMPANY NAME: COMPANY #1 | E-MAIL: DEJONG@WELLBID.COM |
| SEARCH REQUESTS | MAILING ADDRESS: 4155 E JEWELL AV SUITE 300 DENVER CO 80222 | REGION & BASIN: CANADA-ALBERTA<br>CANADA-BRITISH COLUMBIA<br>CANADA-EASTERN CANADIAN OFFSHORE<br>CANADA-FAR NORTH<br>CANADA-SASKATCHEWAN<br>GOM-APALACHICOLA<br>GOM-GULF COAST SALT DOME<br>GOM-RIO GRANDE EMBAYMENT<br>GULF STATES-BLACK WARRIOR<br>GULF STATES-CENTRAL TEXAS<br>GULF STATES-EAST TEXAS<br>GULF STATES-NORTH LUISIANA<br>GULF STATES-PERMIAN<br>GULF STATES-SOUTH LOUISIANA<br>GULF STATES-SOUTH TEXAS<br>MID-CON-ANADARKO<br>MID-CON-ARDMORE<br>MID-CON-ARKOME<br>MID-CON-DELHART<br>MID-CON-HUGOTON<br>MID-CON-KANSASNEBRASKA<br>NORTHEASTERN-APPALACHIA<br>NORTHEASTERN-ILLINOIS<br>NORTHEASTERN-MICHIGAN<br>PACIFIC-COOK INLET<br>PACIFIC-SACRAMENTO<br>PACIFIC-NORTH SLOPE<br>PACIFIC-SAN JOAQUIN<br>ROCKIES-BIG HORN |
| REQUEST INBOX | | |
| FIND A CONSULTANT | | |
| GIVE US FEEDBACK | | |
| LOGOUT | | |

| PROJECT NAME: | PL PROJECT |
|---|---|
| REGION & BASIN: | ROCKIES-GREEN RIVER |
| COUNTRY: | USA |

| WELL NAME: | FEDERAL STATE 5-10-1 |
|---|---|
| WELL DESCRIPTION: | DRILL AND COMPLETE A DAKOTA PRODUCER |
| EST SPUD/START DATE: | 01-NOV-2000 |
| WELL API NUMBER: | 51-23-23598-60 |
| WELL TYPE: | NEW |
| REGION & BASIN: | ROCKIES-BIG HORN |
| COUNTRY: | UNITED STATES |
| STATE/PROVINCE: | WYOMING |
| COUNTY: | EVANSTON, WYOMING |
| FIELD: | FEDERAL STATE FIELD |
| BLCOK: | |
| SURVEY: | |
| ABSTRACT: | |
| SURFACE LOCATION: | @3855' FNL,107' FEL,SEC 8,T9,R20,8500FT,UM |
| WELL LOCATION IS: | 56 MILES N |
| OF (NEAREST/CITY): | EVANSTON |

| COMMENTS | IF YOU HAVE IDEAS ON HOW WE CAN DO AWAY WITH A 2 STAGE JOB,I WILL BE WILLING TO ENTERTAIN THEM |
|---|---|
| CASING PROGRAM | |

FIG.15A

| COMMENTS | IF YOU HAVE IDEAS ON HOW WE CAN DO AWAY WITH A 2 STAGE JOB, I WILL BE WILLING TO ENTERTAIN THEM |

| CASING PROGRAM | | | | | | | | | | |
|---|---|---|---|---|---|---|---|---|---|---|
| HOLE SECTION | HOLE DIAMETER, IN | CASING SIZE, IN | WEIGHT LB/FT | GRADE | THREADS | TOP MD,FT | BOTTOM MD,FT | LENGTH MD,FT | TOP TVD,FT | BOTTOM TVD,FT |
| CONDUCTOR | 24 | 20 | 91.1 | H-40 | WELD | 37 | 116 | 79 | 37 | 116 |
| SURFACE | 12.25 | 9.625 | 40 | L-80 | BTC | 35 | 5219 | 5184 | 35 | 4554 |
| INTERMEDIATE 1 | 8.5 | 7 | 29 | USS-95 | BTC-MOD | 33 | 12183 | 12150 | 33 | 9854 |
| PRODUCTION | 6 | 4.5 | 12.6 | L-80 | BTC-MOD | 12033 | 13294 | 1261 | 9744 | 10729 |

| HOLE SECTION:CONDUCTOR | | | | | | | |
|---|---|---|---|---|---|---|---|
| HOLE DIAMETER IN | TOP MD,FT | BOTTOM MD,FT | LENGTH MD,FT | TOP TVD,FT | BOTTOM TVD,FT | LENGTH TVD,FT | MUD TYPE | MAX MW, PPG |
| 24 | 37 | 116 | 79 | 37 | 116 | 79 | | |

| HOLE SECTION:SURFACE | | | | | | | |
|---|---|---|---|---|---|---|---|
| HOLE DIAMETER IN | TOP MD,FT | BOTTOM MD,FT | LENGTH MD,FT | TOP TVD,FT | BOTTOM TVD,FT | LENGTH TVD,FT | MUD TYPE | MAX MW, PPG |
| 12.25 | 116 | 5219 | 5103 | 116 | 4554 | 4438 | SPUD MUD | 9.8 |

| GEOLOGICAL ISSUES WITHIN HOLE SECTION | | | |
|---|---|---|---|
| H2S IN HOLE SECTION | CONCENTRATION,PPM | MIN DEPTH OF H2S MD,FT | |
| ☐ | | | |
| PENETRATE SALT IN HOLE SECTION | TOP OF SALT SECTION MD,FT | THICKNESS OF SALT SECTION MD,FT | SALT SECTION FLOWING |
| ☐ | | | ☐ |
| GAS MIGRATION PROBLEMS EXPECTED | TOP OF GAS ZONE MD,FT | PRESSURE@DEPTH,PSI | DESIRED TECHNIQUE |
| ☐ | | | |
| MIN FRAC GRADIENT(1),PPG | DEPTH OF FRAC GRADIENT(1) MD,FT | MIN FRAC GRADIENT (2), PPG | DEPTH OF FRAC GRADIENT (2) MD,FT |

| 1ST STAGE |
|---|
| NUMBER OF FLUSHES IN STAGE 1 | 1 | NUMBER OF FLUSHES IN STAGE 1 | 1 |

| FLUSH/SPACERS | NAME | VOLUME,BBL | DENSITY,PPG |
|---|---|---|---|
| PREFLUSH | FRESH WATER | 300 | 8.3 |

| CEMENT SLURRY NO. 1 | TAIL 1 | | TYPE | LIQUID | |
|---|---|---|---|---|---|
| TOP OF SLURRY MD,FT | BOTTOM OF SLURRY MD,FT | TOP OF SLURRY TVD,FT | BOTTOM OF SLURRY TVD,FT | | |
| 0 | 5219 | 0 | 4554 | | |
| OH EXCESS REQUIRED,% | CH EXCESS REQUIRED,% | MAX DENSITY, PPG | DESIRED FL, CC/30MINE | BHST,F | BHCT,F |
| 25 | 0 | 12.4 | 50 | 110 | |
| 12-HR COMP STRENGTH,PSI | 24-HR COMP STRENGTH,PSI | ULT STRENGTH, PSI | EST THICKENING TIME,HR | TRANSITION TIME,MIN | |
| 1500 | 2500 | 2600 | 4 | | |

| PUMPING REQUIREMENTS FOR THIS STAGE | | |
|---|---|---|
| MAX SLURRY MIXING RATE,BPM | MAX SLURRY PUMPING RATE,BPM | MAX SLURRY DISPLACEMENT RATE,BPM |
| 25 | 25 | 25 |

| HOLE SECTION:INTERMEDIATE 1 | | | | | | | |
|---|---|---|---|---|---|---|---|
| HOLE DIAMETER IN | TOP MD,FT | BOTTOM MD,FT | LENGTH MD,FT | TOP TVD,FT | BOTTOM TVD,FT | LENGTH TVD,FT | MUD TYPE | MAX MW, PPG |
| 8.5 | 5219 | 12183 | 6964 | 4554 | 9854 | 5300 | KCL POLYMER | 10 |

| HOLE SECTION:PRODUCTION | | | | | | | |
|---|---|---|---|---|---|---|---|
| HOLE DIAMETER IN | TOP MD,FT | BOTTOM MD,FT | LENGTH MD,FT | TOP TVD,FT | BOTTOM TVD,FT | LENGTH TVD,FT | MUD TYPE | MAX MW, PPG |
| 6 | 12183 | 13294 | 1111 | 9854 | 10729 | 875 | KCL POLYMER | 12.4 |

CATEGORY ATTACHMENTS: THERE ARE NO ATTACHMENTS.

FILE ATTACHMENTS: 200000105 TIME VS DEPTH CURVE.XIS(17.00KB)

[INTERESTED] [NOT INTERESTED] [SUBMIT BID/PROPOSAL]

SUBMIT BID FEEDBACK

[CLEAR] [RESET] [SUBMIT]

COPYRIGHT©1999, 2000 WELLBID, INC. ALL RIGHTS RESERVED.
PATENT PENDING
"WELLOGIX" AND THE WELLOGIX LOGO ARE PROPRIETARY SERVICE MARKS OF WELLOGIX, INC.

WELLOGIX

PROFILE
[ ▼ ] GO
SERVICES PROVIDED
SEARCH REQUESTS
REQUEST INBOX

FIND A CONSULTANT
GIVE US FEEDBACK
LOGOUT

PRIMARY CEMENTING-COMMERCIAL RESPONSE

HOLE SECTION:SURFACE

| HOLE DIAMETER, IN | TOP MD,FT | BOTTOM MD,FT | LENGTH MD,FT | TOP TVD,FT | BOTTOM TVD,FT | LENGTH TVD,FT | MUD TYPE | MAX MW, PPG |
|---|---|---|---|---|---|---|---|---|
| 12.25 | 116 | 5219 | 5103 | 116 | 4554 | 4438 | SPUD MUD | 9.8 |

RELEVANT CASING PROGRAM

| HOLE SECTION | HOLE DIAMETER, IN | CASING SIZE,IN | WEIGHT LB/FT | GRADE | THREADS | TOP MD,FT | BOTTOM MD,FT | LENGTH MD,FT | TOP TVD,FT | BOTTOM TVD,FT |
|---|---|---|---|---|---|---|---|---|---|---|
| CONDUCTOR | 24 | 20 | 91.1 | H-40 | WELD | 37 | 116 | 79 | 37 | 116 |
| SURFACE | 12.25 | 9.625 | 40 | L-80 | BTC | 35 | 5219 | 5184 | 35 | 4554 |

GEOLOGICAL ISSUES WITHIN HOLE SECTION

| H2S IN HOLE SECTION | CONCENTRATION,PPM | MIN DEPTH OF H2S MD,FT | |
|---|---|---|---|
| ☐ | | | |
| PENETRATE SALT IN HOLE SECTION | TOP OF SALT SECTION MD,FT | THICKNESS OF SALT SECTION MD,FT | SALT SECTION FLOWING |
| ☐ | | | ☐ |
| GAS MIGRATION PROBLEMS EXPECTED | TOP OF GAS ZONE MD,FT | PRESSURE@DEPTH,PSI | DESIRED TECHNIQUE |
| ☐ | | | |
| MIN FRAC GRADIENT(1),PPG | DEPTH OF FRAC GRADIENT(1) MD,FT | MIN FRAC GRADIENT (2), PPG | DEPTH OF FRAC GRADIENT (2) MD,FT |

1ST STAGE

| FLUSH/SPACERS | NAME | VOLUME,BBL | DENSITY,PPG |
|---|---|---|---|
| PREFLUSH | FRESH WATER | 300 | 8.3 |

FLUSH COMMENTS

| CEMENT SLURRY NO.1 | TAIL 1 | TYPE | LIQUID |
|---|---|---|---|
| RECIPE DESCRIPTION | | | |
| TOP OF SLURRY MD,FT | BOTTOM OF SLURRY MD,FT | VOLUME,BBL | |
| 0 | 5219 | | |
| MAX DENSITY,PPG | DESIRED FL,CC/38MINS | TRANSITION TIME,MIN | |
| 12.4 | 50 | | |
| EST THICKENING TIME,HR | BHST,F | BHCT,F | |
| 4 | 110 | | |

STAGE 1 COMMENTS

FIG.15G

| | |
|---|---|
| TOTAL FLUSH/SPACER COST, $ | |
| TOTAL FLUSH/SPACER VOLUME, BBL | 300 |
| TOTAL FLUSH/SPACER UNIT COST, $/BBL | |
| | |
| TOTAL SLURRIES COST, $ | |
| TOTAL SLURRIES VOLUME, BBL | 0 |
| TOTAL SLURRIES UNIT COST, $BBL | |
| | |
| PUMPING & MIXING EQUIPMENT COST, $ | |
| TECH SUPPORT COST, $ | |
| TECH MONITORING COST, $ | |
| TRANSPORTATION COST, $ | |
| HANDLING COST, $ | |
| OTHER, $ | |
| | |
| ESTIMATED JOB HOURS | |
| STAND BY HOURLY RATE, $HR | |
| | |
| PUMPING & MIXING EQUIPMENT COST, $ | |
| TECH SUPPORT COST, $ | |
| TECH MONITORING COST, $ | |
| TRANSPORTATION COST, $ | |
| HANDLING COST, $ | |
| OTHER, $ | |
| | |
| ESTIMATED JOB HOURS | |
| STAND BY HOURLY RATE, $HR | |
| | |
| TOTAL HOLE SECTION COST, $ | |
| TOTAL VOLUME (SLURRIES ONLY), BBL | 0 |
| TOTAL HOLE SECTION UNIT COST, $BBL | |

[STATUS] [NOT YET SAVED]

[SAVE DRAFT] [SAVE FINAL] [RESET]

GO TO BASIC BID PRICING

COPYRIGHT©1999, 2000 WELLBID, INC. ALL RIGHTS RESERVED.
PATENT PENDING
"WELLOGIX" AND THE WELLOGIX LOGO ARE PROPRIETARY SERVICE MARKS OF WELLOGIX, INC.

Stimulation > Detailed Feedback

Application Home    MyWellogix

WELLOGIX    Logout

| Original | | Feedback | Link to Product Info? |
|---|---|---|---|
| | | | http://www.oilprod.com  1622 |
| Required Stimulation Program | Acid Job | Hydraulic Fracturing | |
| No. of Stages Required | 2 | 1 | |
| Purpose of Stimulation Well/ Comments? | Well is completed to produce from the "B" sands. The "B" reservoir is a tight rock formation. As a result, the well needs to be stimulated.  Successful stimulation jobs for this area have typically included the following operations:  Acid/Perf Breakdown/Flowback  Hydraulic Fracturing | | |
| Comments | This well was recently drilled and completed; the well is already perfed, but needs an acid/perf breakdown job followed by two stage frac job. | | |

Stimulation > Detailed Feedback

| | Original | Feedback | Link to Product Info? | Feedback |
|---|---|---|---|---|
| Required Stimulation Program | Acid Job | Hydraulic Fracturing ◈  1644a | ⊞ | Acid/Perf Breakdown ◈  1644b |
| No. of Stages Required | 2 | 1 ◈ | ⊞ | 1 ◈ |
| Purpose of Stimulation Well/ Comments? | Well is completed to produce from the "B" sands. The "B" reservoir is a tight rock formation. As a result, the well needs to be stimulated.  Successful stimulation jobs for this area have typically included the following operations:  Acid/Perf Breakdown/Flowback | | ⊞ | |

1640

1642a — Feedback
1642b — Feedback

| | following is what has worked best in the past | 1646a | | 1646b |
|---|---|---|---|---|
| Desired Fluid Type? | HCL | | ⊞ | HCL |
| Desired Concentration? | 7 | | ⊞ | 8 |
| Surfactant Required | No | No ▸ | ⊞ | No ▸ |
| Non-Stimulator Required? | No | No ▸ | ⊞ | No ▸ |
| Iron Control Required | Yes | No ▸ | ⊞ | Yes ▸ |
| Inhibition Duration, Hr | 2 | 3 | ⊞ | 2 |
| Inhibition Temperature, Deg f | 180 | 185 | ⊞ | 175 |
| Diameter of Balls, in | .25 | 3 | ⊞ | .25 |
| Density of Balls, SG | 1.2 | 1.1 | ⊞ | 1.2 |
| Number of Balls Required | 250 | 270 | ⊞ | 250 |
| Ball Type | Rubber | Rubber ▸ | ⊞ | Rubber ▸ |
| Selective Injection | Yes | No ▸ | ⊞ | No ▸ |

FIG. 16F

Stimulation Request > Detailed Feedback

Application Home  MyWellogix  ⟁WELLOGIX  Logout

1654 ⟶

| | Original | Feedback<br>1656a | Link to Product Info? | Feedback 1 2 4<br>1656b |
|---|---|---|---|---|
| Required Stimulation Program | Acid Job | Hydraulic Fracturing ◇ | ⊞ | Acid/Perf Breakdown ◇ |
| No. of Stages Required | 2 | 1 ◇ | ⊞ | 1 ◇ |
| Purpose of Stimulation Well/ Comments? | Well is completed to produce from the "B" sands. The "B" reservoir is a tight rock formation. As a result, the well needs to be stimulated.<br><br>Successful stimulation jobs for this area have typically included the following operations:<br><br>Acid/Perf Breakdown/Flowback | | ⊞ | |

FIG. 16H

Stimulation Request > Bid Comparator

1662a — Wellogix Service Provider | 1662b — Wellogix Service Provider

| Service Request | 4236 | Wellogix Service Provider | Wellogix Service Provider |
|---|---|---|---|
| Delivery Charges | | $155410.56 | $159780 |
| Setup Charges | | $9000 | $7200 |
| Service Charges | | $0 | $1600 |
| Product Charges | | $16000 | $22500 |
| Equipment Charges | | $78470.56 | $93480 |
| | | 42360  Scenario Planning —1664 | $45200  Scenario Planning —1664 |

| Item # | Desc. | Qty. | Units of Measure | Unit Price | Back Price | Disc. % | Amnt | Qty. | Units of Measure | Unit Price | Back Price | Disc. % | Amnt |
|---|---|---|---|---|---|---|---|---|---|---|---|---|---|
| 05 | Pumping charges | 2000 | EACH | 15 | 30000 | 20 | 24000 | 2000 | EACH | 15 | 30000 | 20 | 24000 |
| 06 | Blending charges | 15 | EACH | 1500 | 22500 | 20 | 18000 | 15 | EACH | 1500 | 22500 | 20 | 18000 |
| Item SC-8 | Additional Equipment | 4 | DAY | 100 | 400 | 0 | 360 | 4 | DAY | 100 | 4000 | 20 | 3200 |
| | Comments | | | | | | | Comments | | | | | |

| Third Party Charges | | $0 | $0 |
| Taxes And Fees | | $9940 | $10000 |
| | 4271 | $0 | $0 |
| | 4278 | $0 | $0 |
| Pricing | | 155410.56 | 159720 |
| View Details | | Details | Details |

Stimulation Request > Bid Comparator — 1660

Application Home

| Service Request | Wellogix Service Provider | Wellogix Service Provider | Wellogix Service Provider |
|---|---|---|---|
| 4236 ☐ | $155410.56 | | $159780 |
| Delivery Charges ☐ | $9000 | | $7200 |
| Setup Charges ☐ | $0 | | $1600 |
| Service Charges ☐ | | | |
| Product Charges ☐ | | | |
| Equipment Charges | | | |

**Storyboards (Storyboards/Index.html*)** — 1666

Which variable would you like to base your plan on? (Choose one) — 1668

○ Quantity
○ Unit Price
○ Discount

[Submit]

Scenario Planning

| Unit Price | Back Price | Disc. % | Amnt |
|---|---|---|---|
| 5 | 30000 | 20 | 24000 |
| 500 | 22500 | 20 | 18000 |
| 00 | 4000 | 20 | 3200 |

| Item # | Desc. | | | |
|---|---|---|---|---|
| 05 | Pumping charg | | | |
| 06 | Blending charg | | | |
| Item SC-8 | Additional Equi | | | |

| Third Party Charges | | | |
|---|---|---|---|
| Taxes And Fees | | | |
| 4271 ☐ | $0 | | $0 |
| 4278 ☐ | $0 | | $0 |
| Pricing ☐ | 155410.56 | | 159720 |
| View Details | Details | | Details |

FIG. 16J

Stimulation Request > Bid Comparator

Application Home — WELLOGIX — Logout

1660

| Service Request | | | Wellogix Service Provider | Wellogix Service Provider |
|---|---|---|---|---|
| 4236 | ☐ | ⊡ | $155410.56 | $159780 |
| Delivery Charges | ☐ | ⊡ | $9000 | $7200 |
| Setup Charges | ☐ | ⊡ | $0 | $1600 |
| Service Charges | | | | |
| Product Charges | | | | |
| Equipment Charges | | | | |

Storyboards (Storyboards/Index .html*) ⊡ ⊟

Which variable would you like to base your plan on? (Choose one)

- ⦿ Quantity     Change to [10] — 1670
- ○ Unit Price
- ○ Discount

[Submit]

Scenario Planning — 1666

| Unit Price | Back Price | Disc. % | Amnt |
|---|---|---|---|
| 5 | 30000 | 20 | 24000 |
| 500 | 22500 | 20 | 18000 |
| 00 | 4000 | 20 | 3200 |

| Item # | Desc. |
|---|---|
| 05 | Pumping charg |
| 06 | Blending charg |
| Item SC-8 | Additional Equi |

| Third Party Charges | ☐ | ⊡ | $0 | $0 |
|---|---|---|---|---|
| Taxes And Fees | | | | |
| 4271 | ☐ | ⊡ | $0 | $0 |
| 4278 | ☐ | ⊡ | $0 | $0 |
| Pricing | ☐ | ⊡ | 155410.56 | 159720 |
| View Details | | | Details | Details |

FIG. 16K

Stimulation Request > Bid Comparator

Application Home — WELLOGIX — Logout

1660

| Service Request | | | Wellogix Service Provider | Wellogix Service Provider |
|---|---|---|---|---|
| 4236 | ☐ 🗎 | | $155410.56 | $159780 |
| Delivery Charges | ☐ 🗎 | | $9000 | $7200 |
| Setup Charges | ☐ 🗎 | | $0 | $1600 |
| Service Charges | ☐ 🗎 | | $16000 | $22500 |
| Product Charges | ☐ 🗎 | | $78470.56 | $93480 |
| Equipment Charges | ☐ 🗎 | | 42360 | $45200 |

Scenario Planning (1672a)

| Item # | Desc. | Qty. | Units of Measure | Unit Price | Back Price | Disc. % | Amnt |
|---|---|---|---|---|---|---|---|
| 05 | Pumping charges | 2000 | EACH | 15 | 30000 | 20 | 24000 |
| 06 | Blending charges | 15 | EACH | 1500 | 22500 | 20 | 18000 |
| Item SC-8 | Additional Equipment | 4 | DAY | 100 | 400 | 0 | 360 |

Comments

Scenario Planning (1672b)

| Qty. | Units of Measure | Unit Price | Back Price | Disc. % | Amnt |
|---|---|---|---|---|---|
| 2000 | EACH | 15 | 30000 | 20 | 24000 |
| 15 | EACH | 1500 | 22500 | 20 | 18000 |
| 4 | DAY | 100 | 4000 | 20 | 3200 |

Comments

| Third Party Charges | ☐ 🗎 | $0 | $0 |
|---|---|---|---|
| Taxes And Fees | ☐ 🗎 | $9940 | $10000 |
| 4271 | ☐ 🗎 | $0 | $0 |
| 4278 | ☐ 🗎 | $0 | $0 |
| Pricing | ☐ 🗎 | 155410.56 | 159720 |
| View Details | | Details | Details |

FIG. 16L

ALL PROJECTS LIST>YR2000 TENSLEEP PROJ>ALL WELLS BY SPUD/START DATE-CALENDAR

WELLOGIX

PROJECT NAME:YR2000 TENSLEEP PROJ

VIEW THIS PROJECT-LEVEL BID REQUESTS CALENDAR [01]

AUGUST 2000

| SUNDAY | MONDAY | TUESDAY | WEDNESDAY | THURSDAY | FRIDAY | SATURDAY |
|---|---|---|---|---|---|---|
|  |  | 01<br>>DS5-15<br>>DS5-1 | 02 | 03 | 04 | 05 |
| 06 | 07 | 08 | 09 | 10 | 11 | 12 |
| 13 | 14 | 15<br>>ST 384 #1-1 | 16 | 17 | 18 | 19 |
| 20 | 21 | 22 | 23 | 24 | 25 | 26 |
| 27 | 28 | 29 | 30 | 31 |  |  |

SEPTEMBER 2000

| SUNDAY | MONDAY | TUESDAY | WEDNESDAY | THURSDAY | FRIDAY | SATURDAY |
|---|---|---|---|---|---|---|
|  |  |  |  |  | 01<br>>DS5-16 | 02 |
| 03 | 04 | 05 | 06 | 07 | 08 | 09 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |

OCTOBER 2000

| SUNDAY | MONDAY | TUESDAY | WEDNESDAY | THURSDAY | FRIDAY | SATURDAY |
|---|---|---|---|---|---|---|
| 01<br>>DS5-17<br>>DS5-17-1 | 02 | 03 | 04 | 05 | 06 | 07 |
| 08 | 09 | 10 | 11 | 12 | 13 | 14 |
| 15 | 16 | 17 | 18 | 19 | 20 | 21 |

FIG.17A

(Request #4136) Primary Cementing

| Request Type: | Bid |
|---|---|
| Reply By: | 01-SEP-00 |

← 1900

| Request By: | Robert T. da Jong | Office Phone: | (303) 3003520-250 |
|---|---|---|---|
| Title: | | Fax: | unknown |
| Company Name: | company #1 | E-Mail: | dejong@wellbid.com |
| Mailing Address: | 4155 E. Jewell Av Suite 300<br>Denver CO 80222 | Region & Basin: | Canada - Alberta<br>Canada - British Columbia<br>Canada - Eastern Canadian Offshore<br>Canada - Far North<br>Canada - Saskatchewan<br>GOM - Apalachicola<br>GOM - Gulf Coast Salt Dome<br>GOM - Rio Grande Embayment<br>Gulf States - Black Warrior<br>Gulf States - Central Texas<br>Gulf States - East Texas<br>Gulf States - North Louisiana<br>Gulf States - Permian<br>Gulf States - South Louisiana<br>Gulf States - South Texas<br>Mid-Con - Anadarko<br>Mid-Con - Ardmore<br>Mid-Con - Dalhart<br>Mid-Con - Hugoton<br>Mid-Con - Kansas/Nebraska<br>Northeastern - Appalachia<br>Northeastern - Illinois<br>Northeastern - Michigan<br>Pacific - Cook Inlet<br>Pacific - Sacramento<br>Pacific - North Slope<br>Pacific - San Joaquin<br>Rockies - Big Horn<br>Rockies - Denver-Julesburg<br>Rockies - Green River<br>Rockies - Paradox<br>Rockies - Piceance<br>Rockies - Powder River<br>Rockies - Raton<br>Rockies - San Juan<br>Rockies - Uinta<br>Rockies - Williston |

| Project Name: | CKH Test II |
|---|---|
| Region & Basin: | Rockies - Big Horn |
| Country: | USA |

| Well Name: | DS18-17 |
|---|---|
| Well Description: | Test as of 8-13-00 |
| Est Spud/Start Date: | 01-SEP-2000 |
| Well API Number: | |
| Well Type: | NEW |
| Region & Basin: | Rockies - Big Horn |
| Country: | United States |
| State/Province: | Wyoming |
| County: | Gillette |
| Field: | Bull Field |
| Block: | |
| Survey: | |

Pumping Requirements for this Stage

| Max Slurry Mixing Rate, bpm | Max Slurry Pumping Rate, bpm | Max Slurry Displacement Rate, bpm |
|---|---|---|
|  |  |  |

Miscellaneous Equipment/Service Needs for Hole Section

|  | Size | No. of Units |
|---|---|---|
| Batch Mixer | ☐ |  |
| Standby Pumping Equipment | ☐ |  |
| Computer Monitoring Equipment | ☐ |  |
| Additives in Liquid Form | ☐ |  |

Special Personnel Requirements

Comments for this Hole Section

Category Attachments:
There are no attachments

File Attachments:
No File Attached

[Interested] [Not Interested] [Submit Bid Proposal] [View eField Ticket]

Submit Bid Feedback

[Clear] [Reset] [Submit]

| Primary Cementing - eField - Tickets | | | |
|---|---|---|---|
| Hole Selection | Total Cost w/3rd Party Incl, $ | Vendor Status | Operator Status |
| Hole Selection: Surface | 16500.00 | SUBMITTED | APPROVED |
| Hole Selection: Production | 0.00 | | |
| Hole Selection: Conductor | 0.00 | | |

1908

Create eField-Ticket
1910

FIG. 19C

Primary Cementing - eField-Ticket — 1912

| Well Name | DS18-17 | Accounting System Project # | |
|---|---|---|---|
| Field Name | Bull Field | Project Mgt. System # | |
| Project Name | CKH Test II | GL Account # | |
| State/Province | Wyoming | Rig Name/No. | |
| County/Parish | Gillette | Field Supv Name | |
| Legal Location | 1000' FNL, 500' FEL, Sec38, T45N, R101E, 8500 ft | Office Rep Name | |

Hole Selection | Hole Selection, Intermediate 1 ▽ | Currency Type | US Dollars

— 1914

Job Summary

[text box]

| | Date (e.g. 01-JAN-2000) | Time (e.g. 13:31) |
|---|---|---|
| Arrive Location | | |
| Job Start | | |
| Job Completion | | |
| Leave Location | | |

— 1916

Service Charges — 1918

| Item # | Description Of Service | Quantity/Footage | UOM | Unit Price, $ | Book Price, $ | Disc, % | Amount, $ |
|---|---|---|---|---|---|---|---|
| | | | EA ▽ | | | | |
| | | | EA ▽ | | | | |
| | | | EA ▽ | | | | |
| | | | EA ▽ | | | | |
| | | | EA ▽ | | | | |

METHOD AND SYSTEM FOR COMPARING A PURCHASE ORDER, ACTUAL DATA, AND AN INVOICE TO DETERMINE A DISCREPANCY BETWEEN THE PURCHASE ORDER, ACTUAL DATA, AND THE INVOICE

CROSS REFERENCE TO RELATED APPLICATIONS

This application is a divisional of U.S. application Ser. No. 09/801,016 entitled "METHOD AND PROCESS FOR PROVIDING RELEVANT DATA, COMPARING PROPOSAL ALTERNATIVES, AND RECONCILING PROPOSALS, INVOICES, AND PURCHASE ORDERS WITH ACTUAL COSTS IN A WORKFLOW PROCESS," filed Mar. 6, 2001, which is a continuation-in-part of U.S. application Ser. No. 09/672,938, entitled "METHOD AND AUTOMATED PROCESS FOR MATCHING BUYERS AND SELLERS OF GOODS AND/OR SERVICES," filed Sep. 28, 2000, now abandoned which is incorporated herein by reference. This application is also related to and claims the benefit of priority to the following applications, which are also incorporated herein by reference: U.S. Provisional Application No. 60/236,998, entitled "METHOD AND AUTOMATED PROCESS FOR MATCHING BUYERS AND SELLERS OF GOODS AND/OR SERVICES," filed on Sep. 29, 2000; and U.S. Provisional Application No. 60/187,345, entitled "WEB-ENABLED SYSTEM AND METHOD TO ENHANCE BUSINESS TO BUSINESS WORKFLOW PROCESS," filed on Mar. 6, 2000.

FIELD OF THE INVENTION

The present invention relates in general to the field of automated business processes that match buyers with sellers of either goods or services, or goods and services while also targeting marketing to such buyers. More specifically, the present invention relates to an automated process that receives specifications of physical, functional, temporal, financial, transactional and/or geographical parameters from buyers, and matches the buyers with sellers of either goods or services, or goods and services that satisfy the parameters and specifications. The present invention also provides targeted marketing capabilities to such buyers based upon Profile Links to sellers provided via a network. The invention further provides for advanced proposal comparisons, and proposal, purchase order, invoice, and payment reconciliation of either goods or services, or goods and services rendered, and integration of such reconciliation of actual costs and technical specifications with accounting and back office payments systems.

BACKGROUND OF THE INVENTION

In today's fast paced economy, many projects exist that require various goods or services, or goods and services to be provided by numerous organizations (hereafter, "sellers") while also requiring relationships for providing and monitoring of either goods or services, or goods and services to be quickly and efficiently established. Examples of such projects include drilling for oil, commercial and/or residential construction, manufacturing complex objects (for example, aircraft and special use objects), and providing specialized services (for example, brokering excess power and bandwidth, and developing unique software products). When planning such projects, the person(s) responsible for the project (hereinafter, the "buyer") is often faced with the daunting tasks of: (1) determining which goods or services, or goods and services are needed; (2) determining who provides such goods or services, or goods and services (i.e., who are the "sellers"); (3) establishing a dialogue with such sellers; (4) selecting at least one seller; (5) undertaking, starting and monitoring the project until completion or termination; (5) facilitating post-completion tasks (for example, paying sellers and other back-end processing); and (6) attempting to identify areas of improvement for future projects.

Commonly, when faced with such a challenge, many buyers rely upon antiquated systems and processes for accomplishing those tasks necessary to see a project through from start to post-completion. Such antiquated systems include utilizing business listings and other directories to identify sellers, negotiating agreements with the sellers via fax, telephone, and other non-real-time responsive systems, and making best guess judgments as to areas in which future improvements may be realized. As a result, many buyers relying upon such antiquated processes are often left behind in today's fast paced, Internet driven information economy. As such, a system is needed that allows buyers to be efficiently matched with sellers, and projects monitored and coordinated through all phases of the project.

For example, when constructing a building, a general contractor must decide which seller will provide excavation services, what type of materials to use, when the materials will be used, who will supply the materials, who will use the materials (i.e., who will actually construct the building) and other various factors. Currently, when constructing a building, the builder will often use a Rolodex® to determine which preferred sellers provide the desired goods or services, or goods and services. Upon identifying the sellers, the buyer may then engage in some dialogue with the seller about the project parameters, and may solicit proposals. Since each seller may identify a unique manner for accomplishing the specified task, the buyer is often left with trying to determine which seller is providing the best value, the best approach, the best timeliness, etc. Since such determinations can be quite time consuming, buyers generally do not have time to shop for other than a limited number of sellers for any given project. As such, new sellers on the market, and/or new techniques may often be overlooked.

Further compounding the problems faced by buyers in identifying and coordinating either goods or services, or goods and services from sellers is the fact that sellers often dictate which of the numerous currently available processes for processing either goods or services, or goods and services to use (e.g., auction, fixed price and quantity systems, and other systems well known in the art). For some of these processes, most of the essential terms of the agreement are dictated or controlled by the seller, with the buyer having little input over price, delivery terms, location, quantity, etc. (examples of such seller driven processes include retail, mail order, telephone, and some on-line sales systems). For example, a builder desiring to procure nails might be required by a retail sales process or an on-line sales process to purchase nails only in bundles of 200, for a set price. Since the buyer cannot modify the goods or services, or goods and services, or terms or conditions of the procurement process, the buyer's needs are often inadequately, untimely, and inefficiently fulfilled.

Additionally, recent automation of the aforementioned seller driven processes (for example, via the Internet) has not adequately addressed this problem. While the new automated processes generally enable a buyer to shop for either goods or services, or goods and services without having to travel to the seller's location or obtain a catalog, such processes are commonly characterized by sellers offering items of commerce under seller specified terms and conditions. Such processes do not allow a buyer to identify a project in terms of its specifications, and have the specifications translated into requests for goods or services, or goods and services that are then fulfilled in a timely and efficient manner by a seller providing the requested goods or services, or goods and services or suitable alternatives. Additionally, such processes often do not identify sellers of specialty of either goods or services, or goods and services and, therefore, are often inadequate for the provisioning of either goods or services, or goods and services that are not commonly mass marketed. In short, a more efficient process of matching buyers and sellers is needed.

Similarly, currently available buyer driven processes also do not facilitate the efficient matching of buyers and sellers. Examples of commonly available buyer driven processes include bidding processes and auctions. Regardless of the process (whether bid based or auction based), a buyer is generally first required to identify specific goods or services, or goods and services that are needed to complete a project. None of the processes allow a buyer to specify a project in terms of project details that are then automatically converted into requests for proposals, requests for specific goods, or other such proposals. Neither do any of the processes provide ready access to information to help a buyer, or seller, determine the appropriate details necessary to adequately specify a project or respond to such a request. As is appreciated by those skilled in the art, converting specifications for complex projects into specific requests for either goods or services, or goods and services is extremely time consuming, is often incomplete, and is extremely inefficient because the buyers often can not precisely identify and/or specify those goods or services, or goods and services and needed to fulfill a project. As such, today's buyer driven processes do not provide the degree of flexibility, specificity, and efficiency necessary for many buyers of either goods or services, or goods and services. Therefore, a process is needed that enables a buyer to procure those goods or services, or goods and services necessary to undertake and complete a project by providing a project's specifications to an automated process that facilitates the conversion of such specifications into requests for either goods or services, or goods and services and matches the buyer with sellers of such goods or services, or goods and services.

Additionally, once an agreement has been entered into to provide either goods or services, or goods and services needed to fulfill a project, systems are not available that enable both buyers and sellers to monitor the progress of the project, efficiently implement design changes, provide billing and other back-office functions, and determine areas for improvement by utilizing knowledge based systems. Thus, a process is needed that enables buyers/sellers to enter into agreements for projects and monitor such projects from initialization through post-completion/termination.

Similarly, once a job, or service has been performed, processes are not available that enable both buyers and sellers to efficiently compare and reconcile actual costs and technical specifications of the service with original proposals, purchase orders and invoices. Thus a process is needed to enable such reconciliation of proposal prices with actual costs before invoicing.

Further, with the advent of the Internet as another medium for the marketing of either goods or services, or goods and services, sellers have sought efficient and useful mechanisms for marketing their goods or services, or goods and services to buyers via web pages. In order to encourage buyers to visit the seller's web pages, at which their goods or services, or goods and services are often offered for sale or identified, sellers utilize various marketing mechanisms including: static marketing (where an advertisement is displayed as a static graphic or textual description on a portion of a buyer's computer screen); flash marketing (when an advertisement is flashed on the buyer's screen for a brief time period); banner marketing (wherein a "billboard" providing a hyper-link to the seller's web page is provided on a portion of a web page the buyer is currently viewing); and various other marketing mechanisms. In spite of these various and numerous methods of marketing via the Internet and other networks, such methods have been shown to be very inefficient in promoting either goods or services, or goods and services because such methods do not generally provide targeted marketing to buyers when they are most likely to consider acquiring a seller's goods or services, or goods and services, for example when they are undertaking a project in which the seller's goods or services, or goods and services may be utilized.

Therefore, a new method for providing marketing to buyers is needed. More specifically, a system and process is needed that combines the efficiencies and unique capabilities of the present invention, as explained further herein, to match buyers with sellers of either goods or services, or goods and services.

SUMMARY OF THE INVENTION

The present invention is directed to a process and system that matches buyers and sellers of either goods or services, or goods and services based upon specifications provided by a buyer for a project. Additionally, the present invention provides a forum for the negotiation and resulting agreements to provide either goods or services, or goods and services needed for a project, while also allowing buyers and sellers to monitor the status of the project and/or the provisioning of the agreed upon goods or services, or goods and services. The invention provides buyers and sellers with access to industry specific information to assist them in determining and providing the necessary goods and services. The invention also provides buyers with tools to compare different proposals in detail and to manipulate the parameters of those proposals to ascertain different results based upon potential project outcomes. Further, the invention facilitates the completion of post task accomplishment activities such as back-end accounting and billing operations, reconciliation of proposed costs with actual costs, invoices, and purchase orders, resource management, and knowledge management. Lastly, the present invention provides a process and system for providing targeted marketing by sellers to buyers during all phases of a project including project initialization, monitoring, and post-completion phases.

More specifically, the present invention provides a system and process that, upon identification of specifications for a project by a buyer, generates a request for either goods or services, or goods and services needed to fulfill the project and provides the request to those sellers designated by the buyer and/or those sellers that can provide the requested goods or services, or goods and services. In response to such requests, the sellers may submit proposals, request additional information, recommend changes to project parameters and/or the goods or services, or goods and services requested, and perform various other activities. The present invention enables sellers to directly communicate with the buyer, including providing documents and other information that are readily accessible by the buyer, the sellers, and others (engineers, other project members, etc.) from anywhere, at any time, via a suitable communications link. In this manner, the process facilitates the matching of buyers with sellers of goods/services based upon project parameters, and not necessarily upon the specific identification of either goods or services, or goods and services by a buyer. Additionally, it is to be appreciated that a "project", as used in this specification, includes activities involving single steps (for example, procuring casing for a well) as well as activities involving numerous steps (for example, building a house), and is not to be construed as being limited to any specific classes of goods, services, activities, or projects.

More specifically, when utilizing the systems and/or processes of the present invention, a buyer specifies parameters that describe a project. Examples of such parameters include the following: physical parameters (e.g., size, weight, height); functional parameters (e.g., able to accelerate from 0 to 60 m.p.h. in less than 6.0 seconds); temporal parameters (e.g., to be delivered by Tuesday); financial parameters (e.g., to cost less than $10.00); transactional parameters (e.g., to be paid by check or money order); and/or geographical parameters (e.g., located in Colorado). The physical, functional, temporal, financial, and/or geographical parameters, or any other Parameters that may be appropriate for completion of the project, are hereafter collectively referred to as "Parameters."

A knowledge management system is also a component of the invention and is used, in one respect, as a library of technical information to aid both buyers and sellers in formulating and responding to various kinds of requests. Technical information may include, for example, industry data, articles, general engineering publications, historical data, and data specific to either the buyer or seller's projects or team (i.e., company specific data). Company specific data can include operational and transaction histories for projects and other historical data. Access to company specific data may be restricted to protect proprietary information, or it may be shared, for example, as between joint venturers involved in a specific project. Buyers or sellers may further direct sellers or buyers to particular information considered useful in formulating or evaluating proposals.

Additionally, it is to be appreciated that the present invention may be accomplished using any system, automaton, and/or "Turing machine." An "automaton" is herein described as a mechanism that is relatively self-operating and designed to follow a predetermined sequence of operations or respond to encoded instructions. A "Turing machine" is herein described as an abstract expression of a computing device that may be realized or implemented on an infinite number of different physical computing devices. Examples of systems, automatons and/or Turing machines that may be utilized in performing the process of the present invention include, but are not limited to: electrical computers (for example, an IBM personal computer); neuro-computers (for example, one similar to the "General Purpose Neural Computer" described in U.S. Pat. No. 5,155,802, issued to Paul H. Mueller, on Oct. 13, 1992); molecular computers (for example, one similar to the "Molecular Automata Utilizing Single or Double-Strand Oligonucleotides" described in U.S. Pat. No. 5,804,373, issued to Allan Lee Schweiter et al., on Sep. 8, 1998); biological computers (for example, one similar to the biological computer presented by Ehud Shapiro, of the Computer Science and Applied Mathematics Department at the Weizman Institute of Science (Rehovot, Israel), at the Fifth International Meeting on DNA-Based Computers); and optical computers. For purposes of simplicity, such devices hereinafter are referred to as "computers", as is commonly understood in the art. But, the invention is not limited to such devices and may be accomplished upon any system or collection of systems capable of providing the features and functions identified herein.

Additionally, when providing the before mentioned marketing capabilities, the present invention preferably associates buyer profile information with identifications of seller provided either goods or services, or goods and services to target the marketing to the buyer. The profile information may be based upon any act, information, or event supplied or accomplished by the buyer including, for example, an on-line application or Internet site currently being visited by the buyer, answers to a questionnaire, and other information. More specifically, the present invention preferably accesses databases that maintain profiles of buyers. Such profiles may include factors such as the location of the buyer, various Parameters, buyer characteristics, web site access history, and preferred seller lists. Throughout this specification, the profile information is preferably accessed by a "Profile Link"—which is herein defined to include any process or system for providing profile information for a seller or a buyer to another buyer or seller. Additionally, in the preferred embodiment, a Profile Link is a hyper-link to an associated web page. However, those skilled in the art appreciate that process or system for providing profile information may be utilized by and/or in conjunction with the present invention.

The present invention also preferably utilizes databases of sellers within which profiles have been established to determine which sellers and which either goods or services, or goods and services are to be targeted to the various buyers at any time via a Profile Link. For example, a database on seller XYZ may indicate that XYZ provides goods in categories 1, 2 and 3. When buyer ABC accesses an on-line site or an application wherein goods in category number 2 are utilized, the present invention recognizes that XYZ provides such goods, and provides targeted marketing about XYZ's capabilities or products to ABC, via a Profile Link, provided with the information page ABC is currently reviewing. The present invention may also recognize that ABC, for whatever reason, does not wish to engage in business with XYZ, or vice versa and thus, does not provide a Profile Link to XYZ's information. Thus, the present invention utilizes Profile Links to target the marketing of either goods or services, or goods and services to those most likely in need of such goods or services, or goods and services, especially while a buyer is actively pursuing the procurement of such goods or services, or goods and services.

Therefore, in addition to the aforementioned features and those identified hereafter, the present invention provides a method for targeting marketing to online buyers based upon profiles established for buyers, profiles established for sellers, and the current on-line activities of a buyer.

BRIEF DESCRIPTION OF THE DRAWING FIGURES

FIGS. 3A-3C are a more detailed flow diagram showing the process of FIG. 2 in finer detail for the preferred embodiment of the present invention.

Figure 4:
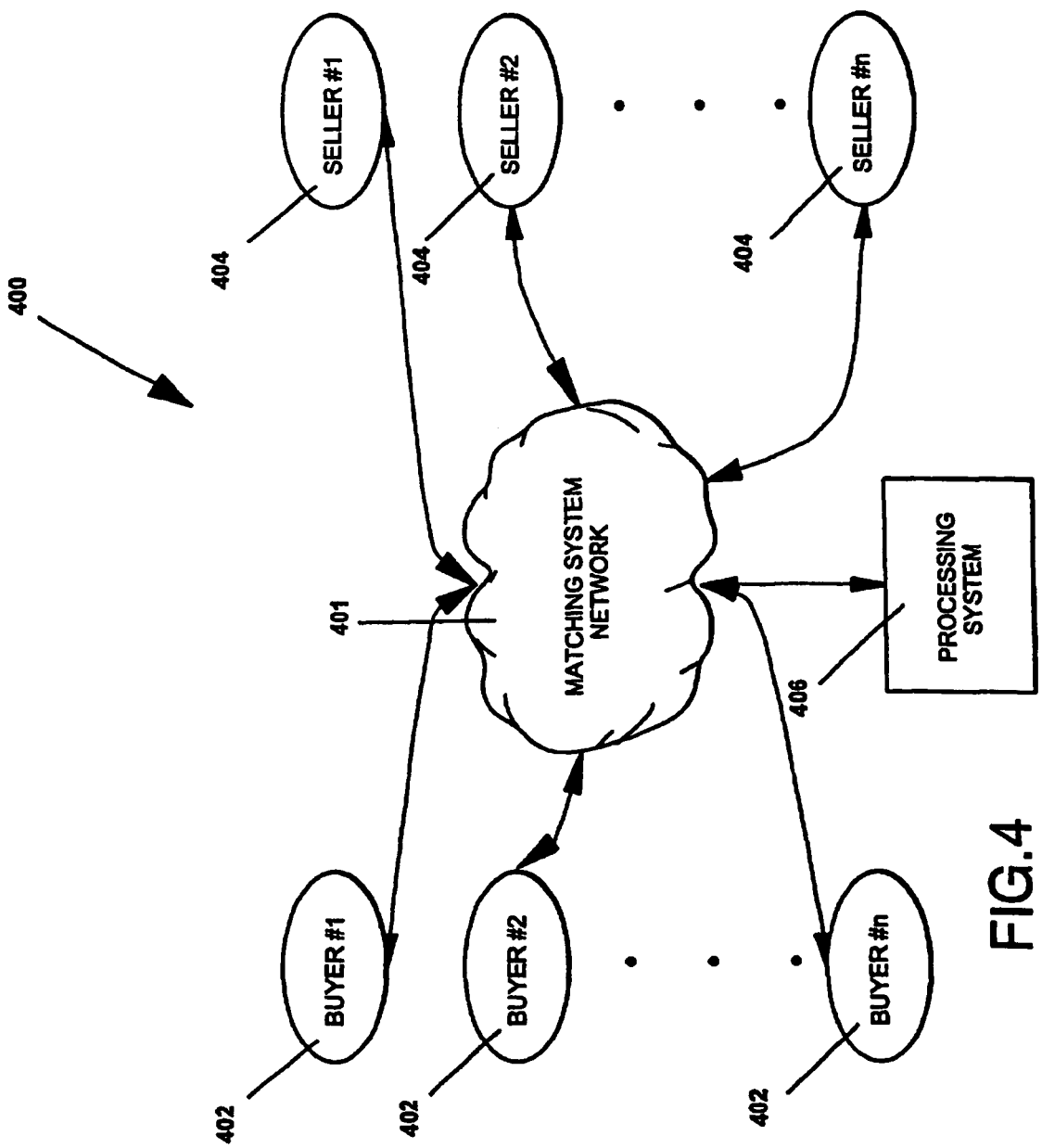

FIG. 4 provides a schematic representation of a system for implementing the process of the present invention.

Figure 5:
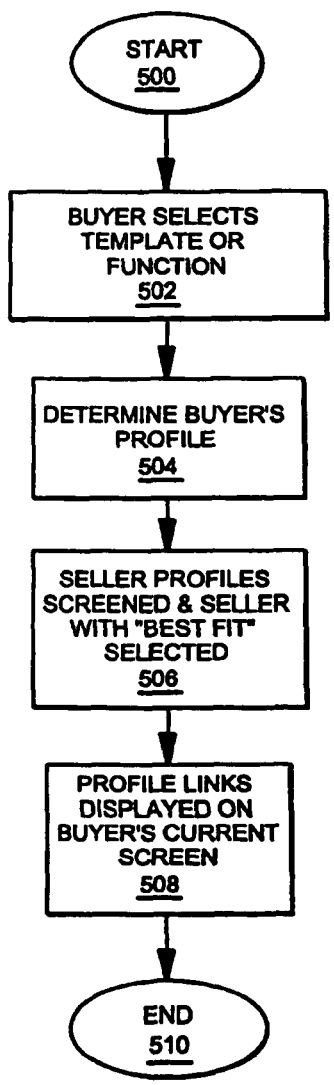

FIG. 5 represents a logic flow diagram of the method of providing Profile Links according to an embodiment of the present invention.

Figure 6:
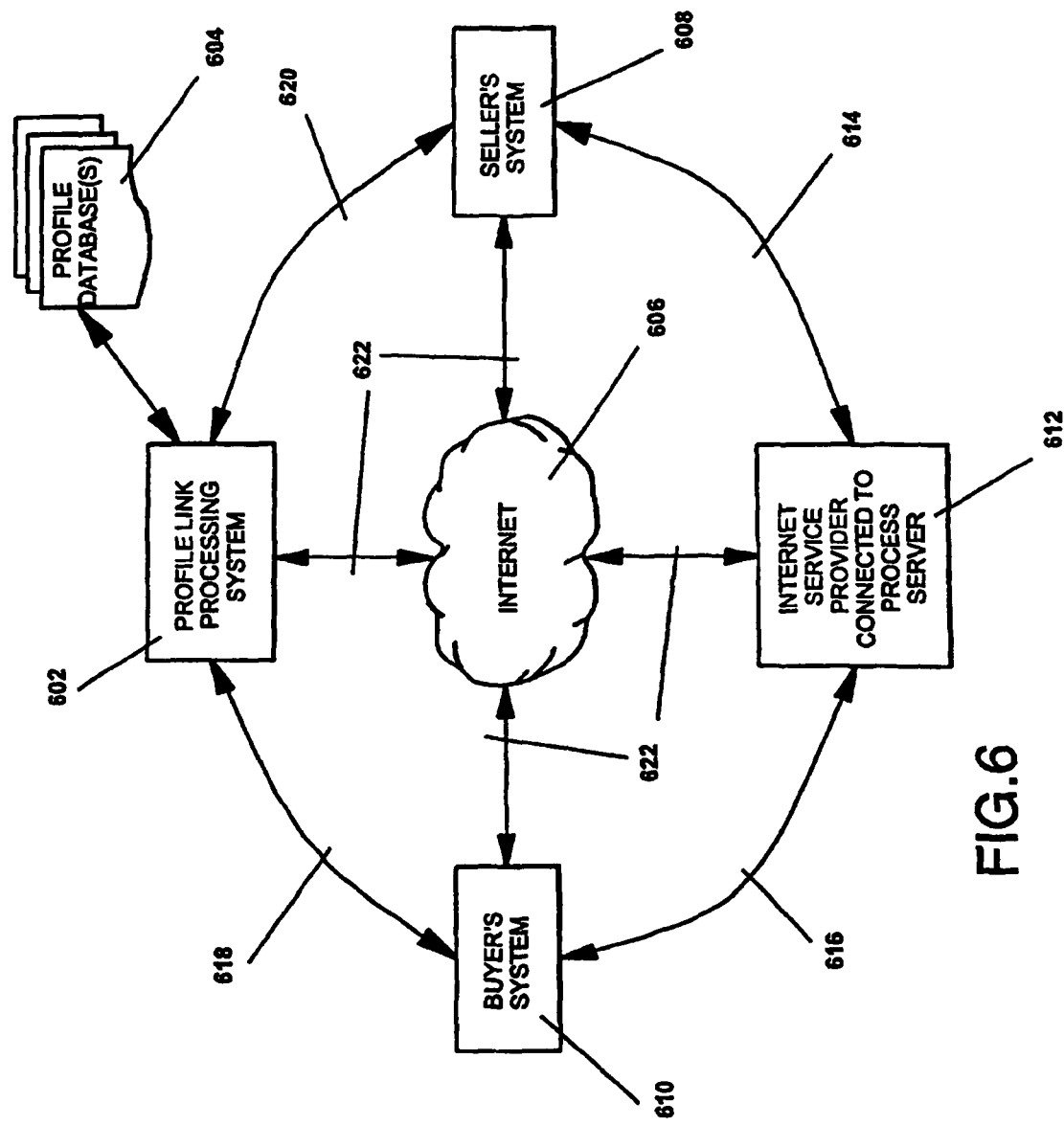

FIG. 6 is a block schematic diagram of one embodiment of a system implementing the Profile Link system of the present invention.

Figure 7:
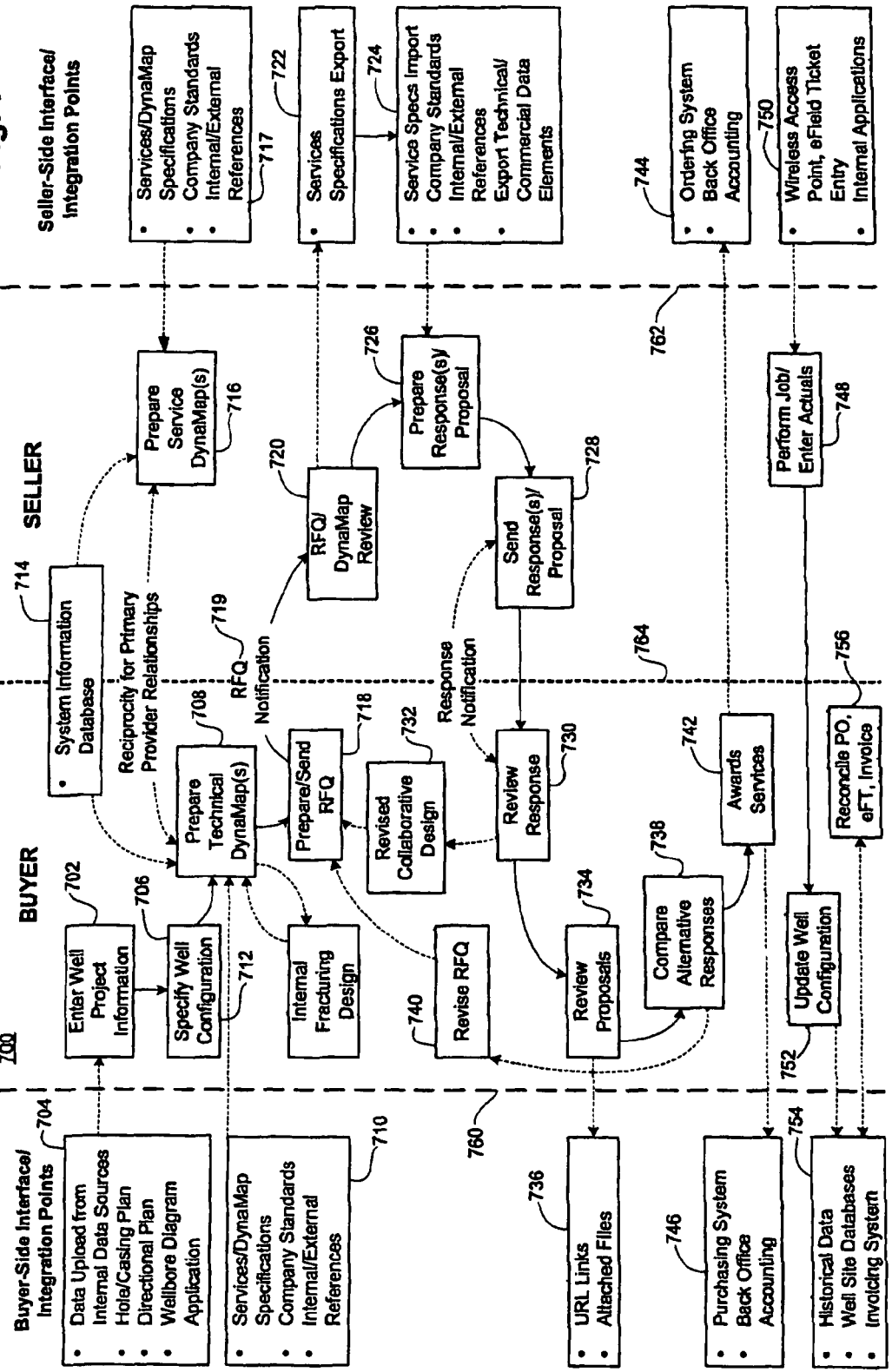

FIG. 7 is an information and interface flow diagram depicting the major functional steps of the present invention.

Figure 8A:
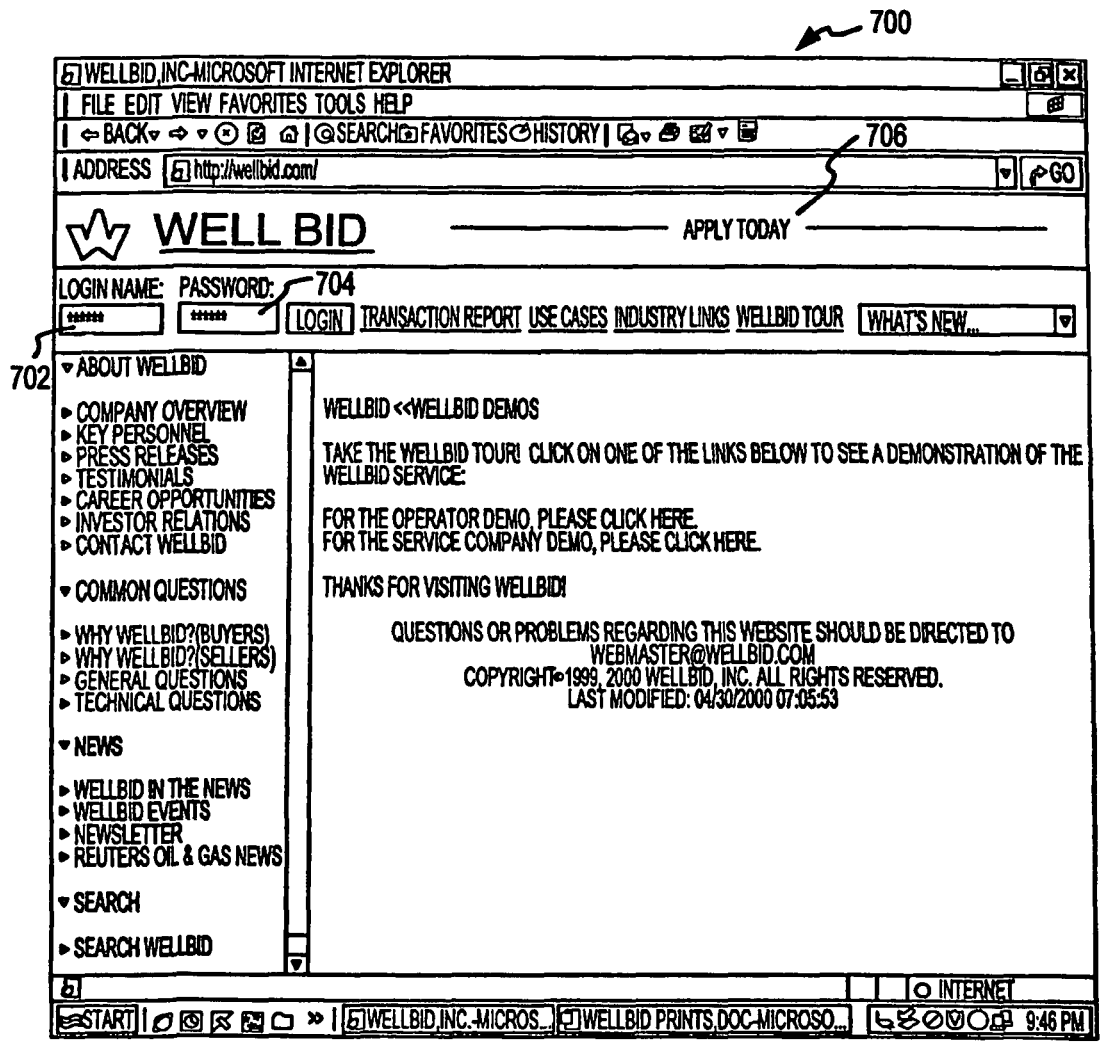

FIG. 8A is an exemplary screen shot of a main menu page for an Internet based embodiment of the present invention.

FIG. 8B is an exemplary screen shot of a user profile entry page for an Internet based embodiment of the present invention.

FIG. 8C is an exemplary screen shot of a Joint Interest Partner entry page for an Internet based embodiment of the present invention.

Figure 9A:
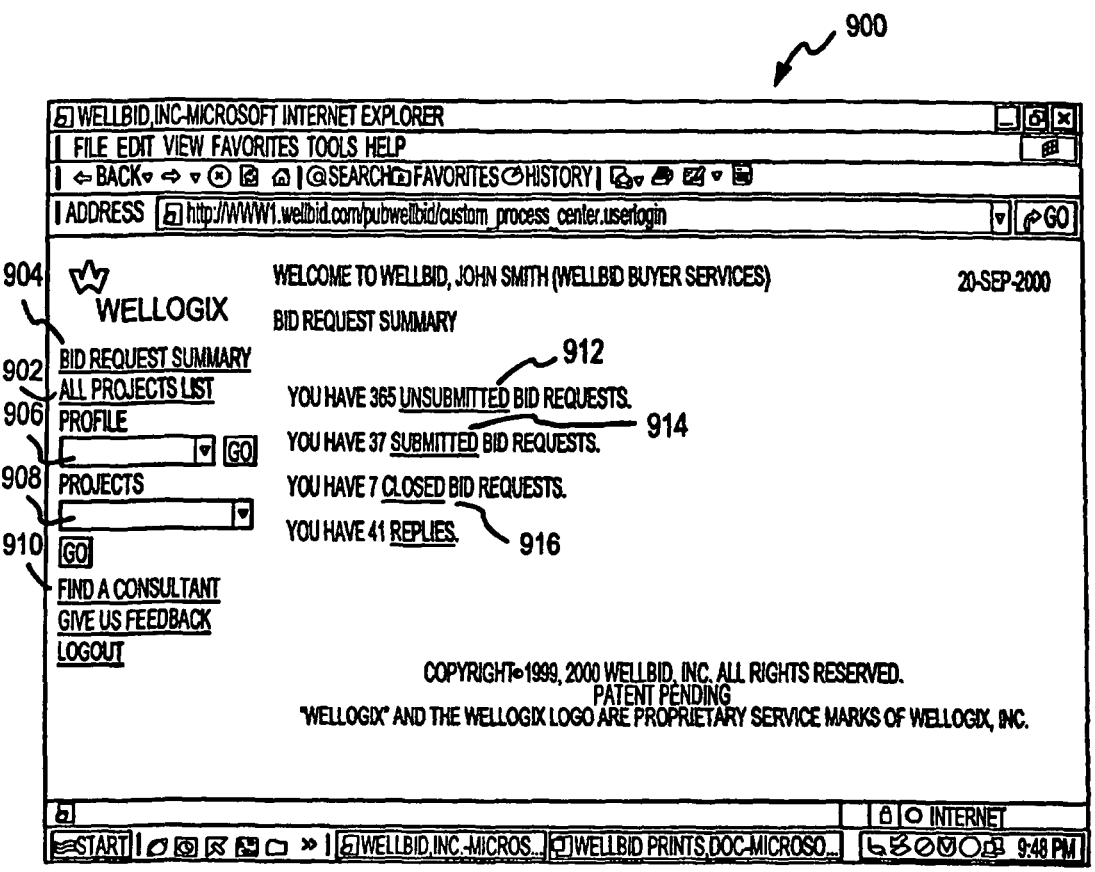

FIG. 9A is an exemplary screen shot of a Bid Request Summary page for an Internet based embodiment of the present invention.

Figure 9B:
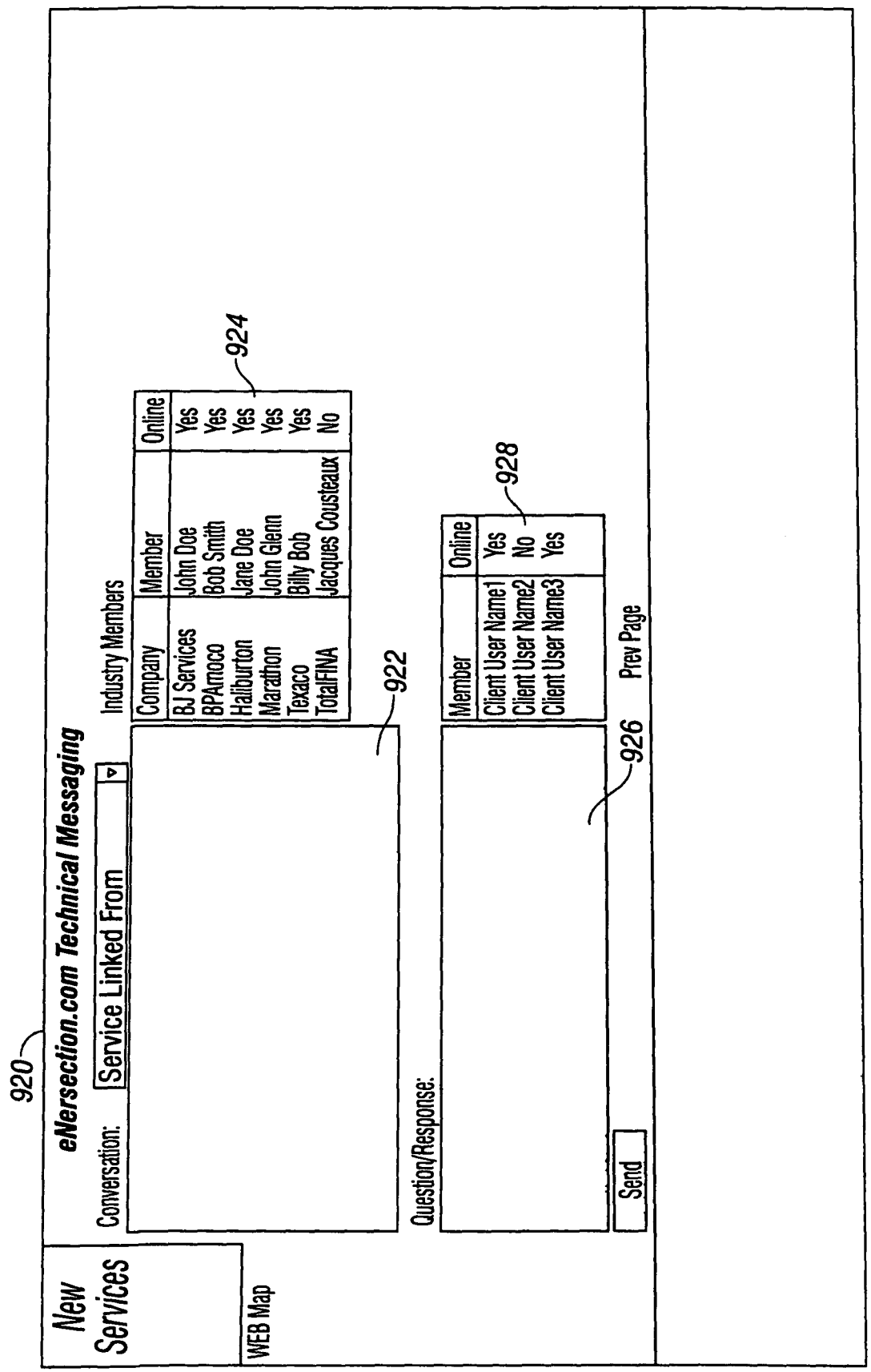

FIG. 9B is an exemplary screen shot of a Technical Messaging page for an Internet based embodiment of the present invention.

Figure 10A:

FIG. 10A is an exemplary screen shot of a New Bid Request page for an Internet based embodiment of the present invention.

FIG. 10B is an exemplary screen shot of a Project Details page for an Internet based embodiment of the present invention.

FIG. 10C is an exemplary screen shot of a Project Users page for an Internet based embodiment of the present invention.

Figure 10D:
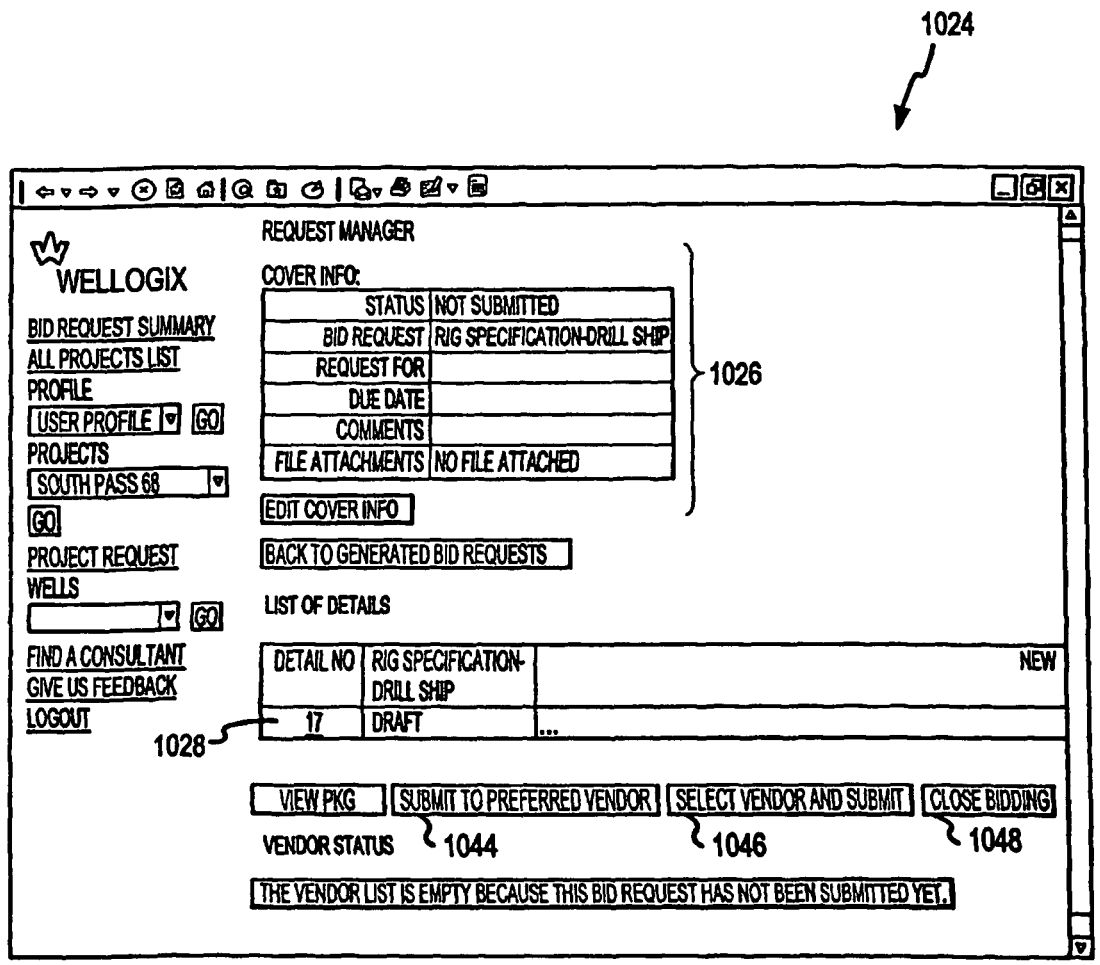

FIG. 10D is an exemplary screen shot of a Request Manager page for an Internet based embodiment of the present invention.

FIG. 10E is an exemplary screen shot of a Request Details page that includes a Profile Link for an Internet based embodiment of the present invention.

FIG. 10F is an exemplary screen shot of a Package page for an Internet based embodiment of the present invention.

Figure 11:

FIG. 11 is an exemplary screen shot of a Closed Bid Request page for an Internet based embodiment of the present invention.

FIG. 12A is an exemplary screen shot of a Replies to Bid Request page for an Internet based embodiment of the present invention.

FIG. 12B is an exemplary screen shot of a Vendor Info page for an Internet based embodiment of the present invention.

FIG. 12C is an exemplary screen shot of a Vendor Feedback page for an Internet based embodiment of the present invention.

FIG. 13 is an exemplary screen shot of an All Projects page for an Internet based embodiment of the present invention.

Figure 14A:

FIG. 14A is an exemplary screen shot of an On-Shore Project Details page for an Internet based embodiment of the present invention.

FIG. 14B is an exemplary screen shot of a second On-Shore Project Details page for an Internet based embodiment of the present invention.

Figure 14C:

FIG. 14C is an exemplary screen shot of a Well Definition page for an Internet based embodiment of the present invention.

FIG. 14D is an exemplary screen shot of a Well Summary page for an Internet based embodiment of the present invention.

FIG. 14E is an exemplary screen shot of a Hole Section Details page for an Internet based embodiment of the present invention.

Figure 14F:
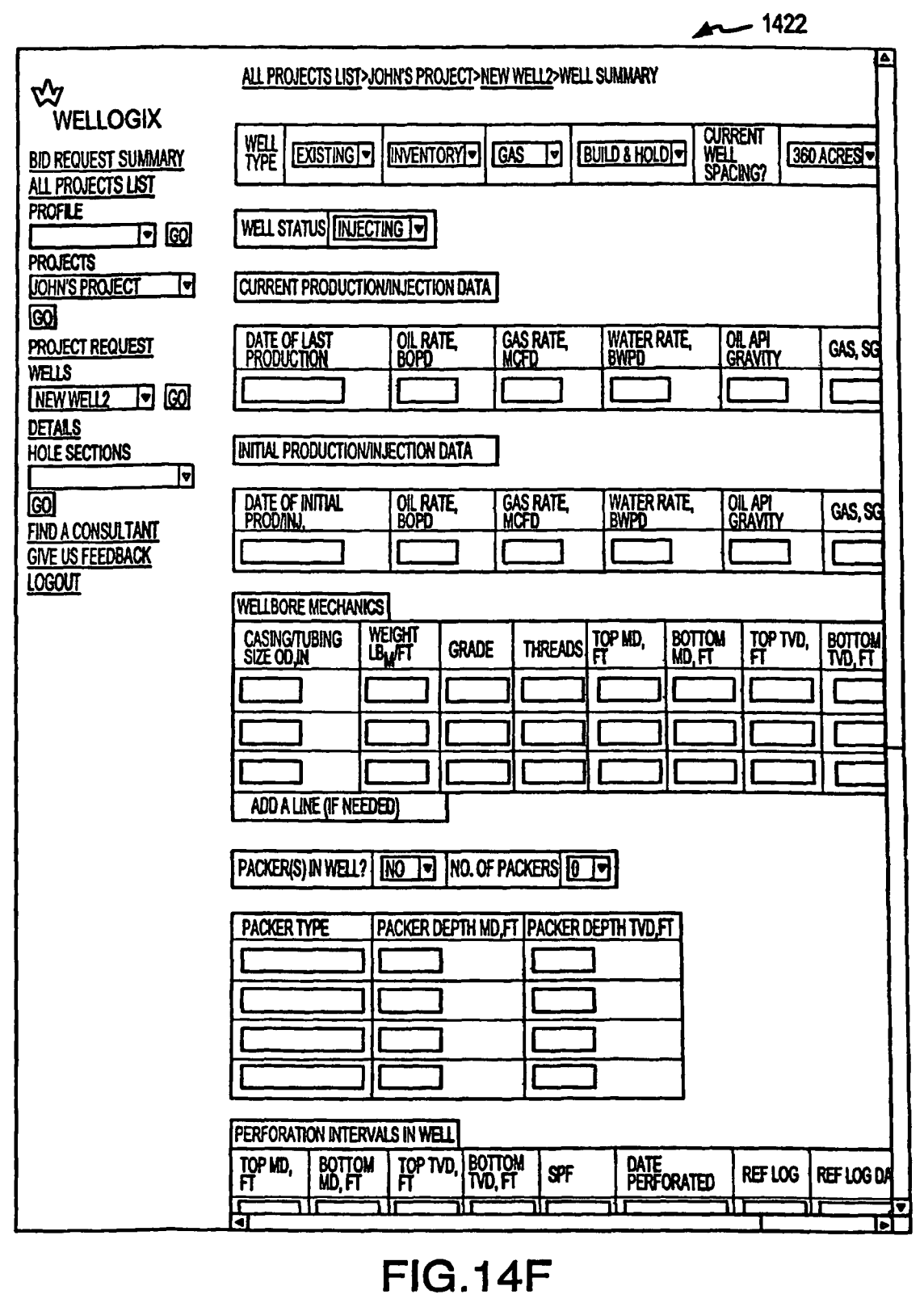

FIG. 14F is an exemplary screen shot of a Well Summary page for an Internet based embodiment of the present invention.

Figure 14G:
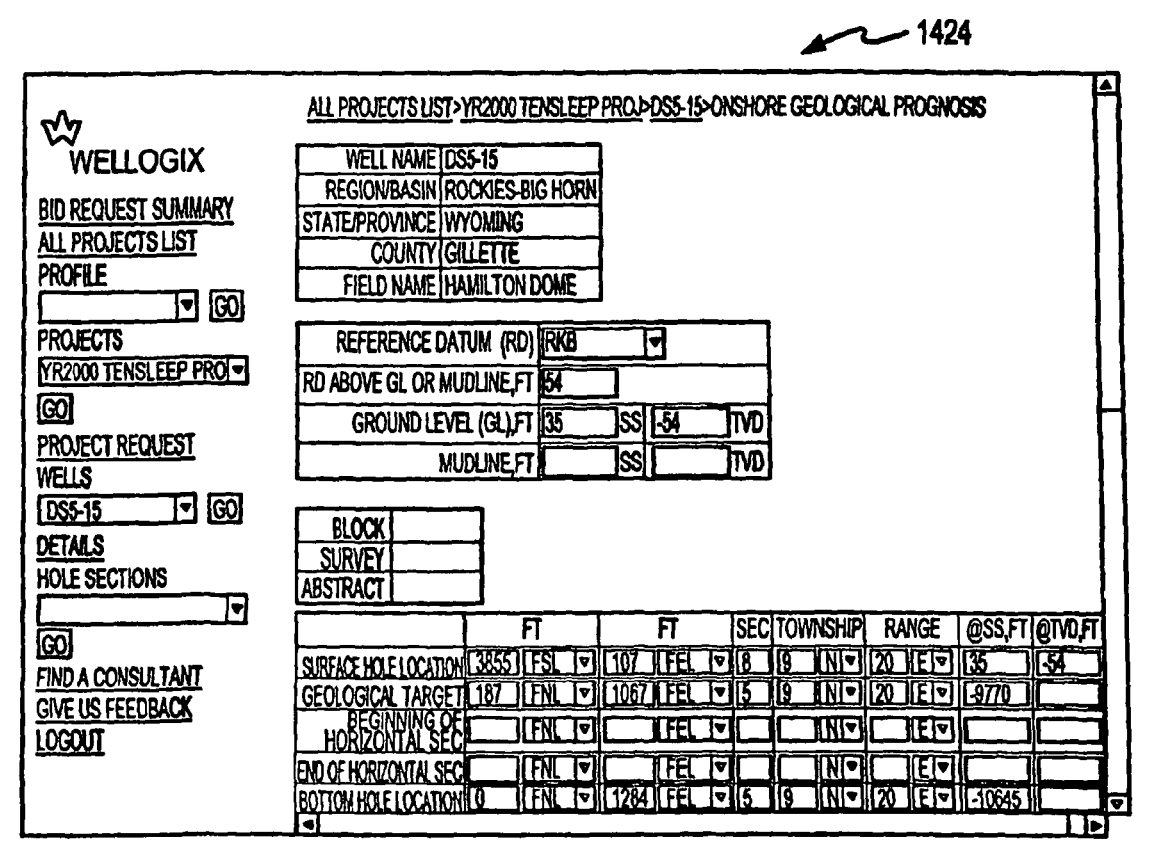

FIG. 14G is an exemplary screen shot of an On-Shore Geological Prognosis page for an Internet based embodiment of the present invention.

FIG. 15A is an exemplary screen shot of a Primary Cementing Request page for an Internet based embodiment of the present invention.

FIG. 15B is a continuation of the exemplary screen shot of the Primary Cementing Request page of FIG. 15A for an Internet based embodiment of the present invention.

Figure 15C:
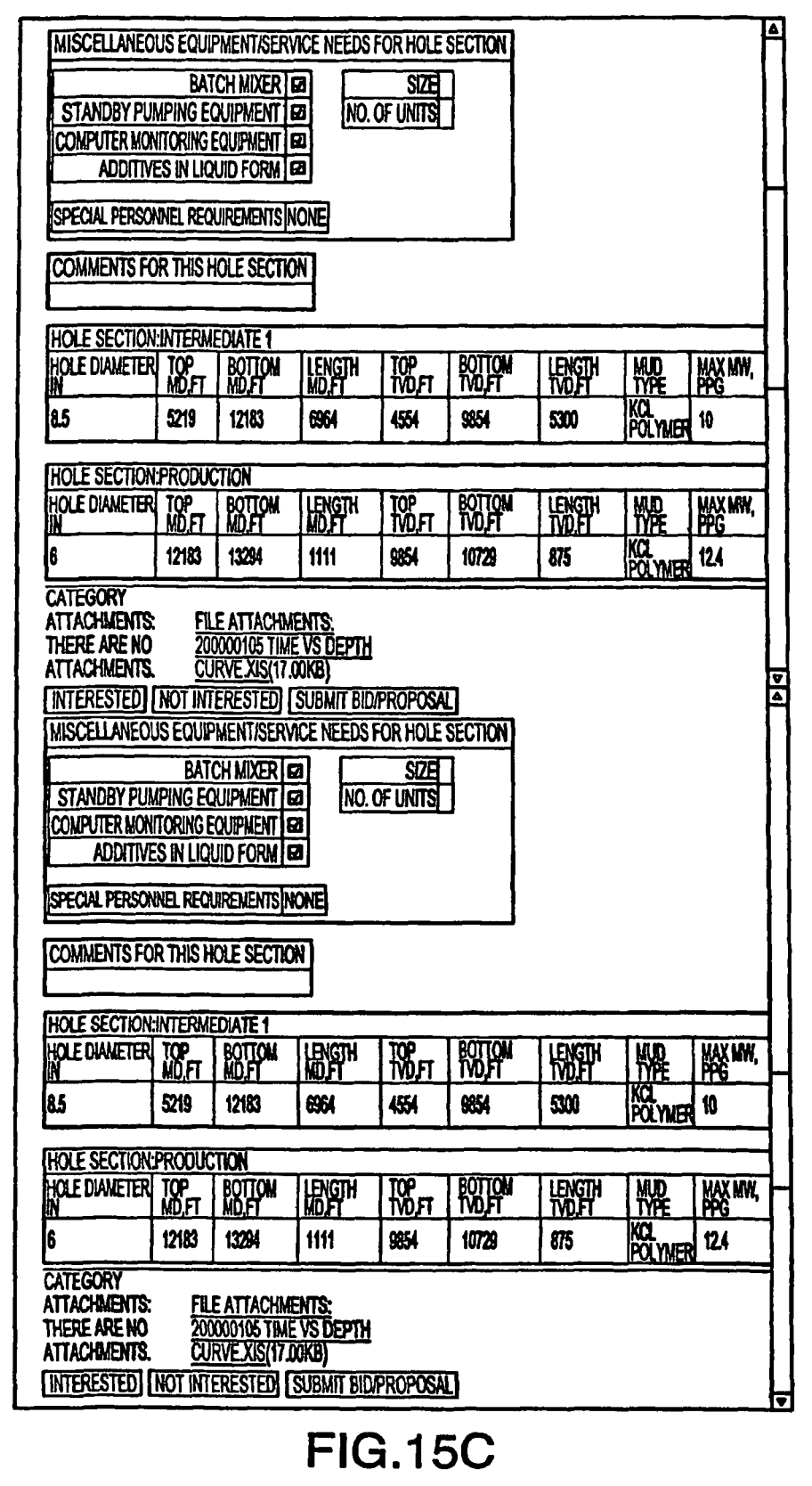

FIG. 15C is a continuation of the exemplary screen shot of the Primary Cementing Request page of FIGS. 15A and 15B for an Internet based embodiment of the present invention.

FIG. 15D is a continuation of the exemplary screen shot of the Primary Cementing Request page of FIGS. 15A, 15B, and 15C for an Internet based embodiment of the present invention.

Figures 15E, 15F:
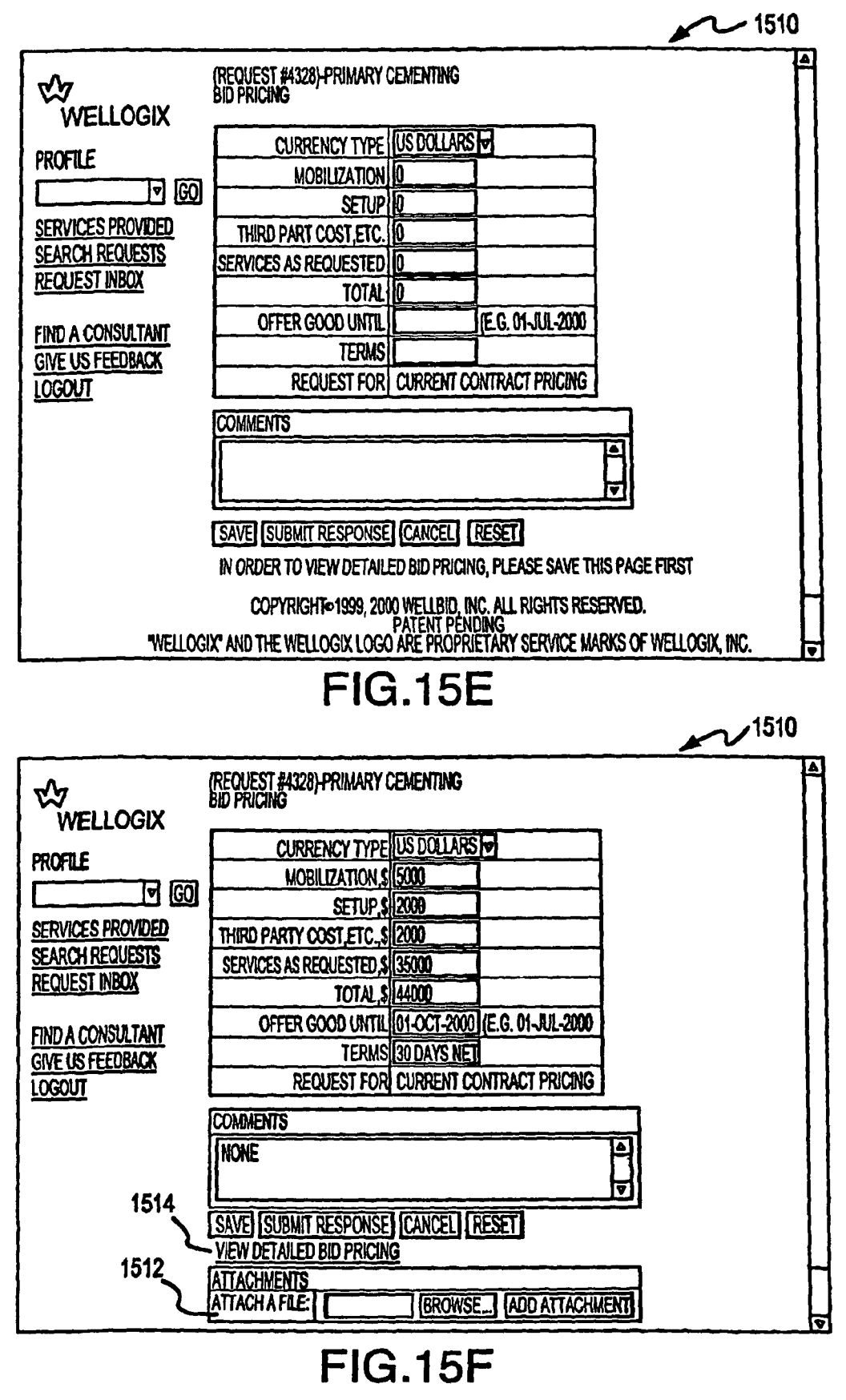

FIG. 15E is an exemplary screen shot of a blank Bid Pricing page in response to a primary cementing request for an Internet based embodiment of the present invention.

FIG. 15F is an exemplary screen shot of a populated Bid Pricing page in response to a primary cementing request for an Internet based embodiment of the present invention.

FIG. 15G is an exemplary screen shot of a Detailed Bid Pricing page in response to a primary cementing request for an Internet based embodiment of the present invention.

FIG. 15H is a continuation of the exemplary screen shot of the Detailed Bid Pricing page in response to a primary cementing request of FIG. 15G for an Internet based embodiment of the present invention.

Figures 16A, 16B:
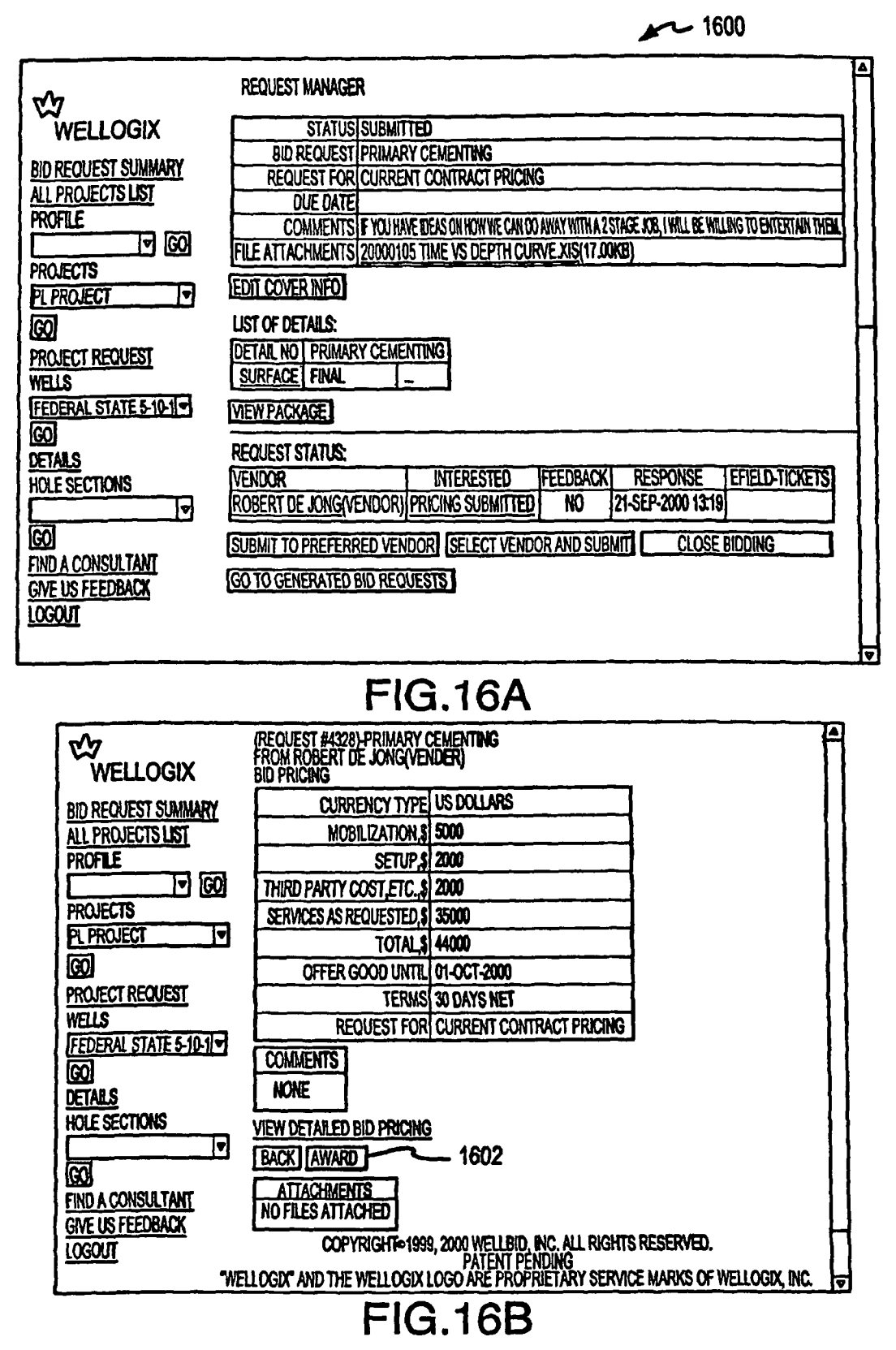

FIG. 16A is an exemplary screen shot of a Request Manager page for an Internet based embodiment of the present invention.

FIG. 16B is an exemplary screen shot of the Bid Pricing page for a primary cementing job received by a buyer using an Internet based embodiment of the present invention.

FIG. 16C is an exemplary screen shot of a Detailed Feedback page from a seller, including a direct link to supporting technical information, received by a buyer using an Internet based embodiment of the present invention.

Figure 16D:
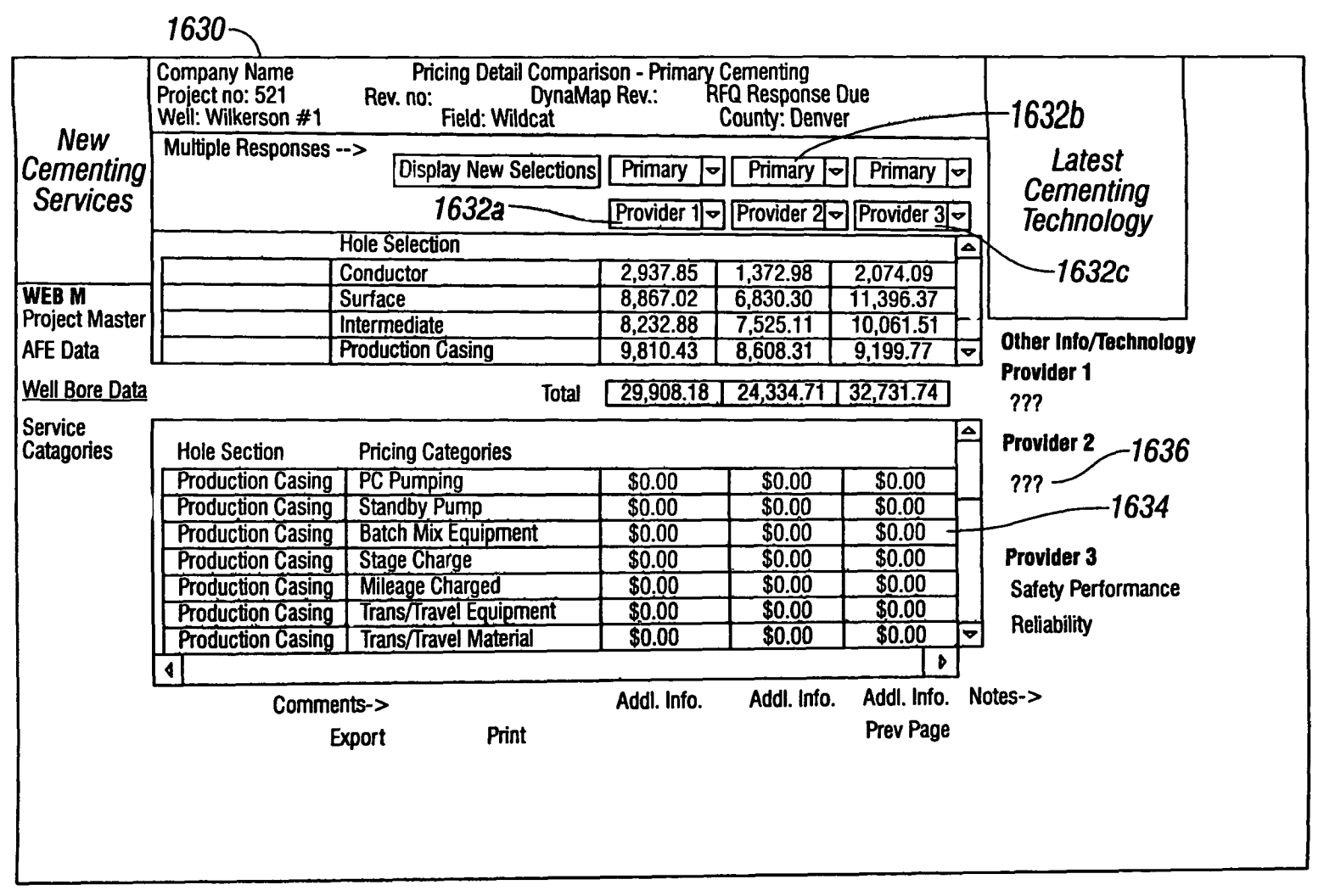

FIG. 16D is an exemplary screen shot of a Provider Comparison page, comparing costs for either goods or services, or goods and services between sellers, in an Internet based embodiment of the present invention.

FIGS. 16E-F are exemplary screen shots of a Provider Comparison page, comparing alternate responses between sellers for meeting parameter requests, in an Internet based embodiment of the present invention.

Figure 16G:

FIG. 16G-H are exemplary screen shots of Service Provider Alternatives Comparison pages, comparing alternatives offered by a seller to meet parameter requests, in an Internet based embodiment of the present invention.

FIGS. 16I-L are exemplary screen shots of Scenario Planning pages, comparing changes resulting between sellers' proposals when parameters are changed by a buyer, in an Internet based embodiment of the present invention.

FIG. 17A is an exemplary screen shot of a Calendar page depicting the starting dates for a group of wells in an example for an Internet based embodiment of the present invention.

Figure 17B:

FIG. 17B is an exemplary screen shot of a Calendar page depicting the relevant dates for requests used in an example for an Internet based embodiment of the present invention.

Figure 18:
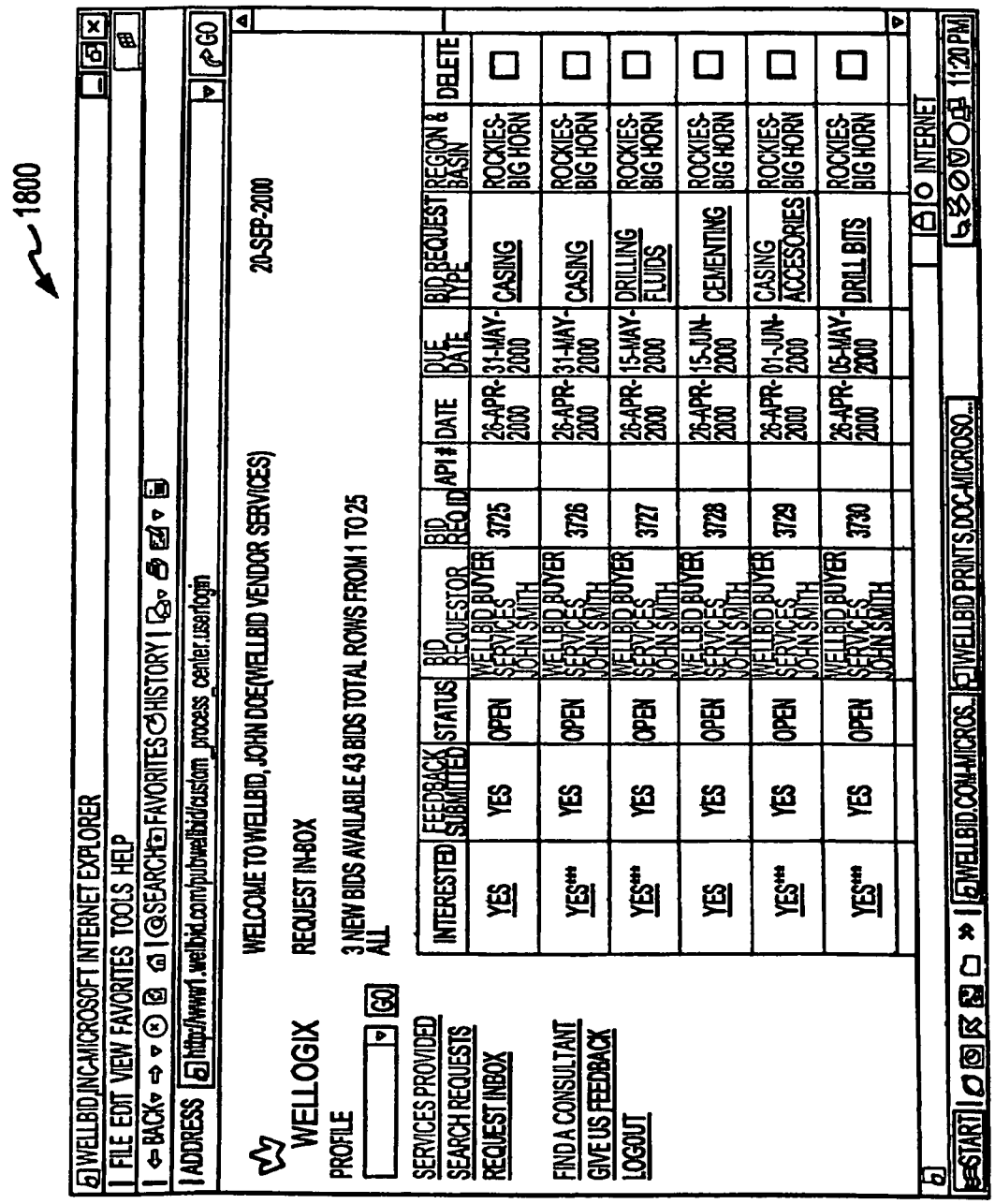

FIG. 18 is an exemplary screen shot of a Request In-Box page for an Internet based embodiment of the present invention.

FIGS. 19A-B are exemplary screen shots of an award page in an Internet embodiment of the present invention indicating a link to enter the field ticket reconciliation system.

FIG. 19C is an exemplary screen shot of an eField Ticket management page in an Internet embodiment of the present invention providing a list of submitted field tickets for review.

Figure 19E:
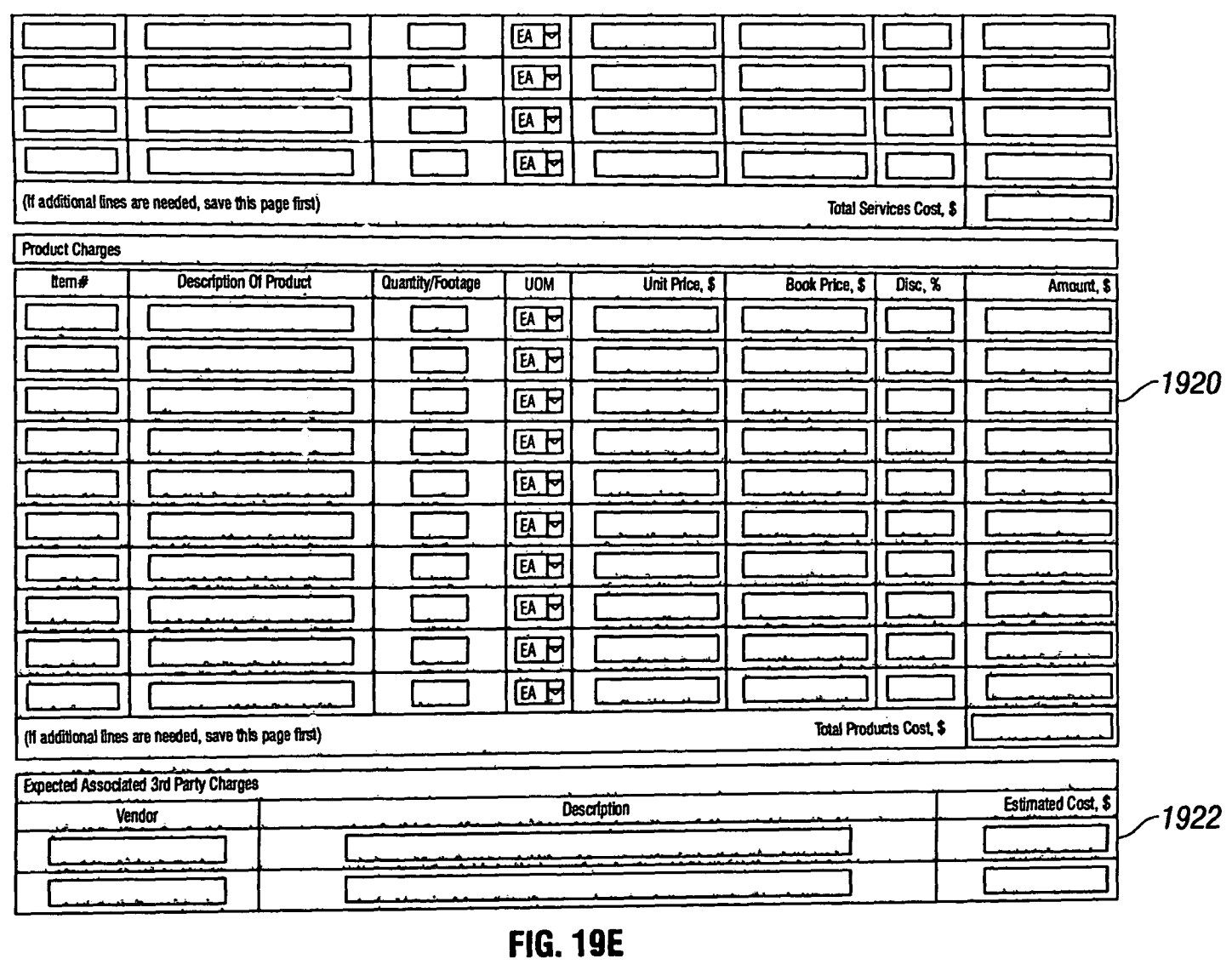
Figure 19F:
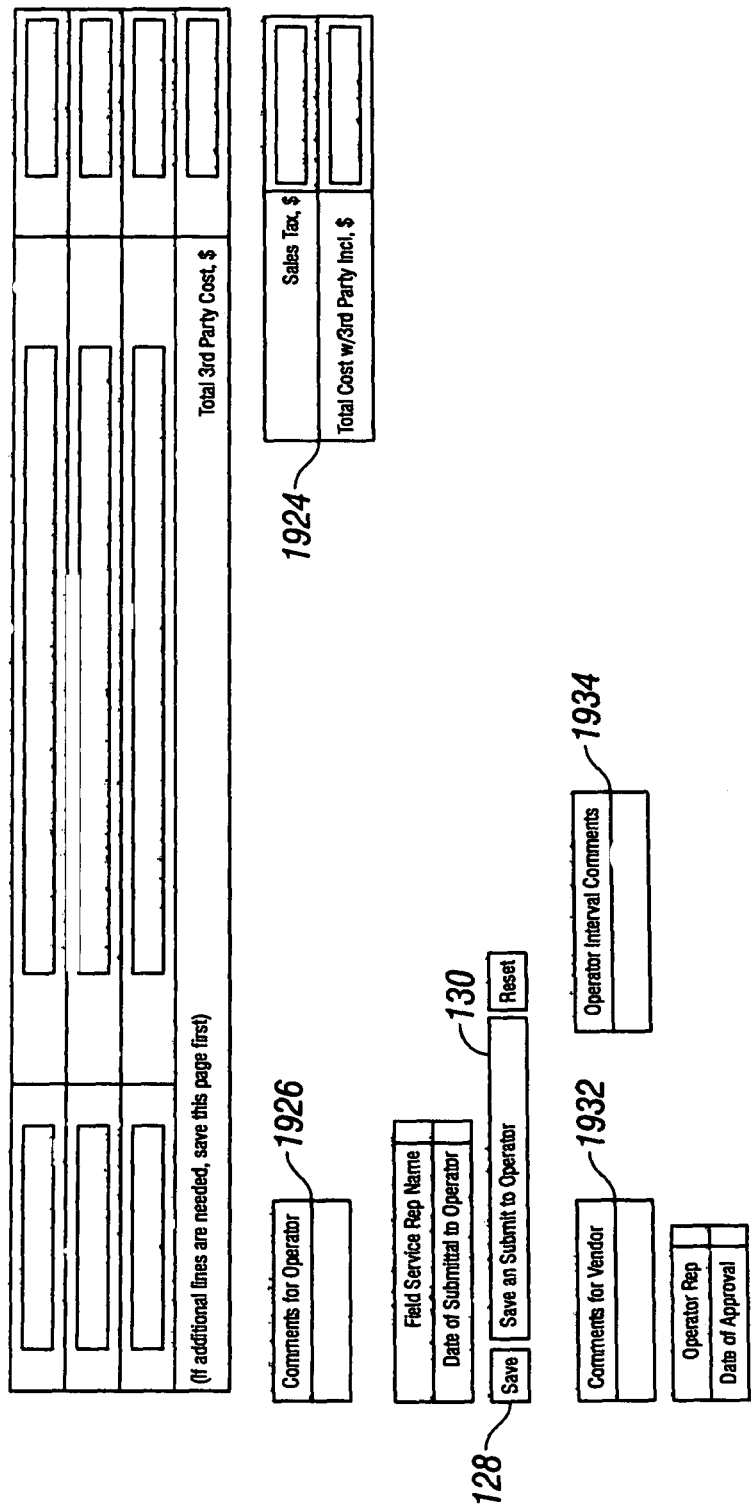

FIG. 19D-F are exemplary screen shots of a specific eField Ticket template page in an Internet embodiment of the present invention detailing time and materials costs and fees.

Figure 20:
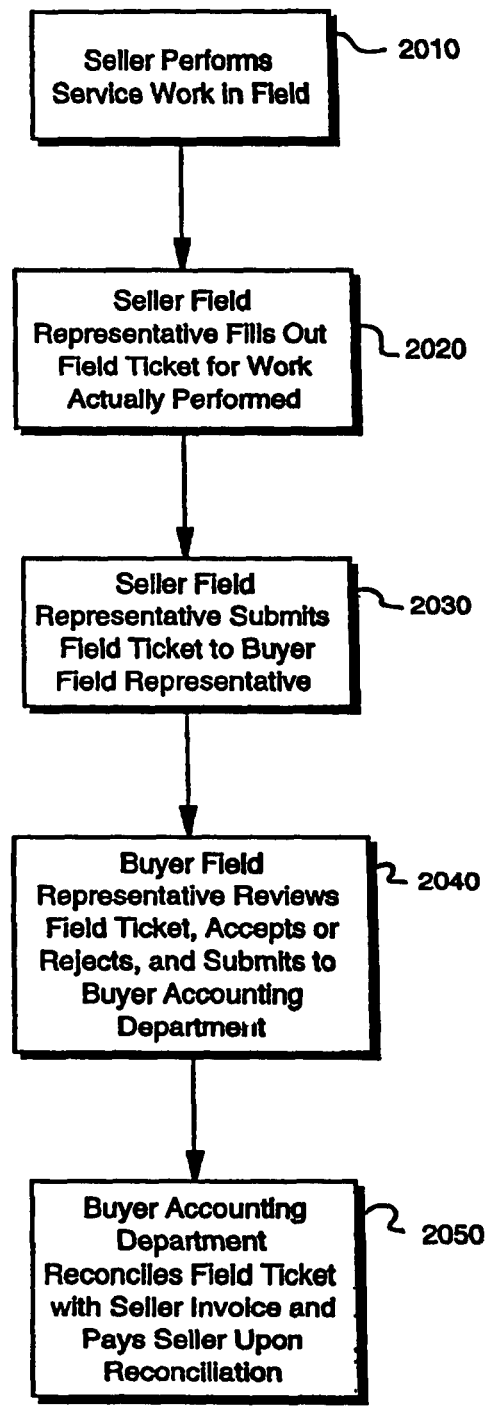

FIG. 20 is an exemplary flow diagram of the steps in processing a field ticket according to the system of the present invention.

Figure 21:
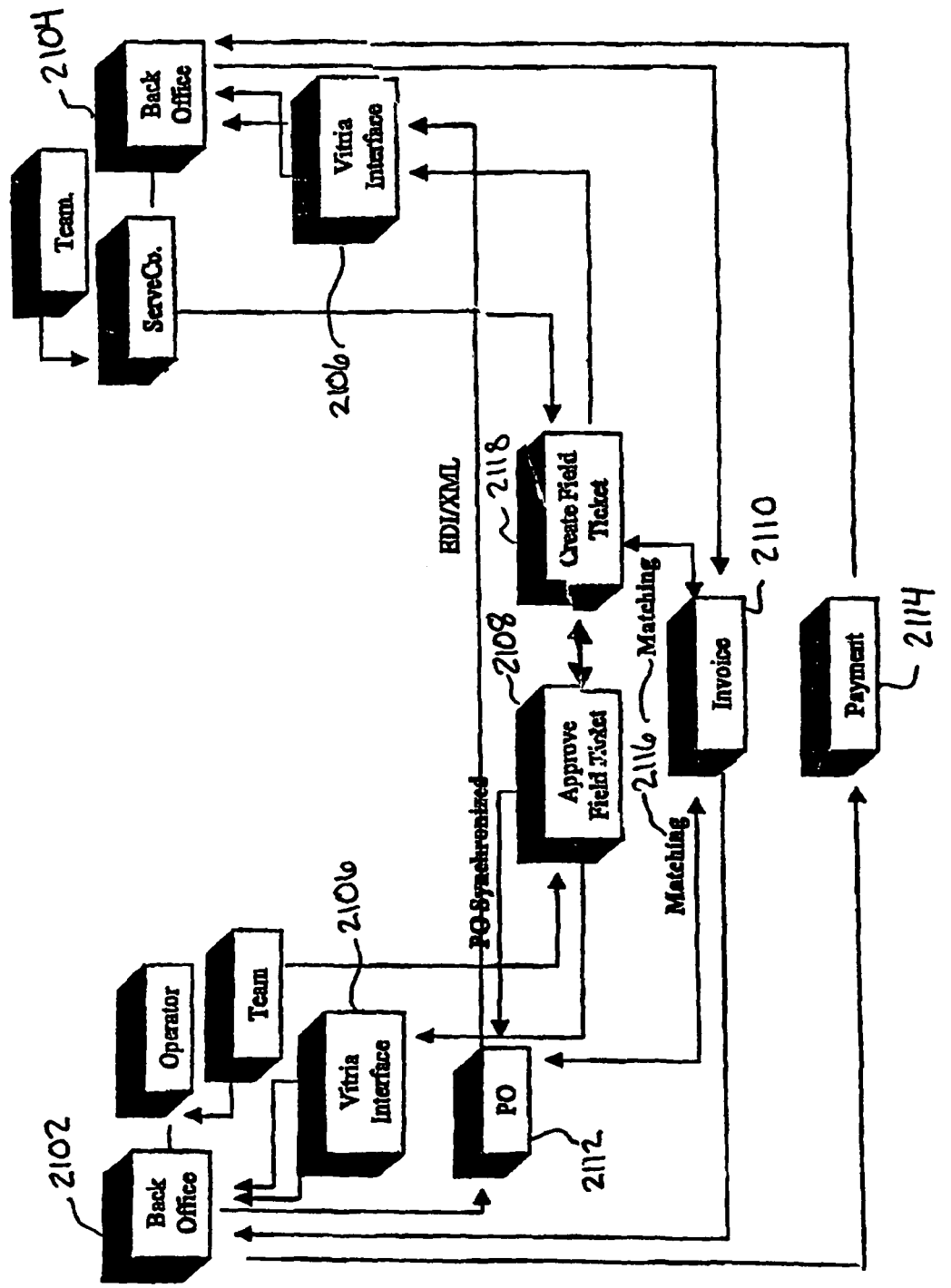

FIG. 21 is an information and interface flow diagram depicting the major functional steps of processing a field ticket and providing payment according to the system of the present invention.

DETAILED DESCRIPTION OF THE INVENTION

Figure 1:
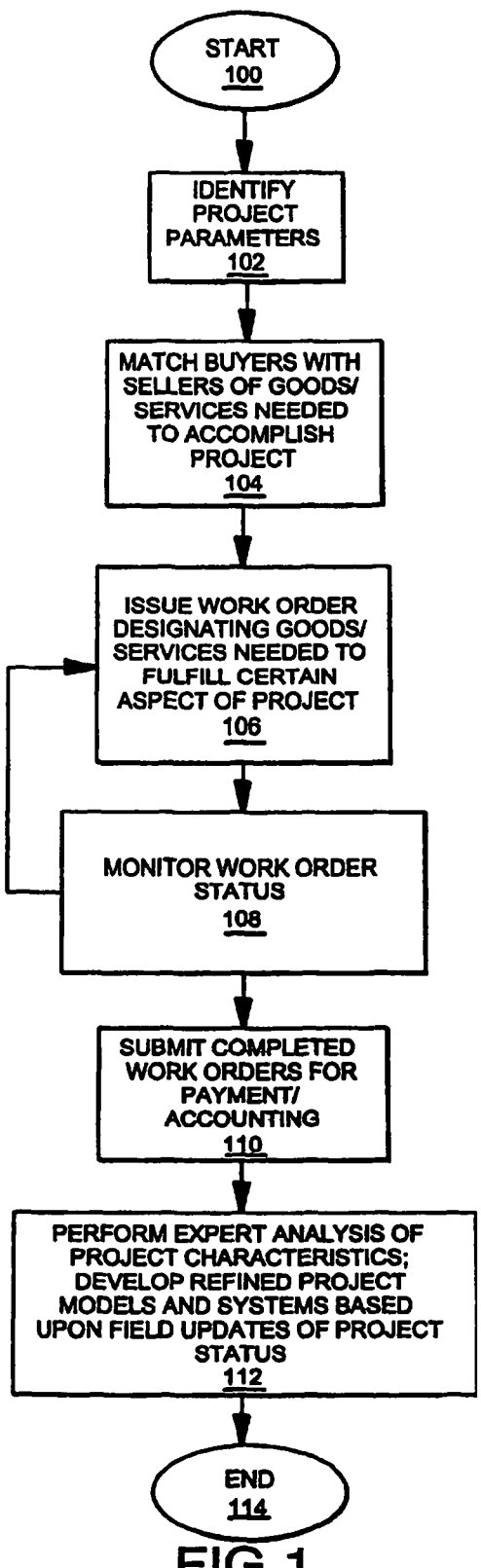
FIG. 1 is an exemplary flow diagram of the process used in a preferred embodiment of the present invention to match buyers and sellers for either goods or services, or goods and services based upon the specification of Parameters.

FIG. 1 provides an overview of a preferred embodiment of the process the present invention. As shown, the process of the present invention generally provides the functions of allowing a buyer to identify a project in terms of project Parameters (Block 102). These Parameters are then utilized, by a system implementing the process, to generate requests for the provision of either goods or services, or goods and services needed to accomplish the project and match buyers with sellers of such goods or services, or goods and services (Block 104). Preferably the requests are received by at least one seller who then provides a response specifying the terms and conditions under which the seller is willing to provide the requested goods or services, or goods and services or alternatives thereto. Depending upon the amount of variation between the request and proposal, and other factors, the process preferably continues with negotiations occurring between the buyer and at least one seller until the necessary terms are agreed upon and a matching of a buyer with a seller is accomplished.

Upon matching such buyers and sellers, the process provides the capability of entering into contracts between the buyers and sellers for the provisioning of the needed goods or services, or goods and services. Additionally, the process provides for continued monitoring of the progress of the project by utilizing work orders (Block 106). The work orders preferably provide an electronic task sheet that is utilized by sellers to identify tasks/goods to be provided and the status of such tasks/goods. Automated monitoring capabilities for the work orders are also provided (Block 108). Such monitoring features enable the process and users of the process to stay abreast of developments and the status of a project.

Upon completing a work order, the process provides for the person accomplishing or responsible for the work order to submit an updated work order that details activities performed, costs incurred, and other information (especially accounting and billing information). Such information may be utilized by automated billing systems and other back-end functions (Block 110). Additionally, the process provides the capabilities of using knowledge management systems to identify project trends, recommend solutions or changes to project Parameters, provide a basis for future project planning, and perform various other expert based functions (Block 112).

Figure 2:
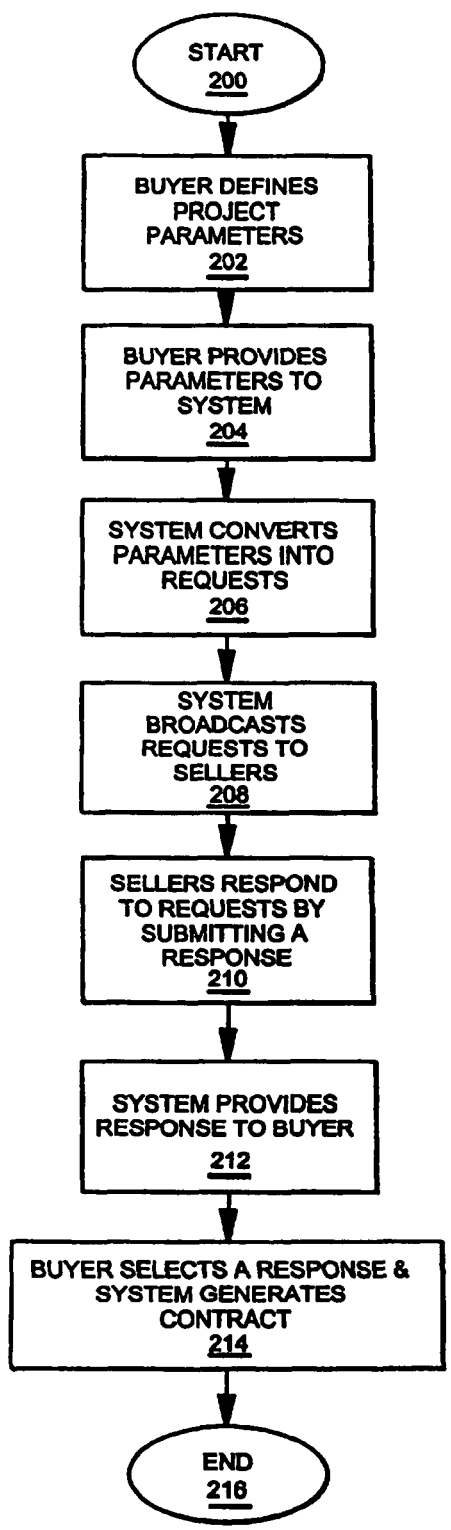
FIG. 2 is an exemplary flow diagram of the process shown in FIG. 1, wherein the process steps of defining Parameters, matching buyers and sellers, through the step of generating a contract is depicted for the preferred embodiment of the present invention.

FIG. 2 provides an overview of the processes utilized to identify a project in terms of Parameters, generate requests by buyers, and receive responses from sellers to such requests.

As shown, the process preferably begins when a buyer specifies a Parameter for a project (Block 202). These project Parameters may be as simple or as complex as a particular project requires. Additionally, the project Parameters may include Parameters, which were previously specified for similar projects, that are imported into the new project's definition fields. The specifications provided for a given project are preferably defined in terms of Parameters. However, the process accommodates any specifications and any Parameters.

The process also accommodates various methods of defining project Parameters. In one embodiment, project Parameters are specified using a plurality of inputs to prompts provided by the process. In other embodiments, project Parameters are provided to the process by transferring files generated via other processes. For example, the process of designing a building may be as simple as importing a building design on a Computer Aided Design/Computer Aided Manufacturing (CAD/CAM) system, or as complex as entering every building specification into a system implementing the process.

File transfer of information, data, files, or other attachments to project Parameters generated on buyer applications external to the inventive system may be facilitated through the present inventive system by translating the data into an industry standard format such as XML or EDI. In this manner data can be imported into the present system for manipulations and translation into desired Parameters. The Parameters may further be transformed into data suitable for export to systems operated by partners or sellers for seller use in outside modeling applications to generate information necessary to complete a proposal. Such data formatting may also allow sellers to provide supporting documentation for proposals to buyers for review. This ability to import data from multiple sources into the system workflow and provide supporting documentation in the form of attachments allows users to save considerable time and effort in defining the Parameters of the project or services within the inventive system.

In the preferred embodiment, the system suitably enables a buyer (whether the buyer is, for example, an engineer, an architect, a computer programmer, or even a non-technical person) to define a project in generic terms without having to specify the precise quantities, qualities, time constraints, and other variables commonly utilized when defining a project. That is, the present invention enables a buyer to specify, for example, an oil well drilling project in geological terms without having to specify a particular type of well casing or a type of drilling fluid to be utilized.

The present invention also facilitates the definition of appropriate Parameters and responses to requests for proposal by integrating information from a variety of relevant resources into the workflow process. In addition to the ability to import information from their own applications and systems, as described above, buyers and sellers are also provided access within a knowledge management component of the inventive system to a vast library of information pertinent to their project field. In a preferred embodiment implemented over the Internet, for example, direct information links to relevant information sources may be provided on each template for easy access by a user. These links may be directly to a pertinent information source, or they may be to a library catalog with further links to multiple information sources. For example, in the drilling industry when a buyer is entering Parameters for a new well, an information link on a template requesting location information may provide the buyer with access to U.S. Geological Survey maps identifying the appropriate range, section, and township.

Information sources provided through a knowledge management component of the inventive system may include, but are not limited to, industry data (public domain or licensed), internal company data, technical articles, general engineering publications, and historical data. This data could be stored within a repository in the system of the present invention, within a buyer or seller's system, or at any source location accessible by and connected to the network. In an Internet embodiment, these information sources can be accessed through hyperlinks provided by the knowledge management component. The information, or links or references thereto, could be compiled and stored manually within the present inventive system, by either the system operators, or through the suggestion of sources made by users. Additional functionality of the knowledge management component can include automatic search engines or "spider" applications that search for specific information sources connected to the network and provide appropriate links thereto for users. For example, Java® agents could be programmed to seek out information especially pertinent to a Parameter entry template and update the library resource listing for that type of project Parameter.

Once the project Parameters have been identified, they are preferably entered into a system implementing the present invention (Block 204). The system then preferably determines whether the project meets the appropriate building codes, quality control standards, business rules, and any other requirements and/or specifications required by law, code, regulations, standards, preferred methods, etc. Such laws, codes, regulations, standards, and preferred methods, for example, are well known in the art, and are not discussed nor identified herein.

When a project clears the aforementioned checks, the process preferably converts the Parameters into requests for either goods or services, or goods and services (Block 206). When converting the Parameters into requests, the process utilizes expert systems, including artificial intelligence modules, rule based processes, matching processes, classification processes, and various other processes or combinations of processes, as necessary, to generate requests for the provision of specific goods or services, or goods and services. The systems and processes necessary to convert Parameters defining a project into at least one request may vary significantly based upon the project, the Parameters, and/or the goods or services, or goods and services needed. The present invention accommodates such variations by providing a process that may utilize other processes, as necessary, to perform such conversions. Additionally, it is to be appreciated that a project may generate hundreds of requests for either goods or services, or goods and services. All such requests are preferably generated and supported by a system implementing the present invention. However, the process may also utilize Parameters provided by external systems (for example, via a network connection, floppy disk, CD, or similar device).

Additionally, each request preferably includes those terms and conditions commonly associated with a particular project or type of project. Such terms and conditions may be provided, for example, on templates, data entry charts, and other devices used to generate requests for either goods or services, or goods and services. Buyer requests, for example, may be requests for proposals, requests for proposals, requests for estimates, requests for feedback, or requests for current contract pricing. However, the process may also suitably accommodate various other types of requests, as desired.

Upon generating a request for either goods or services, or goods and services, the request is transmitted to the sellers (Block 208). The process then continues with a dialogue between the buyer and seller. In order to facilitate the dialogue and reach a common understanding on the scope and terms of the request, when necessary, the process allows both the buyer and the seller to access documents provided via a centralized location and/or over a network connection. Such documents may include the project Parameters, suggestions from sellers about how to accomplish a given task, proposals on either goods or services, or goods and services, and similar information. By utilizing appropriate security systems, the process enables real-time interactive dialogues to occur between a buyer and a seller via any system, format, or protocol that facilitates the communications of such requests to sellers and responses to buyers.

Additionally, the process provides for notifying sellers that a request is available by utilizing any available forms of communication including, but not limited to, e-mail, postings on Internet sites, telephone messages, pager messages, facsimile, and mail. Additionally, the process enables the buyer to determine to whom and when requests are communicated. For example, a request may be designated for communication to specific sellers identified on the buyer's preferred seller listing. Similarly, the requests may be communicated to any seller providing the requested goods or services, or goods and services. Such sellers may be identified in centralized data records, via searches of the Internet, or in other databases. In short, the present invention accommodates the communication of requests and/or responses to as few or as many sellers, buyers, or others, as desired, by the originator of the communication.

Upon receiving requests, sellers may respond in a variety of ways (Step 210). Responses by sellers may include, for example, offers to provide the requested goods or services, or goods and services, offers to provide substitute goods or services, or goods and services, and proposals of alternative solutions. In short, any type of response by sellers may be accommodated by the present invention. As noted above, sellers can be aided in formulating their responses by the information links provided by the knowledge management component of the system. As is further understood by those skilled in the art, responses by sellers may be processed by any system including Internet based systems, telephone message systems, and e-mail systems. In the preferred embodiment, as mentioned previously, responses by sellers are provided real-time to buyers by utilizing a system that permits both buyers and sellers to access a database containing the project Parameters, requests, and seller responses. Therefore, any manner of communicating a response by a seller to a buyer is considered to be within the scope of the present invention.

Once a response is received from a seller, the process preferably provides the response to the buyer in real-time (Step 212). As in the case of communicating requests to sellers, the process may utilize any manner of communicating responses from sellers to buyers and/or notifying buyers and sellers that requests, responses, updates, or any other communications are available for their review. Additionally, as desired, the process may manipulate such responses such that they are in a form specified by a buyer, a seller, and/or a system implementing the process. Thus, the process may convert a response into a legally binding offer, into an engineering specification, or any other format specified by the buyer or seller. The process may also be configured to display side-by-side a buyer's requests with at least one seller's response and preferably with multiple sellers' responses. In this manner, the buyer may review and compare responses simultaneously without having to access numerous databases and/or files.

Upon communicating the response to the buyer, the process preferably continues to facilitate negotiations between the buyer and at least one seller, when desired. When the buyer and seller have agreed upon the terms provided in a response or a counter-response (i.e., a rebuttal provided by the buyer to the seller), the process preferably establishes a contract between the buyer and seller for the provision of the bargained for goods/services. It is to be appreciated that the original request and the seller's response may undergo numerous iterations and modifications before a final agreement between the parties is reached. The present invention suitably accommodates such iterative processes by providing the necessary data archiving and storage functions.

Since delays, rescheduling, and substitutions of either goods or services, or goods and services often occur when undertaking a complex project (for example, drilling an oil well), the process also provides for the adaptation of contractual terms, as necessary, by allowing both parties (the buyer and seller) to monitor the progress of the project at any time via a common database. These project monitoring features enable buyers and sellers to more precisely determine when specific goods or services, or goods and services will actually be needed without having to engage in repeated attempts to contact each other via telephone, fax, e-mail, or other mediums. As is appreciated in the art, for some projects, establishing lines of communications between numerous parties is often impossible, impractical, and financially prohibitive.

For example, when drilling for oil in Greenland it is often very difficult to establish reliable and continuous communication links with the rest of the world. Instead of being required to contact numerous sellers about construction delays or accelerations, the process of the present invention enables a buyer or a buyer's team member (for example, a rig foreman) to simply access a database containing the project's Parameters and provide an updated status to all interested parties (preferably via a network linked to the database). Such interested parties may include the seller providing the pumping rig, the accountants with the oil company, the drilling engineer monitoring the progress of the well from Texas, and others. Thus, the present invention facilitates continued project monitoring after a contract has been formed between a buyer and a seller for the provision of either goods or services, or goods and services. Additionally, by maintaining databases, the process facilitates the archiving of projects, requests, proposals, and other information. The archived information may then be utilized to further the processes by which project Parameters are converted into requests and buyers and sellers are matched.

Figure 3A:
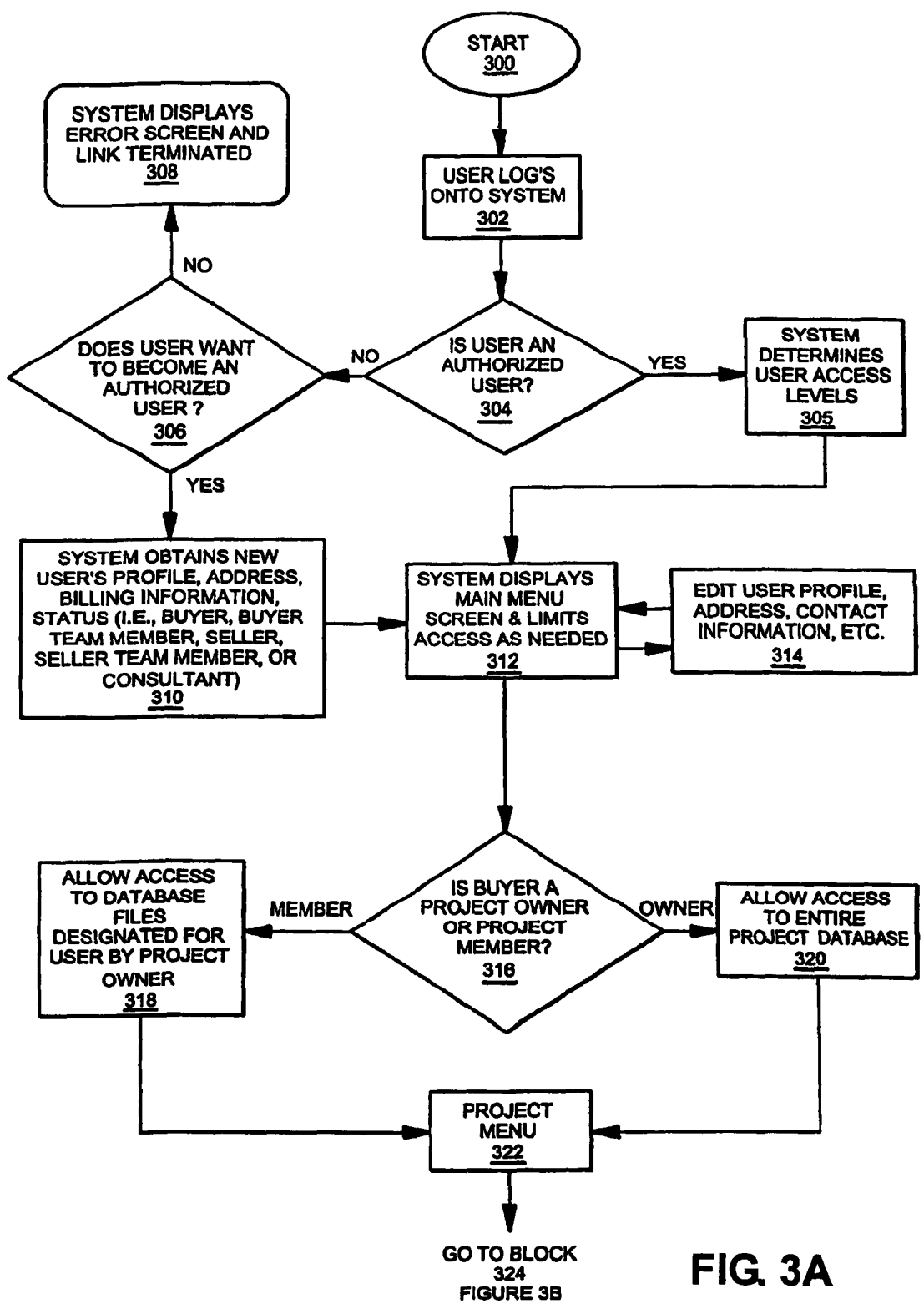
Figure 3B:
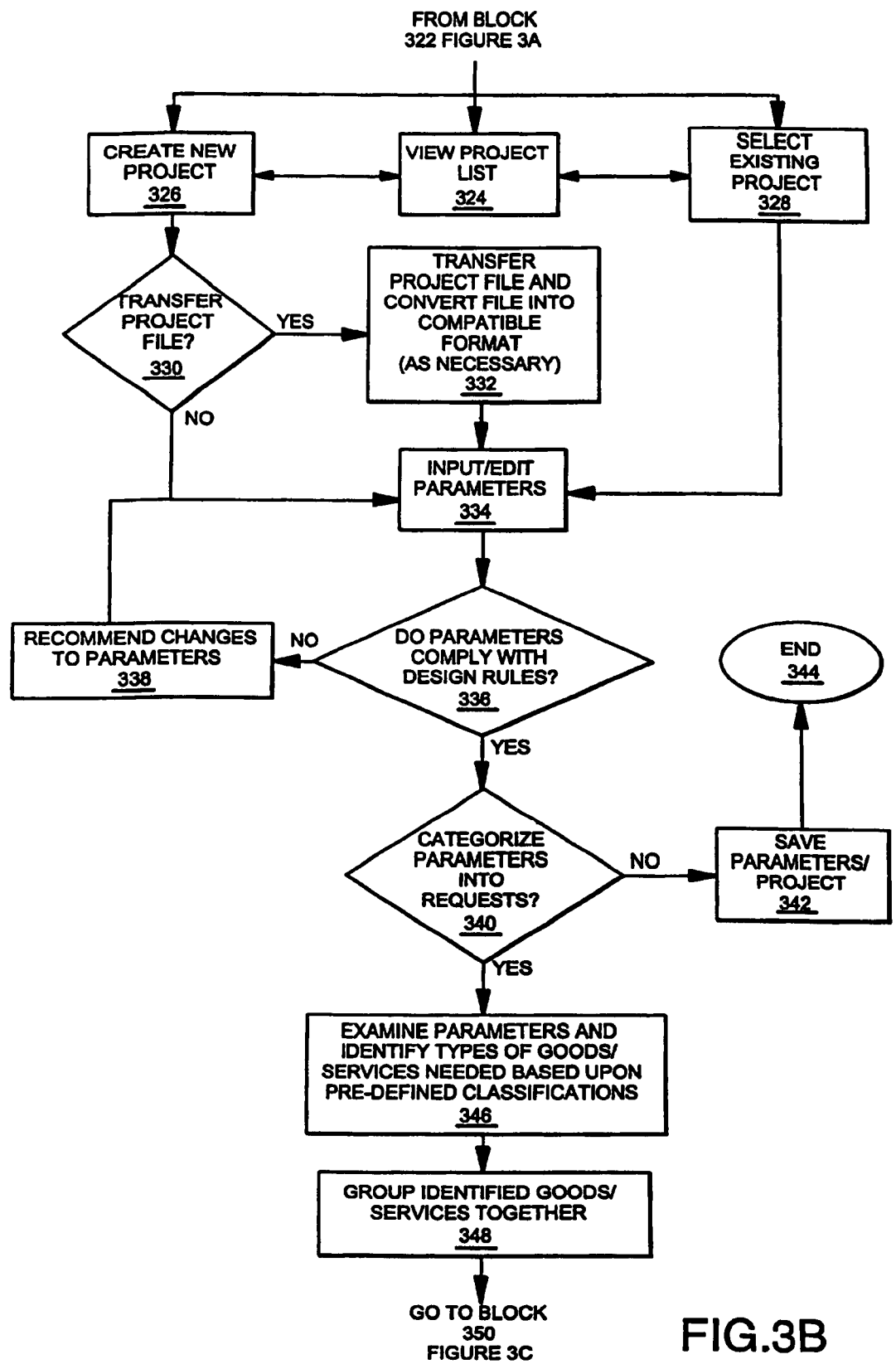

FIGS. 3A-C illustrate another embodiment of the process by which the present invention facilitates the generation of requests and responses, and the formation of contracts for either goods or services, or goods and services between a buyer and at least one seller. As shown for this embodiment, the process begins when a user logs onto a system implementing the process (Block 302). Upon logging on, verification is made that the user is a project owner (i.e., a buyer), a member of a buyer's team, a seller, or a member of a seller's team by requesting an appropriate user identifier (Step 304). The process allows a buyer to designate members of a team working on the specific project while also allowing sellers to designate their team members. Further, a buyer may limit access to information associated with a project to specific buyer's team members and sellers. Additionally, the buyer may deny certain buyer's team members permission to submit requests, reply to responses, or to perform various other tasks. Similarly, a seller may limit the authority, access, and capabilities of seller's team members. Team members may also be, for example, joint interest partners in a project, as is common in the oil and gas industry. Such partners may be granted as much or as little access to the project information as any other team member. In this manner, the process allows buyers and sellers to set the desired levels of security required to access specific features and information provided by the process.

Additionally, verifications of user identities may be accomplished in a variety of manners including log-ins and passwords, determinations of originating locations (i.e., from where the link is being established), bio-identifiers (i.e., fingerprints, retinal scans, and voice prints), and via various other techniques. The process may utilize any system for verifying a user's identity, but, in the preferred embodiment, such verifications are accomplished via a sign-on name and password. Thus, it is to be appreciated that like any publicly networked system, any person on the network may obtain initial access to a server providing the system. However, access to specific data files, features and functions of the present invention are limited to authorized users, as specified by the buyers and sellers.

Referring again to FIG. 3A, when a new user or an unauthorized user logs onto a system implementing the process, a query is issued as to whether the user desires to become an authorized user (Block 306). If the user does not desire to become an authorized user, the process terminates and an error screen is preferably displayed (Block 308). In this manner, the process prevents unauthorized users from tying up the system or the network connections.

When a new user desires to become an authorized user, the process continues with obtaining information from the user (Block 310). The information obtained may include, for example, a user profile that includes a name, address, phone numbers, bank accounts, billing information, and other information necessary to engage in electronic commerce. The information obtained also includes an identification of whether the user is to be a buyer, a buyer's team member, a seller, or a seller's team member. When the user desires to be a buyer or a seller, the process preferably includes a verification of the user's credentials. The verification step may be accomplished automatically (for example, by searching a directory of suppliers in a particular industry sector), or manually (for example, by having a customer support specialist verify via phone, fax, writing, or other sources a user's identity). In this manner, the process limits misrepresentations of buyers and/or sellers.

Similarly, when the user desires to become an authorized buyer's team member (for example, a drilling engineer assigned to a buyer's team), or a seller's team member, appropriate verifications are made with database files established by the buyer or seller, as appropriate, for identifying team members. Additionally, the process also may issue telephone, fax, e-mail, or direct data inquiries to a buyer or seller seeking authorization to add the new user to their respective teams. Similarly, when a buyer or seller establishes a team, preferably the buyer or seller specifies the level and type of access each team member is to have. For example, a geologist on a buyer's team may have access to templates providing geological information, but is not allowed access to processes that submit requests, accept proposals, or other functions. In this manner, the present invention provides a system and process that enable a buyer/seller to limit and provide access to a centralized project database for any team member, regardless of location, while also preventing access to the information and features of the process by an unauthorized user.

When an authorized user accesses a system implementing the present invention, the process also allows the user to edit their profile information, profile information for a team (for example, adding or deleting users from a project team), and perform various other administrative tasks (Block 314). Additionally, once the user has gained access, the process continues to provide access to files as determined by the user's status (Blocks 316, 318, and 320). One manner in which access to files and features of the present invention is provided is preferably via a main project menu (Block 322). The main project menu provides a user who happens to be a buyer with various options such as viewing a list of existing projects (Block 324), creating new projects (Block 326), and selecting an existing project (Block 328). Similar options are also provided for sellers, as further described herein. However, various other features may also be provided at this stage of the process, as desired, depending upon the user's authorizations and access. Such features, for example, may include reviewing new requests for proposals (when the user is a seller or a seller's team member), reviewing responses to requests (when the user is a buyer or buyer's team member) and reviewing updates to requests. In short, the process may be modified as desired to allow access to the various features and functions of the process at any time, as desired, and is not limited to a specific process flow.

When the view project list feature is selected (Block 324), the process preferably allows a buyer (or, a buyer's team member) to select various categories of projects including, but not limited to, pending projects, completed projects, deleted projects, archived projects, and projects within specific date ranges, territories, or based upon any other Parameter. The process provides for the storage of project information on permanent storage devices (for example, CD-ROMS, hard disk drives, network servers, and disk packs) accessible from any location capable of establishing a network connection (for example, via an Internet connection over a satellite phone). The process also facilitates the updating of projects and the copying of projects or project aspects (which may be useful, for example, in building tract houses, drilling multiple wells in a specific area, or repetitive activities). Thus, the process enables a user to access data quickly as needed, and to utilize such data in specifying new projects, revising requests, modifying requests, and various other tasks. Additionally, the process may be configured to automatically populate data applicable to multiple projects or aspects of a project. Such data may include, for example, billing information, contact information, legal descriptions, special terms and conditions, and any other information. In this manner, the process of generating requests may be as streamlined as desired.

When a buyer desires to create a new project, the process preferably queries the buyer as to whether any aspects of the project should be transferred or copied from a pre-existing file (Block 330). This could be either a pre-existing project file resident on a system implementing the process, or a file wholly separate from the system. For example, a building specification may be designed on specialized architectural software and transferred as a data file to a system implementing the process and subsequently converted into the appropriate format (Block 332). Similarly, in an oil drilling application, geological data on a well design might be imported from a geology application software program and converted by the process into the appropriate Parameters. Those skilled in the art appreciate that various software modules and interface platforms, such as an XML interface described above, may be utilized in conjunction with the present invention to convert data files of a first type into a data file compatible with the process of the present invention.

Upon completing a transfer of a file into a format compatible with the process, or when a file transfer is not desired, the process preferably continues with the buyer or buyer's team member inputting and/or editing Parameters that describe the project (Block 334). Depending upon the complexity of the project, numerous Parameters may be needed to describe a project or, for example, in the case of a simple product purchase, only a few Parameters may be needed. The process preferably provides templates and other data entry fields (which may be selected, for example, via pull-down menus) to assist the buyer or buyer's team member in entering and/or specifying the appropriate Parameters. The templates preferably request a buyer to provide those terms and conditions (i.e., the Parameters) necessary to describe the project, while not requiring the buyer to actually specify a specific quantity or a need for a particular good or service. As such, the templates may assist a buyer in completely defining a project by providing data fields requesting specific information essential to defining the project. For example, an oil-drilling project may include a template that provides data fields for entering a well hole depth, a location, and a date. The remainder of the terms (for example, the fact that a particular drilling rig may be needed because of the desired well depth or location) is preferably determined automatically by the process based upon the buyer's inputs. These templates may be automatically populated by importing data from applications used or files created on the buyer's system. The buyer can additionally supplement the data in the templates with attachments providing additional information or reference links to such information from other sources.

Similarly, the process also allows a buyer to specify commodities (i.e., specific goods or services, or goods and services) without identifying a complete project or project specifications. For example, a drilling engineer may need only 10,000 feet of well casing. Instead of specifying a project and well for such casing, the system allows the engineer to request the specific goods or services, or goods and services as needed, where they are to be delivered, and when they are needed. The remaining Parameters needed for such a project (for example, arranging transportation for the casing to the well) are preferably determined by the process (either automatically or in conjunction with a buyer's inputs). In short, the process allows a buyer to define a project in general terms, with additional specifications provided either automatically or upon prompting on detail sheets and templates generated by the process. Those skilled in the art appreciate the fact that the level of detail often is inversely proportional to the level of expert and/or rule based processing available to convert the Parameters into specific requests for either goods or services, or goods and services. As such, the present invention may be tailored to any desired level of expertise (for example, a master, apprentice, or novice level). Additionally, the process may be configured to recognize that a specific buyer may need additional prompts or assistance, as demonstrated by a buyer experience rating. Additionally, to facilitate the generation of requests, the process preferably gears each detail sheet to the needs of the buyers in light of the available technology. In this manner, the process enables buyers to enter as little detail as possible, if so desired, while the system "fills-in-the-blanks" and provides the remaining details necessary to prepare a request by accessing the appropriate program modules, expert systems, and other rule based processes. The process is also, preferably, routinely updated to take into consideration new products, techniques, and methods for accomplishing a given task. Such updates may be automatically generated by the present invention or suitably accessed from other systems via a network, such as the Internet, or other communications systems.

Once the Parameters for the project have been provided, the process preferably continues with verifying that the Parameters comply with the appropriate design rules (Block 336). The design rules are preferably provided as elements of a process provided for an industry specific application. For example, design rules specific to the construction industry may specify conditions such as the type of reinforcement utilized in a foundation supporting a given story building, or the grade of wiring needed to provide a dryer circuit. Additionally, generalized design rules, which are applicable to a wide variety of industries and/or projects, may also be utilized by the process. Such generalized design rules may include, for example, ensuring compliance with environmental rules and regulations, OSHA rules and regulations, and other information applicable to a project.

As may be appreciated, various types of design rules may be utilized to verify Parameters. These design rules include, but are not limited to: comparisons (for example, verifying the dimensions of a window frame are larger than the window itself); relative relationships (for example, window #1 is 90% larger than window #2); algorithmic (for example, whether a building lot size minus the footprint of the building is greater than zero); complex algorithmic relationships; external rules; membership based rules; case based rules; and expert system based rules (for example, the process evaluates the data, determines the likely purpose, and is able to verify correctness).

When the Parameters do not comply with the various design rules, the process suggests changes to the Parameters (Block 338). The changes suggested vary depending upon various factors including the project at issue, the Parameters already entered, and the design rules. The process provides the design change recommendations to the buyer, which the buyer may add, delete and/or modify. The process preferably records the recommendations, additions, modifications, and deletions of each Parameter for subsequent use by knowledge systems when attempting to streamline the matching process.

After the buyer has provided a set of Parameters (which preferably have been verified by the system) the process continues with either saving the Parameters for future use or categorizing the Parameters into at least one request for a good or service (Block 340). As may be appreciated, for complex projects, such as drilling an oil well, the Parameters may be reviewed and modified by numerous geologists, engineers, rig operators, and others prior to the generation of actual requests for either goods or services, or goods and services (Block 342). Additionally, a buyer may desire to develop the Parameters for a project and save such Parameters for future use after regulatory or other approvals have been acquired. As such, the process preferably provides a mechanism by which the user may save project Parameters without having to produce requests for either goods or services, or goods and services. At this stage, the process preferably ends or is temporarily delayed until new Parameters are provided or a request is generated based upon the Parameters (Block 344).

When the buyer desires to have the Parameters converted into requests for either goods or services, or goods and services, the process preferably continues with examining each Parameter (as provided in a template or data entry field) and identifying different classifications of either goods or services, or goods and services needed to satisfy each Parameter (Block 346). The process preferably makes such identifications by utilizing pre-defined classifications of goods (for example, casing, wiring, and lumber) and services (for example, cementing, framing, and plumbing). When Parameters exist for which a classification does not exist, the process preferably generates unique classifications reflective thereof. These unique classifications are preferably selected by the buyer for transmission to select sellers providing similar goods or services, or goods and services, but may also be provided to any seller, as desired by the buyer.

Additionally, in an alternative embodiment, the process may also include searches of other projects for the buyer in order to determine whether economies of scale may be obtained by combining requests from numerous projects into one request (Block 348). For example, the purchase of 2.times.4 boards may be less expensive by the truckload than by the half truckload and by combining two housing project requests into one request, a truckload of lumber may be requested and savings realized. Similarly, a user may also authorize the process to combine requests based upon geographic or other considerations. Thus, the process may be configured to obtain any desired economies of scale in the procurement of either goods or services, or goods and services by associating Parameters with classifications of either goods or services, or goods and services.

After identifying classifications of either goods or services, or goods and services and grouping such goods or services, or goods and services together, the process preferably determines whether a first grouping depends upon a second grouping for information (Block 350). For example, the system might determine that a drill bit grouping depends upon casing information in order to know which type and/or diameter of drill bit to request. The process also examines whether descriptions of either goods or services, or goods and services exist for the groupings identified. For example, a drilling engineer might request specialized equipment for which either goods or services, or goods and services classifications do not exist. In such instances, the process preferably creates an error report that may be utilized to identify new groupings and sellers of either goods or services, or goods and services fulfilling each such grouping. Additionally, the process preferably converts groupings of either goods or services, or goods and services into specific goods or services, or goods and services descriptions that correlate to either goods or services, or goods and services descriptions being offered by a seller in a geographic area. In this manner, both the buyer and seller are in concurrence as to which goods or services, or goods and services are fulfilled by specific descriptions.

In addition to converting Parameters into requests, the process may also be configured to attach conditions, terms, documentation, and other information into identifications of either goods or services, or goods and services (Block 352). These conditions may include, for example, warranty provisions, payment terms, and delivery terms. Documentation may include additional information about the project to supplement the Parameters given. For example, a geophysical survey may be attached to a proposal request for a particular well drilling project. Such attachments, for example in a preferred Internet embodiment, may take the form of hypertext URL or other file transfer links to information located on the buyer's system.

At this point, the process preferably searches at least one database containing a listing of sellers providing the goods or services, or goods and services identified in the groupings (Block 354). Such databases and files may include preferred seller lists, non-approved seller lists, and other information necessary for determining to which sellers a request for the identified goods or services, or goods and services should be made. Further, the process may also be configured such that buyers search only for pre-approved sellers of either goods or services, or goods and services. In some industries, for example oil and gas, buyers often desire to enter into agreements only with proven sellers. Similarly, some sellers may desire not to be identified as providing either goods or services, or goods and services to some buyers (for example, due to a past history of poor payment). The process also interrogates any additional databases and files, as necessary, to determine whether specific sellers should receive a request from a specific buyer.

In order to accomplish the searches for sellers, preferably each seller has pre-registered with a system implementing the process. When registering, each seller suitably identifies the classifications of either goods or services, or goods and services they provide and any specific terms or conditions for such goods or services, or goods and services (for example, delivery and payment options). Sellers may adjust the goods or services, or goods and services they provide, or are designated as providing, at any time. Additionally, the process may search databases (for example, the yellow pages), the Internet, and other resources, as desired, to identify sellers of specific classifications of either goods or services, or goods and services, even if the seller is not registered with a system implementing the process.

Upon identifying those sellers that provide the needed goods or services, or goods and services, the process preferably continues with the buyer designating sellers to whom the requests are to be transmitted (Block 356). While the process preferably transmits requests only to the selected sellers, it is to be understood that buyers may select as many sellers as desired to receive requests (even sellers that do not provide the requested goods or services, or goods and services). The process also allows buyers to utilize a preferred sellers list (or similar pre-identification of those sellers with whom the buyer desires to conduct business). When a preferred sellers list exists, the process preferably limits communication of such requests to only the preferred sellers. The process also facilitates the anonymous requesting of goods or services, or goods and services by masking a buyer's identity or using other confidentiality and security features such as secure socket layers, encryption schemes, and dedicated networks.

Once the buyer has identified those sellers to whom the requests are to be communicated, the process preferably allows the identified sellers to access the request (Block 358). Additionally, the process provides a notification to each identified seller that a new request is outstanding. Such notifications are preferably made utilizing, when available, a notification scheme pre-designated by the seller. For example, some sellers may prefer to be notified via a pager, while other sellers may prefer an e-mail message. The process of the present invention accommodates these and other commonly known methods for notifying a seller.

Upon receiving and reviewing a request, sellers may either offer a response to the buyer, recommend alternatives to the request, make proposals, or ignore the request. Since the request is merely a solicitation for offers and is not an offer itself, the process does not create any binding obligations until a response containing a binding offer is received from a seller and is accepted by the buyer. Additionally, when the seller responds to the buyer's request, the process allows a seller to modify terms and conditions of the request, recommend changes, or provide other communications to the buyer, via the shared common database. However, the process may also be configured such that a seller's access to a database containing the request may be limited to only reviewing the request and then either accepting or not accepting the request.

Regardless of the level of access provided to a seller for any request, the process preferably maintains copies of the original request, responses, and subsequent communications between the buyer and seller, thereby providing a record of the negotiations between a buyer and a seller. Further, the process preferably allows the buyer access to all the responses from the various sellers, while prohibiting access by a first seller to a second seller's response, and vice versa. In this manner, collusion, price fixing, and various other undesirable practices are discouraged, since each seller is not aware of to whom a given request has been submitted or the responses by the various sellers receiving a request. However, the process may also be suitably configured such that an open bidding process is provided wherein each identified seller may review the request, responses from other sellers, comments, and offers.

Upon receiving a response from a seller and before the process provides the seller's response to the buyer, the process preferably determines whether the seller has recommended an alternative solution to the request or changed any of the material terms of the request. (Block 362) Further, the process screens responses and identifies to the buyer those terms in a response that vary from the terms of the request. The process may accomplish such identifications by highlighting the changed terms, providing a warning notice to the buyer when the buyer opens the response, or by any other notification means. In one embodiment, the process may allow the seller to provide multiple, alternate responses to a request and provide a comparison of all the responses to the buyer. The process may also allow the buyer to compare the responses of multiple sellers at both summary levels and on a Parameter-by-Parameter basis, and to manipulate Parameter variables to evaluate various proposals based upon possible project outcomes. However, the process may also be configured such that determinations of changed terms and identifications thereof are not provided, when so desired.

Additionally, the process preferably verifies whether the response complies with the design rules established for a given task (Block 364). For example, a response changing a particular gauge of wiring selected for a given task might be upgraded to a lower gauge or downgraded to higher gauge by a seller. If the changed gauge provides the necessary load carrying capacity for the given circuit, as in the case of a lower gauge, then the process preferably accepts the design change. However, if the changed gauge does not provide the necessary load carrying capacity, then the process preferably notifies the seller of the deficiency and allows the seller to change the response or to not change the response, while highlighting the discrepancies to the buyer (Block 366). Preferably, the process verifies the seller's response when it is submitted. However, the process may be configured to verify a seller's response at any time, for example, during the formulation of the response, or at a later time (for example, when a new regulation comes into effect that may impact the response). Therefore, the process preferably applies the same business rules and design verifications to each seller's response as it applies to each buyer's request. In this manner, both sellers and buyers are assured to a given level of certainty that a request, and response is acceptable and in compliance with the appropriate business and other rules. However, the process may also be configured, as desired, such that the design rules and other preferred verifications of a seller's response are not conducted and/or provided.

Further, when a seller's response does contain terms or Parameters that have been identified by the process as not being in compliance with a given rule, the process preferably utilizes expert and knowledge based systems to suggest changes to the seller's response (Block 368). For example, an expert based system for electrical projects may recommend that a lower gauge of wiring or a modified circuit design is needed in order for the response to comply with a given set of electrical codes, for example, a set of codes accessible via a network connection such as the Internet. The seller may then accept the recommended changes, provide other changes, or deny all changes and submit the response (Block 370). At this point, the process again verifies whether the response complies with the design rules (Block 364) and the process continues with verifications and/or design changes until either the response complies, or the seller indicates that the response will not include any more changes and that it is to be presented to the buyer as specified. At this point, the response is available for the buyer to review and a notification that the response is available is preferably sent to the buyer (Block 372).

As is to be appreciated by those skilled in the art, the process of verifying a response and multiple revisions to a response may be accomplished as many times as is necessary and desirable. For highly complex operations, such as building an airplane, in which numerous variables, factors, and design rules may come into play, the request/response review process may be quite extensive. The present invention preferably accelerates such design review processes. For example, changing a seat configuration on an airplane may impact systems such as electrical, environmental, weight distributions, and numerous others. As such, the process preferably automates as many design rules as possible, thereby simplifying the conversion of design Parameters into requests for either goods or services, or goods and services and the verification of responses thereto.

In many circumstances, it may be desirable for the seller to provide additional information, outside the scope of the specific project Parameters, in order to aid the buyer's decision. For example, the seller may wish to inform the buyer of the quality or new design of a product the seller anticipates using to complete the project, or the seller may want to provide extensive technical feedback to support the merits of the proposal. In a preferred Internet embodiment, such detailed information and technical feedback may be provided to the buyer in the form of URLs entered into the seller's proposal. These URLs may easily provide this information to the buyer, which might otherwise be difficult for the buyer to locate, perhaps even linking the buyer to nonpublic information located within the seller's system. The URLs could also provide links to repositories on the system, or to other publicly accessible information provided, for example, on third party systems accessible via a communication network. Although publicly available, such information may be hard to find without significant searching, deep into the information records (e.g., web pages) of the information source. The invention allows the seller to provide beneficial information links in the form of "deep links," providing easy, direct access by the buyer to the desired data and information supporting the seller's proposal.

Upon a buyer being provided with a response, the process preferably continues with the buyer reviewing the response, accepting the response, deleting the response (with or without reviewing the response, for example, when the buyer has already accepted another seller's response), or entering into negotiations with the seller providing the response (Block 374). Depending upon the buyer's reaction to the response, the process may be continued at practically any step along the before mentioned process flow. As part of the process of review, the system allows a buyer to compare, analyze, and evaluate responses from multiple sellers. In a simple embodiment, the buyer may choose the seller responses to compare and the system will present the components of these responses in a side-by-side manner for easy review, or prioritize responses based upon such a comparison.

Buyers can also manipulate seller responses to determine the impact of changes in Parameters on the proposals. For example, if a buyer receives multiple responses to a request for a cementing job on a well, and five sections of each response are based upon day rates for such services, the buyer could change the Parameter of the number of days it might take to complete the service to see how the cost of the service by various sellers might change. For example, in one scenario, a first seller's cost might be less than a second seller's cost if the length of time necessary to complete the job is less than five days, but may be significantly more if the job takes longer than five days. The system can also be configured to compare the goods or services, or goods and services needed across multiple projects managed by the buyer and offered by sellers in responses to requests to determine whether economies of scale for such goods or services, or goods and services may exist.

It is to be appreciated that in a scenario where no seller provides a response, or upon consideration of seller responses in light of further manipulation of the Parameters defining the project, the buyer may be forced to reconsider the project, change terms of the project, identify additional sellers, or perform various other actions. Similarly, in the case where a seller's response suggests changes to the request that the buyer may not have considered, the request may be suitably modified by the buyer and then resubmitted to all sellers, select sellers, or even only to the seller recommending the changes. As such, the actions accomplished by the buyer upon receiving a response may be varied and widespread and cannot be accurately captured in a simple flow diagram. The present invention provides a process with sufficient flexibility such that a buyer or a seller may accomplish any process step at any time, when feasible.

Preferably, the buyer and at least one seller eventually agree upon a response that fulfills the buyer's needs. When this occurs, the buyer and seller preferably elect to enter into an agreement, utilizing the terms supplied in the final negotiated response. The process facilitates those actions (commonly known in the art) necessary to enter into an agreement and provides the ancillary documentation, verifications, and other components needed in an agreement (Block 374). Additionally, for the preferred embodiment, the agreement is entered into electronically without the exchange of any paper based documentation or agreements between the buyer and seller. As such, the process preferably covers all aspects of designing a project, determining goods or services, or goods and services necessary to complete the project, and the entrance into at least one contract providing for such goods or services, or goods and services.

As is appreciated by those skilled in the art, the process described above may be implemented on any system, network architecture, configuration, device, machine, or apparatus, and is not to be construed as being limited to any specific configuration, network, or systems. The process may be suitably implemented on conventional computing devices, for example, computer workstations, on Internet based applications, on optical computing devices, neural computers, biological computers, molecular computing devices, and other devices. As may be appreciated by those skilled in the art, the present invention, in short, may be implemented on any system, automaton, and/or Turing machine. Similarly and more specifically, the Parameters specified by a buyer in a request (or a seller in a response) may include any Parameters necessary to adequately describe a buyer's needs and/or the goods or services, or goods and services that a seller can provide in response to such needs.

Also, the present invention is not limited to matching specific types of buyers with specific types of sellers. Any buyer may utilize the present invention, as desired, to acquire goods or services, or goods and services from any seller. For example, drilling engineers may utilize the process to obtain casing used in a well from both steel pipe and concrete pipe sellers. Similarly, a financier of an oil-drilling project may acquire investors for the oil-drilling project by providing project specifications to potential investors (sellers) who then offer to provide financial resources (services) to complete the project. As such, the present invention may be modified, as necessary, to match buyers and sellers for any goods or services, or goods and services regardless of industry, complexity, local, or any other consideration.

The present invention also provides a process that allows sellers to pre-identify themselves as providers of goods or services, or goods and services based upon categories and/or classifications of goods or services, or goods and services instead of identifying themselves based upon specific goods or services, or goods and services. Such identifications may include, for example, industry product codes. Similarly, the present invention may also be configured to facilitate the automated matching of buyers and sellers by searching the Internet and similar networks for sellers of goods or services, or goods and services when a general request is submitted by a buyer. Such features suitably expand the universe of potential sellers for a given request beyond those sellers pre-identified to the process—a feature that may be extremely valuable when rare goods or services, or goods and services are needed.

As shown in FIG. 4, the process of the present invention may be implemented by a system 400 for matching buyers 402 and sellers 404 of goods or services, or goods and services via a network 401. The network 401 may be any means of communicating a buyer's needs for goods or services, or goods and services (as reflected by Parameters associated with such goods or services, or goods and services) to sellers. The network 401 similarly facilitates the needs of sellers 404 to provide goods or services, or goods and services to buyers 402. A processing system 406 controls the interchange of information between buyers 402 and sellers 404 through the network 400, thereby ensuring an organized and controlled market is established and maintained for both buyers and sellers. The processing system 406 also preferably converts a buyer's needs into requests provided to sellers and facilitates all of the interactions between the buyers and sellers, and other processes identified herein. However, those skilled in the art appreciate that the features and functions of the buyer's system, the seller's system, and the processing system may be suitably combined or separated into any number of components and systems, as desired, without departing from the scope of the present invention. For example, the features and functions of the processing system, in an alternative embodiment, may be provided in part by the buyer's system while the remainder of the functions and features are provided by the seller's system. The present invention is not limited to any specific configuration, system, networks, or devices.

Additionally, the process of the present invention accommodates any type of network, system, method, or means of converting and communicating a buyer's needs for goods or services, or goods and services to at least one seller. The process of the present invention may be accomplished by any system that allows a buyer to specify Parameters that are then converted into requests for goods or services, or goods and services and communicated to sellers of such goods or services, or goods and services. Examples of such systems include, but are not limited to, telephony-based networks (wherein Parameters are specified using telecommunication devices connected to the processing system 406), computer based networks (such as the Internet), optical networks, neural computing networks, and biological computing networks. It is to be appreciated, by those skilled in the relevant arts, that the process of the present invention may be accomplished in a multitude of configurations, systems, architectures, networks, and devices.

In an illustrative embodiment of the present invention (described in greater detail below), the process is accomplished via an Internet based system. The Internet provides the interfaces, the communications mediums, the software, databases, and expert systems, via at least one server, which are used by a buyer to communicate Parameters for a project, convert the Parameters into requests, and communicate the requests to a seller. A seller, upon receiving notification that a request is outstanding, utilizes a compatible device (for example, via a wireless device) to review requests, recommend alternatives, and submit proposals—all via an Internet connection. Responses from sellers may then be verified by the Internet and/or transmitted to the buyer. Thus, in a preferred embodiment, a computerized network facilitates a buyer's specification of a project's Parameters, converts the project Parameters into requests for goods or services, or goods and services, and presents such request(s) to sellers providing the needed goods or services, or goods and services.

Further, as is commonly appreciated, the Internet based system may utilize various forms of communication including, for example, file transfers, e-mail, facsimile, audio communications, and video communications. Various other forms of communication, all of which are well known in the art, may also be utilized. As such, any and all forms of utilizing the Internet are considered to be within the scope of the present invention. Further, buyers and sellers may be connected to the Internet via various devices and systems including computer workstations, laptops, personal data assistants, pagers, wireless telecommunications devices, and other devices. The connection of such devices to the Internet, or any other communication network used, is well known in the art and may include the use of transmission mediums including: telephony, wireless telephony, digital subscriber line, two-way cable, fiber optic, radio, point-to-point microwave, and satellite.

The process of the present invention may also be implemented via a distributed Internet architecture in which a plurality of servers, each of which is accessible via the Internet, provide the processes described herein. Also, as is appreciated by those skilled in the art, other embodiments of the present invention may also be accomplished by various configurations of computerized and electronic systems and resources. Distributed network architectures, centralized architectures, Internet based systems, dial-up systems, wide area networks, and local area networks may all be used by the present invention, as needed, to facilitate communications.

In an alternative embodiment, the present invention facilitates the matching of sellers with buyers based upon Parameters specified by a seller. As can be readily appreciated, a process that matches buyers with sellers may be suitably modified to match sellers with buyers. Thus, for example, a seller desiring to reduce an inventory of raw materials used in making various grades of steel could submit a request seeking buyers of steel products. Such buyers could include those in various industries such as the automotive industry, aircraft industry, and even oil and gas industry. The process may be adapted to allow a seller to reach markets with which the seller is not generally associated. Therefore, the present invention provides a process for matching buyers with sellers, and sellers with buyers of goods or services, or goods and services based upon the specification of Parameters.

Additionally, the present invention facilitates targeted marketing of sellers' goods or services, or goods and services by utilizing Profile Links. As shown in FIG. 5, the process by which the present invention provides the targeted marketing preferably begins when a buyer selects a template or data entry field on an system implementing the buyer and seller matching process of the present invention. However, while the Profile Links are preferably utilized in conjunction with the above described process of matching buyer and sellers, it is to be appreciated that the Profile Links may be utilized in conjunction with any system, process, or application that identifies a user based upon their current on-line activities. Additionally, for the purpose of the present discussion, the Profile Links process is preferably implemented whenever a buyer accesses a screen on an Internet or Internet emulating process (i.e., a process that enables a user to jump from one data page to another upon selecting a link thereto).

As shown in FIG. 5, when the Profile Links are provided in conjunction with the above described matching process, the Profile Link process is preferably implemented whenever a user selects a template, data entry field, or function that has an associated Profile Link (Block 502). At this point, the Profile Link process suitably determines a profile for the buyer (Block 504). In the preferred embodiment, in which an Internet based web site and/or application is the medium by which a vendor advertises their goods or services, or goods and services to a user, the buyer profile information is obtained before the buyer accesses a page or template providing a Profile Link. Preferably, the profile information is obtained when the buyer "signs-up" for the matching process of the present invention or another system implementing the Profile Link process.

More specifically, when the buyer signs-up, the process queries the buyer about various topics and subjects. These queries may cover any topic that an operator of the process or a seller considers to be important. For example, when a general contractor signs up for the process, a query may be issued asking in which geographic areas the contractor generally constructs buildings. Based upon this information, a profile may then be established that indicates to suppliers of areas outside the buyer's general geographic area, that the buyer may not be a good target for their goods or services, or goods and services. However, the present invention is not limited to pre-set profiles or pre-set queries for determining a profile. The buyer's profile may be established by responses to inquiries, previous entries, buying habits, Internet access habits, specific needs, or other indicators. The buyer profile may also be established by the simple fact that the buyer has accessed a specific Internet site, web page, or application. Additionally, the process may be modified, as necessary, to accommodate the various goods or services, or goods and services, characteristics, needs, and preferences of buyers, sellers, and operators of any system implementing a Profile Link.

Further, profiles may be created on a separate computer processor or on the buyer or seller's computer workstation. As such, the profiles may be centrally generated and/or remotely generated. Profiles may also be packetized and distributed across the Internet, as desired. Those skilled in the art appreciate the various methods, systems, and configurations by which profiles of users and/or vendors may be created, stored, shared and manipulated via the Internet. Therefore, the present invention is not to be limited to any method or system for determining, providing, or using a profile. Any method that provides sufficient information to establish such profiles (to whatever degree of precision) may be utilized by the present invention.

Upon determining a user's profile (i.e., a buyer's profile or a seller's profile), the process preferably screens any previously entered or established profiles and determines which profiles "best fit" a buyer based upon a buyer's current activities, the Internet site selected, and/or the application being utilized by the buyer (Block 506). The "best fit" screening process may consider factors such as geographic location, previous requests for goods or services, or goods and services, and past history with specific sellers (i.e., does the buyer have a history of using the seller's goods or services, or goods and services). The "best fit" screening process may also consider whether the buyer has specifically identified a seller as a preferred vendor. However, the process is not limited to any specific screening tests, or conditions and may utilize any factor to identify those sellers whose goods or services, or goods and services "best fit" a buyer's current needs.

Once sellers have been screened and those with the "best fit" identified, the process suitably displays such information on the appropriate screens or templates. The Profile Link information may be displayed in any portion of a screen display, for example, in the location of a screen wherein a banner advertisement is often displayed. Similarly, the Profile Link information may be displayed in any manner, at any location on an Internet screen display. Those skilled in the art realize the various locations, configurations, and mechanisms by which a Profile Link may be presented to a buyer. As such, the present invention is not to be construed as being limited to merely replacing banner advertisements with Profile Links and may include any manner of providing such Profile Links to a buyer.

FIG. 6 provides one embodiment of a system implementing the Profile Links feature. As shown, in this embodiment a Profile Link processor 602 is in communication with at least one database 604 and the Internet 606. The Profile Link processor 602 may comprise any processor capable of handling the profiling and data manipulation features necessary to target sellers' goods or services, or goods and services to a buyer. As such, computer workstations, mainframe computers, servers, and other networked systems may be utilized as the Profile Link processor. In the preferred embodiment, the Profile Link processor utilizes a distributed architecture, thereby allowing multiple processing systems to provide the Profile Links and various other marketing features of the present invention to a wide variety of buyers and sellers.

The system also includes a seller's system 608. The seller's system includes those devices necessary to connect a seller's computer workstation or other system to the Internet 606. Additionally, the seller's system 608 may be configured to communicate directly with the Profile Link processing system 602, while bypassing the Internet via other communications links 620, as desired. The seller's system may be implemented on any Internet compatible device including pagers, telephone systems, laptop computers, personal data assistants, and similar devices. Further, numerous profiles may be established for each buyer and seller. Such profiles may be task specific (i.e., they are utilized only when a user is accessing a particular template or data entry field) while other profiles may be generic to all buyers and sellers. For example, different profiles for a seller of trucking equipment may be established based upon locations of dealerships, option packages, price, delivery terms, and other terms. The process suitably receives, processes, stores, and manages such data to establish unique profiles as necessary.

The seller's system 608 can communicates via the Internet 606 or via other communications links 614 with an Internet Service Provider (ISP) 612 hosting an Internet application or web page, for example, the matching process of the present invention. As is appreciated by those skilled in the art, the ISP 612 may be any Internet site, application, or web page and is not to be construed as being limited to the matching process of the present invention or any other process. A seller may access the ISP 612 to provide profile information, respond to queries, or, for example, monitor web pages.

Similarly, a buyer's system 610 can be connected via a link 622 to the Internet 606, and/or via a second communications link 616 to the ISP 612. As provided for the seller's system, the buyer's system 610 may be any device that provides Internet connectivity and the functions and features specified herein. Such devices include personal computers, personal computing devices, wireless telephones, interactive televisions, Internet equipped radios, pagers, personal data assistants, and other devices.

The present invention facilitates targeted marketing based upon buyer and seller profiles, preferably obtained via an Internet or other network based system. As buyers and/or sellers respond to requests and responses, enter data, navigate the web, and perform other functions, the Profile Link processor compiles such information and establishes profiles based thereon. The Profile Link processor may provide numerous profiles for each buyer and seller, as desired. Thus, the present invention additionally provides a method and system for providing targeted marketing to buyers based upon profiles of buyers and/or sellers. While the Profile Link feature of the present invention has been depicted with reference to the process shown in FIG. 5 and the embodiment shown in FIG. 6, it is to be appreciated that the Profile Link feature is not limited to any hardware configuration, software applications, or processes. The Profile Link feature may be implemented on any system and may utilize any scheme, method, or system for utilizing buyer and/or seller profiles to target marketing to such buyers and/or sellers.

FIG. 7 provides an information flow diagram between the various components of one Internet based embodiment (IBE) of a system 700 for implementing the process of the present invention in the oil and gas industry. In this embodiment buyers are generally large operators involved in oil and gas exploration and production. These operators procure the services of individual service providers, which are the sellers, to provide goods, equipment and services to drill and operate oil and gas wells. For example, such services can include drilling and cementing; goods can include drill bits and concrete; and equipment can include drilling rigs and transportation. Dashed line 760 marks the interface/integration boundary between the IBE system 700 and a buyer's system and other buyer related data and application resources. Dashed line 762 marks the interface/integration boundary between the IBE system 700 and a seller's system and other seller related data and application resources. Dashed line 764 marks the boundary between buyer accessible and seller accessible components in the IBE system 700.

The workflow of a project proceeding through the oil and gas IBE system 700 may be described as follows. A buyer first enters well project information 702, preferably via an industry specific template for capturing project Parameters, into the IBE system 700. The project Parameter information may be entered by the buyer manually, or by uploading the information to populate the template from a buyer-side information source 704 external to the IBE system 700. The buyer-side information source 704 can be internal data created or maintained by the buyer or from any buyer or third party application or information source. In the IBE system 700 for the oil and gas industry example, additional workflow steps are undertaken to capture the necessary Parameters to describe the project. Once the project information is entered, the configuration of particular wells 706 to be drilled for the project is specified. With these project level and well level Parameters entered, the IBE system 700 transforms these Parameters into technical DynaMaps™ 708, the technical portion of a request for quote, by populating appropriate fields for the project in DynaMap™ templates.

Information needed or helpful to the preparation of the technical DynaMaps™ is available from several sources. Applications for modeling different aspects of a well can be made available for use within the IBE system 700. For example, in an oil and gas industry embodiment an internal fracture design module 712 can be used by a buyer to model how a formation can be fractured to enhance the oil or gas flow to the well. This Parameter information can be imported into such a modeling application module 712, and modeling information can be exported to appropriately populate a technical DynaMap™ template 708. The IBE system 700 may also have an internal information database 714 with a repository of industry specific information or references and links to such information provided through other sources. The internal information database 714 may be part of a knowledge management system that automatically seeks out, stores, and catalogs relevant information, and further identifies particular information collected with particular steps, templates, or fields used to define Parameters within the IBE system 700. A third source of information for constructing technical DynaMaps™ 708 in the IBE system 700 is a buyer-side information source 710. This information source 710 may provide historical data captured by the buyer, common project specifications and standards developed by the buyer, and other internal or external information references. Information source 710 may be a part of a single buyer-side information source that includes information source 704.

A fourth source of DynaMap™ information support may be solicited from or provided by a seller, using a similar DynaMap™ creation component 716 provided by the IBE system 700. The seller's DynaMap™ creation component 716 can similarly access data and other relevant industry information from the internal information database 714 in the IBE system 700, or from a seller-side information and data source 717. For example, in this embodiment, a seller with particular experience or expertise could provide Parameter information to help the buyer develop a technical DynaMap™ 708. In other instances, sellers familiar with the buyer's projects may convince the buyer to initiate a request for quote ("RFQ") 718 by providing a service DynaMap™ 716 to the buyer indicating a better or less expensive method of managing a project. Other types of complex projects, i.e., other than the oil and gas industry example, may have different components with greater or fewer steps or templates to adequately and accurately capture and describe the Parameters of any particular project and convert those Parameters into RFQs 718.

Once all of the necessary components of a request are completed and assembled, the RFQ is sent 718, along with any additional information or data attachments, to appropriate or chosen sellers, who are then notified 719 by the IBE system 700 that such an RFQ has been made. The RFQ, including any Technical DynaMaps™ and attachments are then reviewed 720 by the seller in order to prepare a response (i.e., a proposal) or an alternate proposal for the buyer. The seller may prepare the response by exporting to seller-side systems 722 the data from the technical DynaMaps™ and any attachments. The seller can analyze and manipulate the buyer's data as need be using the sellers own applications and thereby determine an appropriate response. When the data is analyzed, the seller may import it back into the IBE system 726 for integration into a response or proposal 726. Similar to the buyer-side, the IBE system 700 can translate the seller's data to populate the templates necessary to respond to and RFQ, The seller may also import other information 724 into the IBE system 700, for example, industry or company standards, internal or external references, or other technical or commercial data. This additional information may be translated to become part of the response templates 726, provided as attachments to the response, or provided as reference links in the response allowing the buyer to access that information directly from the seller or from a third party source.

The seller then sends a completed response 728 or proposal to the buyer. The IBE system 700 notifies 729 the buyer that a response from the seller has been lodged so that the buyer can review the response 730. At this point the buyer has several options. If a seller provides a suggestion within the response that the buyer finds particularly helpful, the buyer may want to revise the RFQ 732 with the seller's suggestion and re-bid 718 the project to all of the sellers. In another instance the proposals may have additional attachments of data, information, or references. In this case the buyer may want to review 734 this additional information by accessing it from remote sources or processing the data on buyer-side applications 736.

Within the sellers' responses, alternate solutions for completing the project may be offered by different sellers or by a single seller. The buyer may wish to compare these alternate responses 738 to determine the best method for completing the project or simply determine the best price between multiple sellers of the same goods or services, or goods and services. If an alternate response is particularly desirable, the buyer may wish to revise the RFQ 740 with the suggestion and resubmit a revised RFQ 718 to the sellers. Once the buyer has compared all of the possible proposals and alternatives, the project, or portions thereof, is awarded 742 to one or more sellers. Financial information detailing the project award is preferably transmitted to accounting, sales, and other financial management systems of both the buyer 746 and the seller 744.

When the seller completes performance on the project, it provides actual performance data 748 to the IBE system 700. This actual performance data preferably includes both costs for the goods or services, or goods and services provided, and information about the conditions encountered that the Parameters attempted to define. Actual performance data can be provided by seller-side systems 750 such as accounting programs, and in the case of oil and gas projects, electronic field ticket entry (described later herein in detail). In the oil and gas industry, a field ticket captures many of the actual results of a project, both financial and functional. In general, field ticket or actual data consists of measurements or observations taken during the performance of the project. In a preferred embodiment, such actual data observed may be provided to the IBE system using wireless processing and communications technologies. The actual performance data is used to update the configuration Parameters 752 with the actual information to aid in the request process for future projects involving the same or similar parameters. This actual information may further be stored by the buyer system 754 for historical reference purposes. The actual cost information is also used by the IBE system 700 to reconcile 756 purchase orders, field actuals, and final invoices to provide appropriate payment by buyers to sellers for the completed project.

Referring now to FIGS. 8A-19E, the IBE is depicted through a series of screen shots of web page templates from an Internet based application provided by Wellogix™ and its predecessors WellBid™ and eNersection.com. Those skilled in the art appreciate, however, that embodiments of the present invention and the Wellogix embodiment may vary substantially or insubstantially in the features and functions provided by such systems without departing from, modifying, adding, or deleting to the scope of the present invention as described herein and expressed in the claims.

As shown in FIG. 8A, the IBE facilitates the entry of project specifications and buyer or seller profile information in order to match buyers with sellers of goods or services, or goods and services in the oil and gas industry. More specifically, the IBE is initially accessed by inputting the appropriate uniform resource locator on a web browser connected to the Internet. As shown, upon accessing a server hosting the IBE, a main menu page 800 is displayed. This page 800 provides access by both a buyer and a seller, via an Internet connection, to the features and functions of the present invention. However, as discussed above, it is to be appreciated that this embodiment, and various other embodiments of the present invention, may be accessible via any network and system including, but not limited to, the Internet, intranet, private network, local area networks, wide area networks, distributed networks, and public networks. The main menu page provides links (via tabs, buttons, and hyperlinks) to various other screens (which are provided on various web pages). Further, the IBE preferably provides the before-mentioned security and control features by utilizing a login name 802 and password 804 to control access. Additionally, various links to industry related information, and other information is provided. Such information links appear elsewhere throughout the pages and templates of the IBE to afford users the ability to consult such sources when determining the Parameters for projects.

The main menu page also provides an "Apply Today" link 806 by which a new user may apply to utilize the IBE. Upon a user selecting the Apply Today link 806, a new page in the IBE is accessed that requests profile information from the person logging on. FIG. 8B displays a representation of the user profile page 820, which contains user profile information that may be suitably selected by "clicking" upon the appropriate drop down menu item 822 and entering data in the appropriate data fields 824. The information requested includes a name, address, login name, password, title, email address, region and basin (in which the user primarily operates-as is commonly used in the oil and gas industry), corporate affiliations (for example, if the user is an employee of XYZ gas company), and other information. This information is then verified for its accuracy by a customer service employee and, upon verification, a user login name and password is created.

The use of drop down menus, buttons, hyper links, and data entry fields for obtaining profile and other information is well known in the art, and is not discussed further in reference to the IBE. As may be appreciated by those skilled in the art, various Internet links and pages may be accessed in any of a multitude of combinations and sequences. As such, the present description, for purposes of illustration only, is provided for one possible sequence of screen displays and data entry. It is to be appreciated that various other methods of entering and accessing information via the present invention and the IBE may be utilized without departing from the spirit or scope of the present invention.

The IBE also preferably provides buyers and sellers the ability to enter and maintain information about any joint interest partners for any project in the system. FIG. 8C depicts a screen shot 830 for capturing joint interest partner information in the IBE. Such information may include the name 832, address, and other contact information 834 for any partners, identification of the projects subject to such partnerships 836, and indications of percentage ownership 838 between the partners. The IBE interface may further allow the user to control whether and to what extent any joint interest partner may have access to project information captured, stored, and processed by the IBE.

When a registered user (who is a buyer or a buyer team member, hereafter collectively referred to as a "Buyer") logs onto the IBE, a page is displayed similar to that shown in FIG. 9A. As shown, the Bid Request Summary page 900 provides, to the Buyer, the status of current requests (i.e., submitted, unsubmitted, and closed requests) while also identifying those requests for which corresponding responses (or replies) have been received. Further, by suitably selecting any of the underlined terms (hyperlinks), the Buyer is preferably transferred to a web page containing the identified information.

Further, this page 900 also contains links that display an "All Projects List" 902, a "Bid Request Summary" 904, Profile information selectable by a drop down menu 906, Projects information selectable by a drop down menu 908, a "Find a Consultant" link 910 that connects the Buyer with a web page providing a listing (and hyperlinks to home pages) of consultants in a given field or region, and various other links.

To further extend the functionality of the "Find a Consultant" feature, the IBE preferably provides a "Technology Messaging" page 920 as depicted in FIG. 9B. The Technology Messaging form may allow a user of the system to send an instant message via conversation box 922 to any desired consultant, or other buyer or seller, presently logged onto the system as indicated in online box 924, for example to ask a technical question or opinion relating to preparing a project request or proposal. The Technical Messaging interface may also be used by members of the same project team simultaneously networked to the system, as shown in the team member box 928, to exchange instant messages about projects via conversation box 926.

When the Buyer selects the "unsubmitted" link 912 seen in FIG. 9A, the IBE preferably displays the New Bid Request and Details Summary page 1000, as shown in FIG. 10A, which contains a listing of unsubmitted requests for goods or services, or goods and services and relevant summary information. By appropriately selecting the corresponding links, the Buyer may review the status of any of these projects, the well (as listed by name), the hole section, and the requested type of goods or services, or goods and services needed. For example, by selecting the "South Pass 68" link 1002 the system preferably presents to the Buyer project details for the South Pass 68 project via the page 1004 shown in FIG. 10B. As shown for this embodiment, the project details include a project name, project description, project location information, and other information relevant to an oil and gas project. Additionally, this page contains various "buttons" that allow the Buyer to "Edit/Update Project Detail" 1006, "Add Well to Project" 1008, "View Project Users" 1010, and "View Wells for Project" 1012. As stated previously, the present invention provides a Buyer with access to any information at any time desired. As represented by the previously identified buttons (1006-1012), the IBE incorporates a flexible database management system that permits access to information at various times from various web pages.

For example, when the Buyer selects the "View Project Users" button 1010, the IBE suitably displays the Project Users page 1014, which displays those Buyers on a specific buyer's team (the buyer is identified as the "owner" in the IBE) in a table 1016. Additionally, the system enables the buyer/owner to add or delete team members by selecting a specific person from a drop down menu 1018 and designating a role for the person via the menu 1020. The IBE allows as many team members as are desired to be added to a project by the buyer/owner. Additionally, the IBE preferably identifies possible team members when they enroll with the system. For example, all the Company QRS employees signed onto the IBE would be associated with a single pool of potential team members for a buyer/owner who also works for Company QRS, whereas Company JKL employees might not be so associated. Once the team members have been selected, the system preferably returns to the preceding page from which it progressed.

Referring again to FIG. 10A, the New Bid Request page 1000 also allows those Buyers with the requisite authority to view details for each request. For example, when the Rig Specification-Drill Ship request 1022 is selected, the Request Manager page 1024 is displayed (as shown in FIG. 10D). The system allows the Buyer to review and edit cover info providing status information, naming the proposal request, identifying which suppliers are to receive the request, a due date for responses to the request, comments, and identifying attachments 1026, all of which may be edited. Additionally, the page 1024 provides a listing of details for the request.

When a Detail (for example detail "17") 1028 is selected, the IBE preferably displays the details for the request, as shown in FIG. 10E on the "CH Logging . . . " details page 1030. In the IBE, each detail page also includes a Profile Link 1032 that contains an identification of sellers for goods or services, or goods and services associated with a specific request (in this case CH logging). Additionally, the Profile Link 1032 enables the Buyer to select specific sellers as preferred sellers, identify a sales person or point of contact, and, when available, includes a hyperlink (as underlined) to web pages providing information about a specific seller's goods or services, or goods and services. As mentioned previously, the present invention preferably targets marketing (in this case identifying sellers of goods or services, or goods and services associated with a specific oil field task) to a buyer based upon the buyer's profile information. For example, if the Buyer had previously identified a specific vendor as a non-preferred vendor, then the Profile Link would not display such a vendor to the Buyer. Similarly, if the Buyer identified a seller as a preferred vendor, then marketing information associated with the seller may be provided via the Profile Link to the Buyer. Further, when the Buyer desires requests from any seller, marketing materials may be provided for all sellers, except preferably those previously identified by the Buyer as excluded, via the Profile Link.

Further, each details page 1030 also includes data entry fields in which data may be entered and prompts answered (for example, a prompt 1034 whether production logging is needed). Additionally, as shown, the details page 1030 has been abbreviated from its actual length for purposes of simplifying this description. It is to be appreciated, however, that web pages of any size, length and complexity may be utilized in conjunction with the present invention and/or the IBE. Further, the IBE allows a Buyer to save the details as a final version or a draft, delete the details page, and reset the details to propagated values and/or baseline values/settings, when desired via buttons 1036.

Referring again to FIG. 10D, the IBE generates a proposal package that identifies information about a request in addition to the specific goods or services, or goods and services needed. FIG. 10F provides an example of a portion of a Package page 1040. As shown, the IBE preferably packages a request into a document (electronic) that identifies, for example, the request, the project, and the well's names or names if more than one well is included in the package. The IBE allows numerous requests and/or details for specific tasks to be incorporated into a single package, when desired, thereby encouraging economies of scale and other savings. More specifically, the system allows a Buyer to obtain a proposal from a supplier for any number of jobs (for example cementing jobs) on any number of wells instead of bidding out each well/job independently. In addition to the various information entered or automatically propagated into the various data entry fields (the IBE preferably propagates information from previous data entry fields whenever possible; thereby streamlining the request process), the IBE also allows a Buyer to attach files and establish categories 1042 to which information related to a current request are attached. For example, the request for CH logging is related to casing information and tubing information. Referring again to FIG. 10D, the IBE also enables a Buyer to submit an unsubmitted proposal to preferred sellers via button 1044, select sellers and then submit 1046, and close bidding 1048.

Referring again to FIG. 9A, when Buyer selects the submitted proposal requests link 914, the IBE preferably displays a list similar to that shown in FIG. 1A, except the requests have been submitted. As for the unsubmitted requests, the Buyer may access the requests and modify them as needed. However, when a submitted request is modified, it is preferably issued as an updated request or a new request, which reflects the changes to the old request. In this manner, both the Buyer and the seller can track how a request has been modified from previous revisions, when desired.

Upon submitting a request, the IBE leaves the request pending until the Buyer closes bidding, accepts a response from a seller to the request, or the request expires (as indicated by an expiration date). Whenever any of these events occur, the request enters the closed status. Upon selecting the closed proposal requests link 916, the IBE preferably displays the Closed Bid page 1100, as shown in FIG. 11. As provided before, the Closed Bid page 1100 displays a table listing the proposal requests by date, project name, well name, hole section name, and request/detail type.

Referring again to FIG. 9A, when a Buyer selects the replies link 918, the IBE preferably displays the Replies to Bids Requests page 1200, as shown in FIG. 12A, which identifies all the requests for which a reply/response by a seller has been provided. As provided before (with respect to the other proposal types), this page 1200 provides a table that lists the proposal requests by date, project name, well name, hole section name, and request/detail type. Additionally, page 1200 contains columns identifying the vendor/seller 1202 (hereafter, the vendor and/or seller and/or seller's team member are collectively referred to as the "Seller", i.e., the person providing a response to a proposal request), whether the Seller is interested in the request 1204 (yes or no), whether the Seller provided any feedback to the request 1206, and the response date 1208. Upon selecting a link provided in the vendor column 1202, the IBE suitably displays the Vendor Info page 1210, which obtains information on the selected Seller from a database and presents the information such that the Buyer may obtain contact information for the Seller.

FIG. 12C provides a depiction of a Vendor Feedback page 1212 that is displayed upon selecting a "Yes" link in the feedback column 1206 of FIG. 12A. As shown in FIG. 12C, the Vendor Feedback page 1212 provides a Comments field 1214 in which comments by a Seller have been entered regarding the proposal request. These comments are preferably viewed by the Buyer prior to accepting a response to a request.

Referring once again to FIG. 9A and as mentioned previously, when a buyer accesses the IBE for a new session, the Bid Request Summary page 900 is preferably displayed. In addition to allowing review of proposal requests and replies, this page 900 also enables a Buyer to access project details. More specifically, the project drop down menu 906 preferably enables a Buyer to select an existing project (which in the oil and gas embodiment preferably contains at least one well with at least one hole section), view all projects, or create a new project. When all projects are selected for viewing, the IBE displays the All Projects page 1300, as shown in FIG. 13. This page 1300 provides a table identifying projects by name, region, country, status and the Buyer's role. It also contains a "Create onshore project" button 1302 and a "Create offshore project" button 1304, which provides the same functionality as the corresponding selections provided in the project drop-down menu 906. Specifically, these buttons 1302 and 1304 enable a Buyer to create a new on-shore or off-shore project.

Assume for purposes of illustration, it is desired that an on-shore project be created. Upon selecting the button 1302, or the corresponding entry in the projects drop-down menu, the IBE displays the On-Shore Project Details page 1400 shown in FIG. 14A. This page 1400 provides data entry fields for a project name (here, "John's Project"), a description, country, region and basin, estimated start date, units of measure, and number of rigs. Upon entering and saving, this information is utilized by the IBE to populate any subsequent page that needs the project details.

Further, upon saving the project details, the IBE redisplays the Project Details page 1400 while additionally including buttons to: Edit/Update Project Profile 1404; Add Well to Project 1406; View Project Users 1408; and View Wells for Project 1410, as shown in FIG. 14B. Since in the oil and gas embodiment, a project is basically a collection of wells, the Buyer generally will want to add a well to the project. Upon selecting the corresponding button 1406, the system preferably displays the Well Definition page 1412, as shown in FIG. 14C. The Well Definition page 1412, preferably contains fields in which a Buyer may enter information about a well including: well name, well description, well API number, well type, region/basin; and the location of the surface hole for the well using various measurement systems. Alternatively, instead of entering all of the information needed to define a well, the system also permits the Buyer to copy information provided for a different well into the new well definition by selecting and copying a predefined well via the well drop down menu 1413. In those situations where the Buyer desires to drill many wells using the same or similar techniques, the ability to copy well definitions can save significant time. Additionally, as before, the well information is preferably entered only once into the IBE as it is automatically and appropriately populated to future pages, as necessary.

Upon saving the information entered on the Well Definition page 1412, the IBE suitably displays a summary of the information previously entered on the Well Definition page 1412 as a Well Summary page 1414, as shown in FIG. 14D. Additionally, the system provides a drop down menu for Hole sections 1416, by which a Buyer may describe a hole section for the selected well. As shown in FIG. 14E, the Hole Section Details page 1418 provides fields in which information needed to define a well may be entered and saved. As is well known in the art, the process of defining a well may involve numerous hole sections. The IBE allows a Buyer (for example, a drilling engineer) to define and save each hole section. Referring once again to FIG. 14D, the IBE also allows a Buyer to view the history of a well's performance by selecting the Well Description/History button 1420, which results in displaying the Well Summary page 1422 shown in FIG. 14F. The history of a well is preferably captured in the IBE when drilling engineers, rig foreman, and other members of a drilling team provide update reports. As is common in the oil and gas industry, such update reports are preferably provided daily, however, any other time interval may be utilized including, for example, real-time updates, weekly updates, monthly updates, yearly updates, and updates upon completion of a project.

After the well and its various hole sections have been described, the IBE preferably allows a Buyer to also view all the wells for a project, select specific wells and display a geological prognosis for the well (preferably entered by a drilling engineer), for example, as shown in FIG. 14G. The Geological Prognosis page 1424 provides information on the well's layout including locations of the top hole, any horizontal sections, and the bottom hole. As such, this information, when combined with the other information for the well and the hole sections, provides the needed information to describe the project.

At this point, the Buyer is ready to generate requests for either goods or services, or goods and services needed for the project. The IBE preferably provides a Buyer with numerous options for generating requests. Various aspects of the oil drilling industry are captured in the various request templates provided by the system including for example: CH drilling, mudding operations, casing, drilling fluids, and so forth. Upon generating a request (using templates similar to those previously discussed above), the Buyer directs the IBE to communicate the request to the designated sellers (or all sellers). At this point, the Buyer's actions needed to generate a request for goods or services, or goods and services have been completed. The Buyer then awaits a response, if any, from a Seller.

FIGS. 15A-D provides an example of a request that has been communicated to a seller (after being notified of its existence by the IBE). As shown the Primary Cementing page 1500 provides a request for primary cementing that includes information on all aspects of the well that are relevant to a primary cementing job. Upon receiving the request, the seller is provided with the options of: indicating that they are interested in the project, via the Interested button 1502 (FIG. 15D); indicating that they are not interested in the project, via the Not Interested button 1504; submitting feedback related to the project, via the feedback field 1508 and associated buttons (as seen earlier, the feedback may include requests for additional information, recommendations on alternative approaches, or any other information); and submitting a proposal/response. via the Submit Bid/Proposal button 1508. The interested, not interested, and feedback options provide a reply to the buyer that may then be suitably displayed and examined (as discussed earlier).

When the Seller selects the bid/proposal button 1508, however, the IBE proceeds to provide the Seller with a Bid Pricing page 1510, as shown in FIGS. 15E and 15F (FIG. 15F displaying a populated version of FIG. 15E). As shown, the Bid Pricing Page 1510 for cementing provides fields in which a Seller specifies a currency and various proposed costs for mobilization, set-up, third party costs, services, a total cost, an expiration date for the offer, terms, and other information. Upon entering this basic information, the IBE provides the seller with the option of attaching documents 1512, and/or viewing detailed bid/pricing templates 1514, as shown in the Primary Cementing—Commercial Response page 1516 shown in FIGS. 15G and 15H (FIG. 15H being a continuation of the screen display shown in FIG. 15G). Upon entering the appropriate costs into the detailed pricing page 1516, the Seller may then save the pricing and send the response to the Buyer.

Upon receiving the response and accessing it via the Request Manager page 1600, as shown in FIG. 16A, the Buyer may then view the seller's bid/proposal as shown in FIG. 16B. If the seller's response is acceptable to the Buyer, the Buyer may accept the proposal by selecting the Award button 1602. Upon selection of the Award button 1602, the IBE finalizes a contract for the agreed upon goods or services, or goods and services between the buyer and the seller. In addition to the summary pricing information 1604 provided, the buyer can review more detailed pricing breakdowns by selecting the detailed pricing link 1606 that will access a page with such information.

When reviewing a seller's proposal, a buyer also has the opportunity to evaluate the details supporting the seller's proposal if they are provided. One way a seller can provide detailed information is through the use of file attachments 1610. Another provision of the IBE is a comment link 1608 to a page, FIG. 16C, with specific comments regarding the Parameters of the project. Detailed Feedback page 1620 allows a seller to provide a buyer with specific explanatory information related to how the parameters were addressed in fashioning a response. Additional supporting information can be provided by the seller through the use of direct links 1622 to product and service information, or other technical information specific to the Parameter at issue. These information links can be "deep links" to allow a buyer easy and direct access to pertinent information within a seller's system or elsewhere, without the buyer having to search for it.

The IBE also allows the buyer to compare proposals from multiple sellers 1632a-c in a single environment 1630 as shown in FIG. 16D. The IBE can break down each seller's proposal into line items 1634 by particular good or service and related price. Links to technical or other supporting documentation 1636 may be provided to allow the buyer to quickly and easily compare the quality of the particular good or service as well as the price. In addition to line item costs, the IBE can provide a comparison of responses to requested parameters by multiple sellers. FIGS. 16E and 16F show a screen shot 1640 comparing the responses 1642a and 1642b of two sellers to Parameters defining a well stimulation program. Each seller has chosen a different method 1644a and 1644b to provide the same service, each method requiring different goods 1646a and 1646b to complete the service. The IBE allows a buyer to easily compare different responses between sellers and make an informed decision as to how the project will be completed.

In some instances, the seller may not know what the price vs. quality expectations of the buyer are and may provide multiple options to allow the buyer to choose. In addition to providing comparisons between sellers, the IBE also addresses this multiple option scenario by providing an environment, as seen in FIGS. 16G and 16H, in which a buyer can easily compare alternative offerings provided by a single seller. The Request Manager screen 1650 provides a buyer an indication 1652 that a seller has provided alternative proposals to complete the project. By selecting the alternative indicator 1652, the IBE provides a new screen 1654 that compares the alternatives 1656a and 1656b offered by the seller with the original Parameters 1658 set forth in the request by the buyer.

Another environment supplied by the IBE, shown in FIGS. 16I-L, allows a buyer to change the original Parameters and the system calculates how such changes impact the responses provided by sellers. For example, the Bid Comparator screen 1660 shows the proposals 1662a and 1662b of two sellers for the same project. By selecting the scenario planning function 1664, the system provides the buyer the opportunity to change the project Parameters. New variable selection screen 1666, FIG. 16J requests an indication of the Parameter to be changed 1668. Once the buyer makes this indication, the variable selection screen 1666 allows the buyer to change the value 1670 of the chosen Parameter, as seen in FIG. 16K. Finally, the IBE computes the impact of the Parameter change and displays the results 1672a and 1672b for each seller on the Bid Comparator screen 1660, as seen in FIG. 16L, allowing the buyer to consider the impact of changes in Parameters to the project.

Additionally, the IBE allows the Buyer to display calendars depicting the dates when specific requests were submitted, when a request expires and other time sensitive information. FIG. 17A provides an example output of the calendaring function for wells by start date. Similarly, FIG. 17B provides an example of the calendaring function as applied to proposal requests by due date. Those skilled in the art appreciate that the IBE and the present invention may be configured, as desired, to calendar any event, due dates, or other information.

Lastly, the IBE provides Sellers with many of the functionalities provided to Buyers. For example, Sellers have the option of designating themselves as providers of specific goods or services, or goods and services. Additionally, Sellers can conduct searches for requests available for them to review-those requests designated by Buyers for only a list of preferred sellers are preferably not searchable by sellers not designated by the Buyer. Additionally, as Buyers change Parameters for a project, the sellers are suitably notified of such changes so that they may resubmit and/or revise proposals as necessary. Finally, as shown in FIG. 18, via the Request In-Box page 1800, sellers are suitably notified by the IBE of outstanding requests, requests to which they have expressed an interest, and other information associated therewith. As such, the IBE specifically provides a fully interactive system for managing and entering into contracts for the oil and gas industry and generally provides a process and system for matching buyers and sellers for the provision of goods or services, or goods and services based upon Parameters.

In many industries, projects are completed on a time and materials basis. Proposals from sellers generally indicate the time involved in providing necessary services and quantities of materials they believe will be necessary to complete the given task of the project, but pricing is based upon a.per unit basis of time and materials. Therefore, the actual costs and fees at the completion of a project may be higher or lower than the bid in the seller's proposal depending upon the conditions encountered in actually completing the project.

For example, in the construction industry, a shortage of construction materials or skilled labor in a certain region can drive project costs beyond the proposal because of higher priced substitute materials or the ability of labor to demand higher wages. Similarly, in the oil and gas industry, a drilling team may encounter an unforeseen operational problem that increases the time necessary to reach the desired well level, thereby increasing the cost of the project. In time and materials projects such as these, the buyer typically continues to manage the project through its completion despite time and cost overruns. Through ongoing management of the Parameters, however, the buyer is able to make decisions concerning any available options to reduce the time and cost.

Returning to the IBE, once a service is completed at a project site, the system provides the ability to immediately invoice the buyer for time, services, and materials actually used in a job or event of the project. In the oil and gas industry, such field invoices are referred to as "field tickets." In other industries, immediate invoicing may be called an "actual"—for the purposes herein, the terms "field ticket" and "actuals" are synonymous. Usually a representative of the buyer either visits or oversees the project site to ensure that the work is progressing and invoiced accordingly. At the conclusion of the job or event, the seller's representative fills out a field ticket detailing the actual work performed, time taken, and materials and equipment used, with the related costs and fees for the job. The buyer's representative may approve payment directly from the field ticket or hold for payment until receipt of the official invoice. In many instances the field ticket merely operates as a verification that services have been performed, but not as a payment authorization. In the regular course of matters, there may be times when there is a discrepancy between the actuals reflected in the field ticket, the purchase order based upon the seller's proposal, and the final invoice for the job that will ultimately require reconciliation.

The field ticket process is similar to the project management control process in the construction industry. Before submitting invoices to the buyer for work performed on a construction project, the seller's work must usually first be approved by the field project manager, or perhaps a government certification officer, to give the buyer assurance that the work was performed according to specifications. Many other industries use similar controls for ensuring appropriate performance from sellers, and the system of the present invention provides an environment for the management and transfer of such approval information and invoicing.

In the IBE, once a seller completes a project, step 2010 of FIG. 20, a field ticket (referred to in the IBE as the eFieldTicket™) reflecting the actual work performed, goods and equipment used, and costs thereof is prepared in a specific system environment accessible over the network, step 2020. When the seller's representative confirms the entries, notification that the field ticket is ready for review is communicated to the buyer's representative, step 2030. In one preferred embodiment, the seller accesses the network and the field ticket environment of the system via a wireless network connection from the field. In the alternative, if the project site is so remote that it is impractical or impossible to connect with the network, the invoicing environment may be provided locally on the seller's equipment and later interfaced with the system when access to a network connection is available. The buyer's representative, if present at the project site can approve of the field ticket or negotiate changes before confirming the field ticket on the system. If the buyer's representative is no longer at the project site, the buyer's field and/or office representative may access the field ticket from the network, once the field ticket is entered into the system. Just as during the procurement phase of the project, the system facilitates the interchange between buyer and seller to reconcile any variances between the field ticket, purchase order, and the actual invoice(s) submitted by respective sellers. Once a field ticket is issued and approved, the system may pass the invoice information from the field ticket to the buyer's accounting or "back office" system for payment processing, step 2040. If the field ticket is not approved by the buyer's representative, the field ticket actuals may still be passed to the buyer's accounting system. In either case, payment processing may then include reconciliation of the field ticket with the seller's final invoice before payment is made, step 2050.

Additionally, the system is capable of integrating the buyer and sellers' accounting systems. See FIG. 21. Information transfer is automatic and is preferably a computer-to-computer electronic transfer between the system network 100, the buyer's accounting system 2102 and the seller's accounting system 2104. This is accomplished by implementing interface integration tools 2106 such as Vitria®, Inc. software with both the buyer's accounting system and the seller's accounting system. Vitria® software, for example, is designed to interface between large-scale enterprise resource planning software systems such as those provided by SAP®, JD Edwards®, and others. The system may also interface with such typical accounting software systems as QuickBooks® or Peach Tree®

Before transferring an approved field ticket 2108 to a buyer's accounting system 2102, the system can automatically match and reconcile 2116 the field ticket with proposal awards 2112 or similar purchase orders executed through the system for automatic payment authorization 2114. Additionally, the system can work through the interface integration tools 2106 to match and reconcile 2116 the seller's invoice 2110 submitted to the buyer's accounting system 2102 with either approved or held field tickets 2118 and coordinate payment 2114 from the buyer's accounting system 2102. If the system is unable to reconcile the field ticket with an invoice or purchase order, the system may flag the field ticket for review and approvals before payment is made.

Referring to FIG. 19A, in the IBE in order to initiate the field ticket process, the seller accesses the original Bid Award page 1900 that contains the Project Level information 1902 as well as the Parameters of the specific request for which the proposal was awarded 1904. At the bottom of the Bid Award page, FIG. 19B, is a link button 1906 to view the eField-Ticket™ process pages. When the seller links to the eField-Ticket™ page, FIG. 19C, a list of previously created field tickets 1908 for the project is presented. By selecting a field ticket item from the list, the seller can review a previously saved and/or submitted field ticket that has been prepared for a specific request. In addition, a link button to create a new field ticket 1910 is available for selection.

Upon selecting the new eField-Ticket™ creation button 1910, the seller is presented with an eField-Ticket™ template page 1912 to enter the costs of goods and services related to the specific request for the project. See FIGS. 19D, 19E and 19F. As usual, in the IBE, project level information 1914 can be prepopulated as part of the page, as can any information from previous proposals or purchase orders, should the seller so choose. The seller may use the templates to enter temporal information about the work performed on the project 1916, descriptions and prices of services performed 1918, descriptions and prices of products and materials used 1920, and descriptions and costs of third party services utilized by the seller in completing the project 1922. Total costs for the services performed and products used are totaled by the system 1924. The seller can further enter any comments or explanations about entries and charges in the field ticket in a comment dialogue box 1926.

The eField-Ticket™ template page 1912 allows the seller to complete the field ticket over a period of time by allowing the saving of any entries without submitting them to the buyer. Once all entries to the field ticket are final, the seller may save them and submit them to the buyer. The buyer will receive a message that a new field ticket has been prepared, and will access the field ticket. Upon selection of the desired field ticket from the list 1908, the process allows the buyer to review the seller's cost entries for the project and compare them to the original Bid Award amounts and any actual invoices received from the seller. If there is an issue or subject matter that the buyer wants to share with the seller, the buyer is able to submit comments to the seller 1932. The buyer's portion of the field ticket has an additional comment section for the submission of internal comments 1934, for example comments to the buyer's accounting department.

The buyer and seller may communicate with each other through the comment fields 1932 and 1926 in order to negotiate and agree upon a final figure. The buyer's page may have additional buttons allowing the buyer to save any comments and submit them to the seller. During any negotiation, the document is still alive, and the seller may make any desired changes to the field ticket templates. If the buyer and seller reach agreement, the buyer may approve the seller's field ticket via another button, which submits the information to the buyer's accounting department. If the buyer and seller are unable to come to an agreement, the buyer can still submit the field ticket to the accounting department with a hold for payment request as an indication to the accounting department that additional investigation or negotiation will be necessary prior to payment to the seller.

Once the buyer submits the field ticket to the buyer's accounting department, the cost fields can be locked by the system. However, the buyer and seller are still able to exchange communications with each other. Further, the buyer is able to change any Project Level information to accommodate any changes to the buyer's internal project designations and record keeping.

While the systems and processes of the present invention have been described as encompassing numerous features, capabilities, architectures, and configurations, and depicted in detail for an Internet based embodiment, it is to be appreciated that the process of the present invention encompasses any and all combinations of these and comparable embodiments and is not to be construed as being limited to any preferred embodiment, or the IBE specified in detail herein. Additionally, modifications may be made to the process flow, techniques, equipment used, or any other element, factor, or step without departing from the scope of the present invention.

The invention claimed is:

1. A method of using a computing device for enhancing a workflow system by providing supportive information for a project, wherein a first user provides at least one request for at least one good, at least one service, and combinations thereof for the project, and a second user provides at least one response to the at least one request, the method comprising:

receiving and storing in at least one computer readable medium electronically accessible to a processor a purchase order provided by the first user relating to said at least one good, at least one service, and combinations thereof required for performance of at least a portion of the project based upon said at least one response provided by the second user;

receiving and storing in at least one computer readable medium electronically accessible to a processor actual data provided by the second user relating to the goods, services, or combinations thereof that were used to complete at least said portion of the project;

receiving and storing in at least one computer readable medium electronically accessible to a processor an invoice provided by the second user corresponding to at least said portion of the project upon completion of at least said portion of the project;

comparing, using at least one of said processors, the purchase order, the actual data, and the invoice to determine a discrepancy between the purchase order, the actual data, and the invoice;

sending, using at least one of said processors, an electronic notification of the discrepancy to the first user, the second user, or combinations thereof;

receiving and storing in at least one computer readable medium electronically accessible to a processor, in response to said electronic notification of the discrepancy, a proposed reconciliation from the first user or the second user; and receiving and storing in at least one computer readable medium electronically accessible to a processor, approval or disapproval of the proposed reconciliation from the first user or the second user.

2. The method as described in claim 1, wherein the workflow system comprises a system for implementing a process to generate at least one request for the at least one good or at least one service, and at least one good and at least one service to be provided by the second user to the first user for the project, wherein the project is defined in terms of at least one parameter, and wherein the system converts the at least one parameter into the at least one request, and wherein the system communicates the at least one request to the second user.

3. The method as described in claim 1, wherein the supportive information is selected from the group consisting of: industry information, first user standards, second user standards, industry standards, first user historical data, second user historical data, industry historical data, technical information, product information, and service information, or combinations thereof.

4. The method of claim 1, further comprising the steps of: providing targeted marketing by the second user to the first user during the entirety of the project.

5. The method of claim 4, wherein the targeted marketing is based on a profile of the first user.

6. The method of claim 5, wherein the targeted marketing is provided to the first user through an information source link.

7. The method of claim 4, the method further comprising the step of:
identifying classifications of the at least one good and at least one service for the project as provided by the first user.

8. The method of claim 7, the method further comprising the step of:
importing project parameters into a modeling system.

9. The method of claim 7, wherein the classifications pertain to drilling operations.

10. The method of claim 1, wherein the first user is an operator involved in an oil and gas exploration and production project.

11. The method of claim 1, wherein the method is implemented via a communication network.

12. The method of claim 11, wherein the communication network is selected from the group consisting of: Internet, intranet, private network, local area networks, wide area networks, distributed networks, and public networks.

13. The method of claim 1, further comprising:
inputting project parameters directly related to the project into the computing device;
specifying design rules as elements of a process provided for a pre-defined industry specific application to ensure compliance with said pre-defined industry specific application associated with the project;
verifying, using the computing device, the project parameters with the specified design rules to determine whether the project parameters comply with the design rules.

14. The method of claim 13, further comprising verifying the design rules with environmental rules and regulations to ensure that the design rules are in compliance with the environmental rules and regulations.

15. The method of claim 1, further comprising:
providing a request template for the first user to interface with, wherein the first user modifies the at least one request based on the discrepancy;
inserting an information source link into the request template;
notifying the second user that the request template is available for access and review;
responding to a selection of the information source link by the seller by displaying the supportive information with a second user interface connected to the computing device.

16. The method of claim 1, wherein the purchase order is a work order for services required for the performance of at least said portion of the project.

17. The method of claim 1, wherein the purchase order is a service agreement or a contract between the first user and the second user relating to said at least one good, at least one service, and combinations thereof required for the performance of at least said portion of the project.

18. The method of claim 1, wherein the step of using the processor to compare the purchase order, actual data, and invoice to determine a discrepancy between the purchase order, actual data, and invoice further comprising: comparing at least one line item for a good, a service, or a combination thereof from each of the purchase order, actual data, and invoice to determine the discrepancy.

19. The method of claim 1, wherein the step of using the processor to compare the purchase order, actual data, and invoice to determine a discrepancy between the purchase order, actual data, and invoice further comprising: comparing total dollar amount associated with the fulfillment of said portion of said project from each of the purchase order, actual data, and invoice to determine the discrepancy.

20. The method of claim 1, wherein the step of using the processor to compare the purchase order, actual data, and invoice to determine a discrepancy between the purchase order, actual data, and invoice further comprising: comparing at least one line item describing the quantity of a good used to fulfill said portion of said project from each of the purchase order, actual data, and invoice to determine the discrepancy.

21. The method of claim 1, further comprising the step of using at least one of said processors to compare the discrepancy between the purchase order, the actual data, and the invoice with at least one rule in the at least one data storage medium, wherein the discrepancy between the purchase order, actual data, and invoice falls within a tolerance of the at least one rule, and wherein the step of receiving approval or disapproval of a proposed reconciliation comprises receiving automatic approval of the proposed reconciliation.

22. The method of claim 21, further comprising sending an electronic notification to the first user, the second user, or combinations thereof indicating that the invoice is ready to be paid in response to receiving the automatic approval of the proposed reconciliation.

23. The method of claim 1, further comprising the step of using at least one of said processors to compare the discrepancy between the purchase order, actual data, and invoice with at least one rule stored in the at least one data storage medium, wherein the discrepancy between the purchase order, actual data, and invoice falls outside of a tolerance of the at least one rule, and wherein the step of receiving approval or disapproval of the proposed reconciliation comprises receiving automatic disapproval of the proposed reconciliation and transmission of a notification to at least the first user or the second user.

24. The method of claim 1, wherein the step of receiving approval or disapproval of the proposed reconciliation comprises receiving an electronic disapproval of the discrepancy from the first user or the second user, a second proposed reconciliation from the first user or the second user, and approval or disapproval of the second proposed reconciliation from the first user or the second user.

25. The method of claim 1, wherein the actual data comprises a field ticket related to the indication of the at least one good, at least one service, or combinations thereof used for performance of the at least said portion of the project.

26. A system for enhancing a workflow system by providing supportive information for a project, wherein a first user provides at least one request for at least one good, at least one service, and combinations thereof for the project, and a second user provides at least one response to the at least one request, the system comprising:
a computer readable medium electronically accessible to a processor for receiving and storing a purchase order provided by the first user relating to said at least one good, at least one service, and combinations thereof required for performance of at least a portion of the project based upon said at least one response provided by the second user;
a computer readable medium electronically accessible to a processor for receiving and storing actual data provided by the second user relating to the goods, services, or combinations thereof that were used to complete at least said portion of the project; and
a computer readable medium electronically accessible to a processor for receiving and storing an invoice provided by the second user corresponding to at least said portion of the project upon completion of at least said portion of the project;
wherein said at least one of said processors is configured to:
compare the purchase order, the actual data, and the invoice to determine a discrepancy between the purchase order, the actual data, and the invoice; and
send an electronic notification of the discrepancy to the first user, the second user, or combinations thereof; and
wherein said at least one of said computer readable mediums is configured to:
receive and store, in response to said electronic notification of the discrepancy, a proposed reconciliation from the first user or the second user; and
receive and store approval or disapproval of the proposed reconciliation from the first user or the second user.

27. The system as described in claim 26, wherein the workflow system implements a process to generate at least one request for the at least one good or at least one service, and at least one good and at least one service to be provided by the second user to the first user for the project, wherein the project is defined in terms of at least one parameter, and wherein the workflow system converts the at least one parameter into the at least one request and communicates the at least one request to the second user.

28. The system as described in claim 26, wherein the supportive information is selected from the group consisting of: industry information, first user standards, second user standards, industry standards, first user historical data, second user historical data, industry historical data, technical information, product information, and service information, or combinations thereof.

29. The system of claim 26, wherein said at least one of said processors is configured to:
provide targeted marketing by the second user to the first user during the entirety of the project.

30. The system of claim 29, wherein the targeted marketing is based on a profile of the first user.

31. The system of claim 30, wherein the targeted marketing is provided to the first user through an information source link.

32. The system of claim 29, wherein said at least one of said processors is configured to:
identify classifications of the at least one good and at least one service for the project as provided by the first user.

33. The system of claim 32, wherein said at least one of said processors is configured to:
import project parameters into a modeling system.

34. The system of claim 32, wherein the classifications pertain to drilling operations.

35. The system of claim 26, wherein said at least one of said processors is configured to:
input project parameters directly related to the project into a computing device;
specify design rules as elements of a process provided for a pre-defined industry specific application to ensure compliance with said pre-defined industry specific application associated with the project; and
verify, using the computing device, the project parameters with the specified design rules to determine whether the project parameters comply with the design rules.

36. The system of claim 35, wherein said at least one of said processors is configured to verify the design rules with environmental rules and regulations to ensure that the design rules are in compliance with the environmental rules and regulations.

37. The system of claim 26, wherein said at least one of said processors is configured to:
provide a request template for the first user to interface with, wherein the first user modifies the at least one request based on the discrepancy;
insert an information source link into the request template;
notify the second user that the request template is available for access and review; and
respond to a selection of the information source link by the first user by displaying the supportive information with a second user interface connected to a computing device.

38. The system of claim 26, wherein the first user is an operator involved in an oil and gas exploration and production project.

39. The system of claim 26, wherein the system is implemented via a communication network.

40. The system of claim 39, wherein the communication network is selected from the group consisting of: Internet, intranet, private network, local area networks, wide area networks, distributed networks, and public networks.

41. The system of claim 26, wherein the purchase order is a work order for services required for the performance of at least said portion of the project.

42. The system of claim 26, wherein the purchase order is a service agreement or a contract between the first user and the second user relating to said at least one good, at least one service, and combinations thereof required for the performance of at least said portion of the project.

43. The system of claim 26, wherein said at least one of said processors is configured to compare at least one line item for a good, a service, or a combination thereof from each of the purchase order, actual data, and invoice to determine the discrepancy.

44. The system of claim 26, wherein said at least one of said processors is configured to compare total dollar amount associated with the fulfillment of said portion of said project from each of the purchase order, actual data, and invoice to determine the discrepancy.

45. The system of claim 26, wherein said at least one of said processors is configured to compare at least one line item describing the quantity of a good used to fulfill said portion of said project from each of the purchase order, actual data, and invoice to determine the discrepancy.

46. The system of claim 26, wherein said at least one of said processors is configured to compare the discrepancy between the purchase order, the actual data, and the invoice with at least one rule stored in at least one data storage medium, wherein the discrepancy between the purchase order, actual data, and invoice falls within a tolerance of the at least one rule, and said at least one of said processors is configured to receive automatic approval of the proposed reconciliation.

47. The system of claim 46, wherein said at least one of said processors is configured to send an electronic notification to the first user, the second user, or combinations thereof indicating that the invoice is ready to be paid in response to receiving the automatic approval of the proposed reconciliation.

48. The system of claim 26, wherein said at least one of said processors is configured to compare the discrepancy between the purchase order, actual data, and invoice with at least one rule stored in at least one data storage medium, wherein the discrepancy between the purchase order, actual data, and invoice falls outside of a tolerance of the at least one rule, and wherein said at least one of said processors is configured to receive automatic disapproval of the proposed reconciliation and transmit a notification to at least the first user or the second user.

49. The system of claim 26, wherein said at least one of said processors is configured to receive an electronic disapproval of the discrepancy from the first user or the second user, a second proposed reconciliation from the first user or the second user, and approval or disapproval of the second proposed reconciliation from the first user or the second user.

50. The system of claim 26, wherein the actual data comprises a field ticket related to the indication of the at least one good, at least one service, or combinations thereof used for performance of the at least said portion of the project.

* * * * *